US010571781B2

(12) United States Patent
Misawa et al.

(10) Patent No.: US 10,571,781 B2
(45) Date of Patent: Feb. 25, 2020

(54) CAMERA, SETTING METHOD OF CAMERA, AND SETTING PROGRAM OF CAMERA

(71) Applicant: FUJIFILM Corporation, Tokyo (JP)

(72) Inventors: Atsushi Misawa, Saitama (JP); Kentaro Tokiwa, Saitama (JP); Hirofumi Horii, Saitama (JP); Yuichi Fujimura, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/255,543

(22) Filed: Jan. 23, 2019

(65) Prior Publication Data

US 2019/0155129 A1 May 23, 2019

Related U.S. Application Data

(63) Continuation of application No. PCT/JP2017/023863, filed on Jun. 29, 2017.

(30) Foreign Application Priority Data

Jul. 29, 2016 (JP) ................................ 2016-149789

(51) Int. Cl.
*G03B 17/18* (2006.01)
*H04N 5/225* (2006.01)
(Continued)

(52) U.S. Cl.
CPC ............ *G03B 17/20* (2013.01); *G03B 17/02* (2013.01); *G03B 17/18* (2013.01); *H04N 5/2252* (2013.01); *H04N 5/232* (2013.01)

(58) Field of Classification Search
None
See application file for complete search history.

(56) References Cited

U.S. PATENT DOCUMENTS 5,745,809 A 4/1998 Kawahata
2016/0028938 A1 1/2016 Fukushima
(Continued)

FOREIGN PATENT DOCUMENTS

JP 7-134320 A 5/1995
JP 7-191397 A 7/1995
(Continued)

OTHER PUBLICATIONS

International Preliminary Report on Patentability and Written Opinion of the International Searching Authority dated Feb. 7, 2019, for International Application No. PCT/JP2017/023863, with an English Translation of the Written Opinion.
(Continued)

*Primary Examiner* — William B Perkey
(74) *Attorney, Agent, or Firm* — Birch, Stewart, Kolasch & Birch, LLP

(57) ABSTRACT

Provided are a camera that is capable of preventing an erroneous operation with a compact configuration and has good operability, a setting method of the camera, and a setting program of the camera. A part of the outer periphery of a command dial is built in a camera body, and a part of the command dial is disposed in an exposed manner from the back surface of the camera body for a rotation operation. A sub-display is disposed on the command dial in an overlapped manner. The sub-display is formed of a touch panel and detects contact with a display surface of the sub-display. An operation by the command dial is validated while the contact with the display surface of the sub-display is detected.

29 Claims, 41 Drawing Sheets

(51) Int. Cl.

| | |
|---|---|
| ***H04N 5/232*** | (2006.01) |
| ***G03B 17/20*** | (2006.01) |
| ***G03B 17/02*** | (2006.01) |

(56) References Cited

U.S. PATENT DOCUMENTS

| | | | | |
|---|---|---|---|---|
| 2019/0121525 A1* | 4/2019 | Tokiwa | .............. | H04N 5/22525 |
| 2019/0146310 A1* | 5/2019 | Misawa | ................. | H04N 5/225 396/296 |
| 2019/0220175 A1* | 7/2019 | Tokiwa | .................. | G03B 17/02 |
| 2019/0253628 A1* | 8/2019 | Misawa | ................. | G03B 17/02 |

FOREIGN PATENT DOCUMENTS

| | | | |
|---|---|---|---|
| JP | 2010-192223 | A | 9/2010 |
| JP | 2014-202837 | A | 10/2014 |
| JP | 2015-125307 | A | 7/2015 |
| JP | 2016-24360 | A | 2/2016 |
| JP | 2016-206358 | A | 12/2016 |

OTHER PUBLICATIONS

International Search Report, dated Oct. 3, 2017, for International Application No. PCT/JP2017/023863, with an English translation.

* cited by examiner

CAMERA, SETTING METHOD OF CAMERA, AND SETTING PROGRAM OF CAMERA

CROSS-REFERENCE TO RELATED APPLICATIONS

This application is a Continuation of PCT International Application No. PCT/JP2017/023863 filed on Jun. 29, 2017, which claims priority under 35 U.S.0 §119(a) to Japanese Patent Application No. 2016-149789 filed on Jul. 29, 2016. Each of the above application(s) is hereby expressly incorporated by reference, in its entirety, into the present application.

BACKGROUND OF THE INVENTION

1. Field of the Invention

The present invention relates to a camera comprising a rotary operation dial, a setting method of the camera, and a setting program of the camera.

2. Description of the Related Art

In a camera, a rotary operation dial is known as means for setting an imaging condition such as a shutter speed.

However, the rotary operation dial may be rotated unintentionally and thus a setting may be changed while a user does not notice. In order to solve such problem, an operation dial comprising a lock mechanism is proposed.

As the operation dial comprising the lock mechanism, an operation dial comprising a lock release button at the center of a top surface is common (for example, JP1995-134320A (JP-H07-134320A), JP2015-125307A, or the like). In this type of the operation dial, it is possible to grasp a position of the lock release button from the feeling of a finger operating the operation dial without viewing the operation dial. That is, it is possible to grasp an approximate center position by simply touching the operation dial with the finger due to a disc-like external shape of the operation dial and thus to grasp the position of the lock release button without actually confirming with eyes. Therefore, in this type of the operation dial, it is possible to lock and unlock the operation dial without actually confirming the operation dial with eyes. This is particularly effective in a case where a camera with a finder is operated by being viewed the finder.

SUMMARY OF THE INVENTION

However, the operation dial comprising a mechanical lock mechanism such as the lock release button has a disadvantage that a structure thereof is complicated and installation thereof is expensive.

Further, the operation dial is commonly provided on the top surface (so-called warship part) of a camera body, but the number of the operation dials that can be installed on the top surface has a limit. In particular, in a case where a display section such as a liquid crystal panel is provided on the top surface of the camera body, there is a case where the desired number of the operation dials cannot be installed.

On the other hand, a so-called buried type operation dial is also known as the operation dial provided in the camera (for example, JP1996-076225A (JP-H08-076225A)). The buried type operation dial refers to a rotary operation dial in which a part of the outer periphery thereof is built in the camera body and a part thereof is exposed to a surface of the camera body for a rotation operation. The buried type operation dial has an advantage that the degree of freedom of the installation is high.

However, since the buried type operation dial has a structure in which a rotation axis thereof is built in the camera body, there is a problem that the lock release button cannot be provided on the rotation axis thereof even in a case where the mechanical lock mechanism is provided. Thus, the structure of the buried type operation dial is simple, but there is a disadvantage that operability thereof is poor as compared with the operation dial provided on the top surface.

The invention has been made in consideration of the above-mentioned circumstances, and an object of the invention is to provide a camera that is capable of preventing an erroneous operation with a compact configuration and has good operability, a setting method of the camera, and a setting program of the camera.

Means for achieving the above-mentioned object are as follows.

(1) A camera comprising:

a rotary operation dial that is built in a camera body and in which a part of the outer periphery of the rotary operation dial is exposed to a surface of the camera body;

a display section that is disposed on the operation dial in an overlapped manner while covering a portion of the operation dial hidden inside the camera body and not covering a portion exposed from the camera body;

a display control unit that controls a display on the display section;

a contact detection unit that detects contact with a display surface of the display section, and a switching unit that switches between validity and invalidity of an operation by the operation dial based on a detection result of the contact detection unit.

According to the embodiment, the rotary operation dial and the display section are provided in the camera body. The operation dial is formed of a so-called buried type operation dial. That is, the operation dial is built in the camera body, and a part of the outer periphery thereof is disposed on the surface of the camera body in an exposed manner. The display section is disposed on the operation dial in an overlapped manner so as to cover the portion of the operation dial hidden inside the camera body and so as not to cover the portion exposed from the camera body. In the display section, the contact with the display surface thereof is detected by the contact detection unit. The operation by the operation dial can be switched between valid and invalid based on the detection result of the contact detection unit. A state where the operation by the operation dial is invalid refers to a state where the operation dial is electronically locked. On the other hand, a state where the operation by the operation dial is valid refers to a state where the electronic lock is released.

According to the embodiment, it is possible to prevent an erroneous operation with a compact configuration. That is, since the contact with the display surface of the display section is detected and the operation dial is electronically locked, it is possible to simplify a mechanism for locking the operation dial. Further, since the operation dial can be locked, it is possible to prevent the erroneous operation. Further, since the display section is disposed on the operation dial in an overlapped manner, the operation can be performed even by groping. Therefore, it is possible to ensure good operability even in imaging under a dark situation and in imaging while a finder is used. The “disposed in an overlapped manner" does not necessarily mean that the centers of the display section and the operation dial are aligned with each other, but means that at least a part of the display section and the operation dial is disposed in an overlapped manner in a plan view. That is, at least a part of the display section and the operation dial may be overlapped in a case of being viewed from an axis direction of the operation dial.

(2) The camera according to (1), wherein the display section is disposed on an axis of the operation dial in an overlapped manner.

According to the embodiment, the display section is disposed on the axis of the operation dial in an overlapped manner. Accordingly, it is possible to provide good operability. That is, since a position of the axis can be estimated roughly even without being viewed, it is possible to provide extremely good operability. The "disposed on the axis in an overlapped manner" means that the display section is disposed at least on an axis line of the operation dial. That is, the "disposed on the axis in an overlapped manner" means that the rotation axis of the operation dial is disposed within the display region of the display section.

(3) The camera according to (1) or (2), wherein the contact detection unit detects the contact in a region overlapping with the operation dial on the display surface of the display section.

According to the embodiment, the contact in the region overlapping with the operation dial on the display surface of the display section is detected. That is, the region overlapping with the operation dial in display surface is set as a detection region of the contact.

(4) The camera according to any one of (1) to (3), wherein the contact detection unit further detects a touched position.

According to the embodiment, the touched position is also detected in addition to the contact on the display surface of the display section.

(5) The camera according to any one of (1) to (4), wherein the switching unit switches alternately between validity and invalidity of the operation by the operation dial every time the contact is detected by the contact detection unit.

According to the embodiment, the operation by the operation dial can be switched alternately between valid and invalid every time the contact with the display surface of the display section is detected. That is, the display surface of the display section functions as a toggle type switch. Accordingly, it is possible to easily lock the operation dial.

(6) The camera according to any one of (1) to (4), wherein the switching unit validates the operation by the operation dial while the contact is detected by the contact detection unit.

According to the embodiment, the operation by the operation dial is validated only while the contact with the display surface of the display section is detected. Accordingly, it is possible to effectively prevent the erroneous operation.

(7) The camera according to any one of (1) to (6), wherein the display control unit displays at least information indicating a state of the operation dial on the display section.

According to the embodiment, the information indicating the state of the operation dial is displayed on the display section. The information indicating the state of the operation dial is information indicating whether the operation dial is validated at the present time. Accordingly, it is possible to distinguish whether the operation dial is valid from the display on the display section. Accordingly, it is possible to further improve operability.

(8) The camera according to any one of (1) to (7), wherein the display control unit switches a display form of the information to be displayed on the display section between a case where the operation by the operation dial is invalid and a case where the operation by the operation dial is valid.

According to the embodiment, the display form of the information to be displayed on the display section can be switched between the case where the operation by the operation dial is invalid and the case where the operation by the operation dial is valid. For example, a background color is inverted between the case where the operation by the operation dial is invalid and the case where the operation by the operation dial is valid. Accordingly, it is possible to distinguish whether the operation dial is valid from the display on the display section. Accordingly, it is possible to further improve operability.

(9) The camera according to any one of (1) to (6), wherein the display control unit displays an image picture of a button on the display section and switches a display form of the image picture of the button in conjunction with the switching between validity and invalidity of the operation by the operation dial.

According to the embodiment, the image picture of the button is displayed on the display section. Accordingly, it is possible to easily grasp the operation intuitively. Further, the display form of the displayed image picture of the button can be switched in conjunction with the switching between validity and invalidity of the operation by the operation dial. Accordingly, it is possible to grasp whether the operation by the operation dial is valid, that is, whether the operation dial is locked from the display on the display section. Accordingly, it is possible to provide good operability.

(10) The camera according to any one of (1) to (6), wherein the display control unit displays an image picture of a dial comprising a button at the center on the display section and switches a display form of a portion of the button in conjunction with the switching between validity and invalidity of the operation by the operation dial.

According to the embodiment, the image picture of the dial comprising the button at the center is displayed on the display section. Accordingly, it is possible to easily grasp the operation intuitively. Further, the display form of the button portion of the displayed image picture can be switched in conjunction with the switching between validity and invalidity of the operation by the operation dial. Accordingly, it is possible to grasp whether the operation by the operation dial is valid, that is, whether the operation dial is locked from the display on the display section. Accordingly, it is possible to provide good operability.

(11) The camera according to (10), wherein in a case where the operation by the operation dial is valid, the display control unit changes the image picture of the operation dial in conjunction with a rotation of the operation dial to express a rotation operation of the operation dial.

According to the embodiment, in the case where the operation by the operation dial is valid, the rotation operation is expressed on the display section in the case where the operation dial is rotated. That is, the image picture is changed in conjunction with the rotation so as to be understood that the operation is in progress. For example, the image picture is rotated with the axis as the center in conjunction with the rotation of the operation dial. In the case where the operation by the operation dial is invalid, the image picture remains stationary even though the operation dial is rotated. Accordingly, it is possible to more clearly grasp whether the operation by the operation dial is valid from the display on the display section.

(12) The camera according to (10) or (11), wherein the display control unit displays an image having an arc-like external shape obtained by extending the part of the outer periphery of the operation dial exposed to the surface of the camera body on the display section as the image picture of the dial.

According to the embodiment, the image picture of the dial to be displayed on the display section is formed of the image having the arc-like external shape. This image is an image obtained by extending a part of the outer periphery of the operation dial exposed to the surface of the camera body. That is, the portion of the operation dial hidden inside the camera body is complemented by the image picture of the dial to be displayed on the display section. Accordingly, it is possible to easily grasp the operation more intuitively.

(13) The camera according to any one of (10) to (12), wherein the image picture of the dial has a radial pattern.

According to the embodiment, the image picture of the dial to be displayed on the display section has the radial pattern. Accordingly, in the case where the image picture is rotated, it is possible to clarify the rotation.

(14) The camera according to any one of (10) to (13), wherein the image picture of the dial has a pattern displayed periodically in the circumference direction.

According to the embodiment, the image picture of the dial to be displayed on the display section has the pattern displayed periodically in the circumference direction. Accordingly, in the case where the image picture is rotated, it is possible to clarify the rotation. The pattern to be displayed periodically in the circumference direction is, for example, a figure or the like to be displayed at regular pitches in the circumference direction.

(15) The camera according to any one of (10) to (14), wherein the image picture of the dial has a periodical uneven shape on the outer periphery portion.

According to the embodiment, the image picture of the dial to be displayed on the display section has the periodical uneven shape on the outer periphery portion. Accordingly, in the case where the image picture is rotated, it is possible to clarify the rotation.

(16) The camera according to any one of (9) to (15), wherein a region where the contact is detected by the contact detection unit is set within a display region of the image picture of the button.

According to the embodiment, the region where the contact is detected is set within the display region of the image picture of the button. Accordingly, it is possible to prevent the erroneous detection by unintentional contact or the like.

(17) The camera according to any one of (1) to (16), wherein the display control unit displays information on setting contents of the camera including at least a setting value of an item to be set by the operation dial on the display section.

According to the embodiment, the information on the setting contents of the camera is displayed on the display section. This information includes at least the information on the setting value of the item to be set by the operation dial. Accordingly, it is possible to grasp a current setting from the display on the display section and thus to provide better operability.

(18) The camera according to (17), wherein in a case where the information on the setting contents of the camera to be displayed on the display section includes information on setting value of an item other than the item to be set by the operation dial, the display control unit displays the information on the setting value of the item to be set by the operation dial in a form different from the information on the setting value of another item.

According to the embodiment, the information on the setting value of the item to be set by the operation dial and the information on the setting value of another item are displayed on the display section. In this case, the information on the setting value of the item to be set by the operation dial is displayed in the form different from the information on the setting value of the other item. Accordingly, it is possible to easily grasp the item to be set by the operation dial and the setting value thereof from the display on the display section.

(19) The camera according to (17), wherein in a case where the information on the setting contents of the camera to be displayed on the display section includes information on a setting value of an item other than the item to be set by the operation dial, and the operation by the operation dial is valid, the display control unit limits the information on the setting contents of the camera to be displayed on the display section to the information on the setting value of the item to be set by the operation dial.

According to the embodiment, the information on the setting value of the item to be set by the operation dial and the information on the setting value of another item are displayed on the display section. However, in the case where the operation by the operation dial is validated, the information to be displayed as the information on the setting contents of the camera is limited to the information on the setting value of the item to be set by the operation dial. Accordingly, it is possible to easily grasp the item to be set by the operation dial and the setting value thereof from the display on the display section. Further, the display can be enlarged and thus can be viewed easily.

(20) The camera according to (6), wherein the contact detection unit detects the contact with the contact detection region set on a part in the display surface of the display section, and wherein the display control unit displays the information on the setting contents of the camera including at least the information on the setting value of the item to be set by the operation dial on the display section, and displays at least the information on the setting value of the item to be set by the operation dial in a region avoiding the contact detection region.

According to the embodiment, the region where the contact is detected (contact detection region) is limited to a part in the display surface of the display section. At least the information on the setting value of the item to be set by the operation dial among pieces of information to be displayed on the display section is displayed in the region avoiding the contact detection region. Accordingly, it is possible to prevent the information on the item to be set by the operation dial from being hidden by a finger touching the display section and difficult to view. Accordingly, it is possible to provide better operability.

(21) The camera according to (6), wherein the contact detection unit detects the contact with the contact detection region set on a part in the display surface of the display section, and wherein the display control unit displays the information on the setting contents of the camera including at least the information on the setting value of the item to be set by the operation dial on the display section, and displays at least the information on the setting value of the item to be set by the operation dial in a region avoiding a contact detection region while the contact is detected by the contact detection unit.

According to the embodiment, the region where the contact is detected (contact detection region) is limited to a part in the display surface of the display section. At least the information on the setting value of the item to be set by the operation dial among pieces of information to be displayed on the display section is displayed in the region avoiding the contact detection region while the contact is detected. Accordingly, it is possible to prevent the information on the item to be set by the operation dial from being hidden by a finger touching the display section and difficult to view. Accordingly, it is possible to provide better operability.

(22) The camera according to (6), wherein the display control unit displays the information on the setting contents of the camera including at least the information on the setting value of the item to be set by the operation dial on the display section, and displays at least the information on the setting value of the item to be set by the operation dial in a region avoiding a region where the contact is detected by the contact detection unit while the contact is detected by the contact detection unit.

According to the embodiment, at least the information on the setting value of the item to be set by the operation dial among pieces of information to be displayed on the display section is displayed in the region avoiding the region where the contact is detected while the contact is detected. Accordingly, it is possible to prevent the information on the item to be set by the operation dial from being hidden by a finger touching the display section and difficult to view. Accordingly, it is possible to provide better operability.

(23) The camera according to (6), wherein the display control unit displays the information on the setting contents of the camera including at least the information on the setting value of the item to be set by the operation dial on the display section, and displays at least the information on the setting value of the item to be set by the operation dial in a region avoiding a region assumed to be covered by a finger of a hand touching the display surface of the display section.

According to the embodiment, at least the information on the setting value of the item to be set by the operation dial among pieces of information to be displayed on the display section is displayed in a specific region. This region is the region avoiding the region assumed to be covered by the finger of the hand touching the display surface of the display section for validating the operation by the operation dial. The region touched for validating the operation by the operation dial can be specified to some extent from an operation form. Therefore, the information is displayed avoiding this region. Accordingly, it is possible to prevent the information on the item to be set by the operation dial from being hidden by a finger touching the display section and difficult to view. Accordingly, it is possible to provide better operability.

(24) The camera according to (6), wherein in a case where the operation by the operation dial is invalid, the display control unit displays the information on the setting contents of the camera including at least the information on the setting value of the item to be set by the operation dial on the display section in a first layout, and wherein in a case where the operation by the operation dial is valid, the display control unit displays the information on the setting contents on the display section in a second layout different from the first layout.

According to the embodiment, at least the information on the setting value of the item to be set by the operation dial is displayed on the display section. This information is displayed in a predetermined layout and is displayed in the first layout in the case where the operation by the operation dial is invalid. On the other hand, in the case where the operation by the operation dial is valid, the information is displayed in the second layout different from the first layout. That is, the display layout is changed between the case where the operation by the operation dial is valid and the case where the operation by the operation dial is invalid. Accordingly, it is possible to display the information on the setting contents of the camera in a layout suitable for a situation.

(25) The camera according to (24), wherein the second layout is a layout that displays the information on the setting contents in a region avoiding a region assumed to be covered by a finger of a hand touching the display surface of the display section.

According to the embodiment, in the case where the operation by the operation dial is valid, the information on the setting contents of the camera is displayed in a specific region. This region is the region avoiding the region assumed to be covered by the finger of the hand touching the display surface of the display section for validating the operation by the operation dial. The region touched for validating the operation by the operation dial can be specified to some extent from an operation form. Therefore, the information is displayed avoiding this region. Accordingly, it is possible to prevent the information on the item to be set by the operation dial from being hidden by a finger touching the display section and difficult to view. Accordingly, it is possible to provide better operability.

(26) The camera according to (24), wherein the second layout is a layout that displays the information on the setting contents in a region avoiding the region where the contact is detected by the contact detection unit.

According to the embodiment, in the case where the operation by the operation dial is valid, the information on the setting contents is displayed in the region avoiding the region where the contact is detected. Accordingly, it is possible to prevent the information on the setting contents of the camera from being hidden by the finger touching the display section and difficult to view. Accordingly, it is possible to provide better operability.

(27) The camera according to any one of (1) to (26), wherein the display section is provided on a top surface of the camera body and provided at an end portion on a grip portion side.

According to the embodiment, the display section is provided on the top surface of the camera body and provided at the end portion on the grip portion side. Accordingly, it is possible to operate the operation dial while the camera body is gripped.

(28) A setting method of a camera comprising a rotary operation dial that is built in a camera body and in which a part of the outer periphery of the rotary operation dial is exposed to a surface of the camera body, a display section that is disposed on the operation dial in an overlapped manner while covering a portion of the operation dial hidden inside the camera body and not covering a portion exposed from the camera body, and a contact detection unit that detects contact with a display surface of display section, the method comprising:

a step of switching between validity and invalidity of an operation by the operation dial based on a detection result of the contact detection unit; and a step of changing a setting of a predetermined item based on the operation of the operation dial in a case where the operation by the operation dial is valid.

According to the embodiment, the operation by the operation dial can be switched between valid and invalid based on the detection result of the contact with the display surface of the display section. The setting of the predetermined item is changed based on the operation of the operation dial only in the case where the operation by the operation dial is valid. Accordingly, it is possible to provide a camera that is capable of preventing the erroneous operation with the compact configuration and has good operability.

(29) A setting program of a camera comprising a rotary operation dial that is built in a camera body and in which a part of the outer periphery of the rotary operation dial is exposed to a surface of the camera body, a display section that is disposed on the operation dial in an overlapped manner while covering a portion of the operation dial hidden inside the camera body and not covering a portion exposed from the camera body, and a contact detection unit that detects contact with a display surface of display section and causing a computer to realize functions comprising:

a function of switching between validity and invalidity of an operation by the operation dial based on a detection result of the contact detection unit; and a function of changing a setting of a predetermined item based on the operation of the operation dial in a case where the operation by the operation dial is valid.

According to the embodiment, the operation by the operation dial can be switched between valid and invalid based on the detection result of the contact with the display surface of the display section. The setting of the predetermined item is changed based on the operation of the operation dial only in the case where the operation by the operation dial is valid. Accordingly, it is possible to provide a camera that is capable of preventing the erroneous operation with the compact configuration and has good operability.

According to the invention, it is possible to provide the camera that is capable of preventing the erroneous operation with the compact configuration and has good operability.

Figure 13:
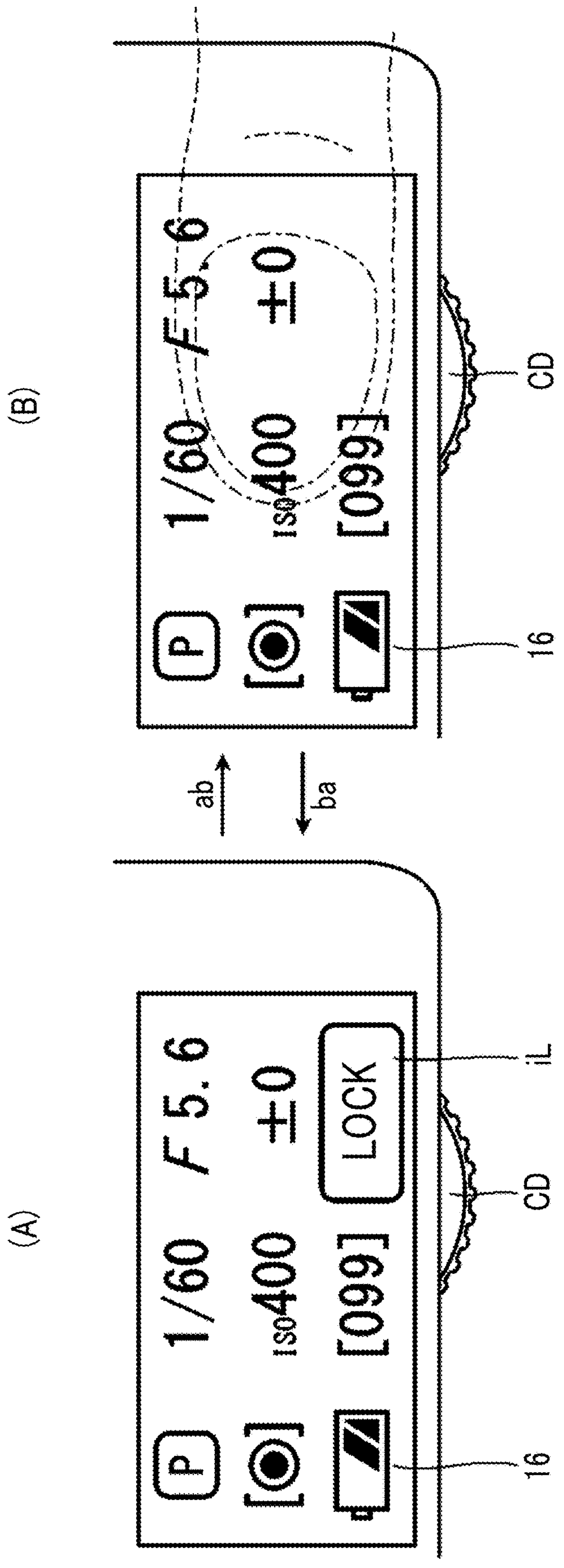

(A) and (B) of FIG. 13 are plan views showing displays on the sub-display in a case where the operation by the command dial is valid and in a case where the operation by the command dial is invalid.

Figure 14:
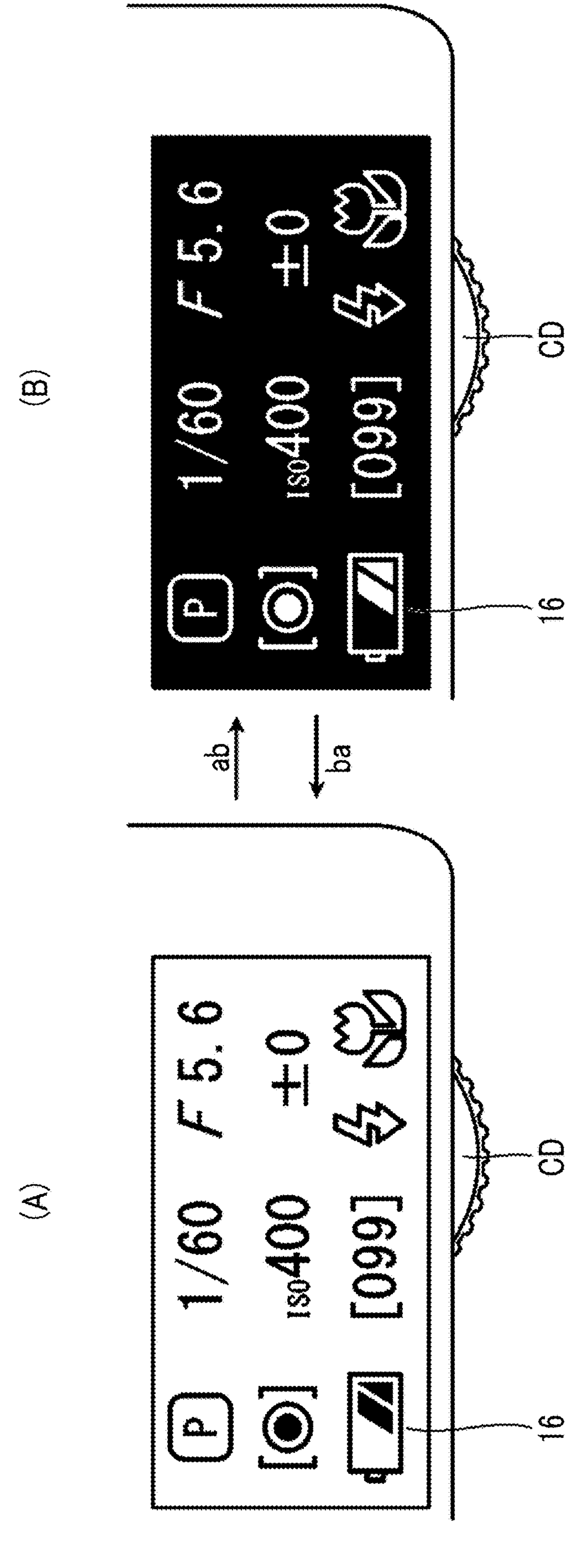

(A) and (B) of FIG. 14 are plan views showing a modification example of the displays on the sub-display in the case where the operation by the command dial is valid and in the case where the operation by the command dial is invalid.

Figure 15:
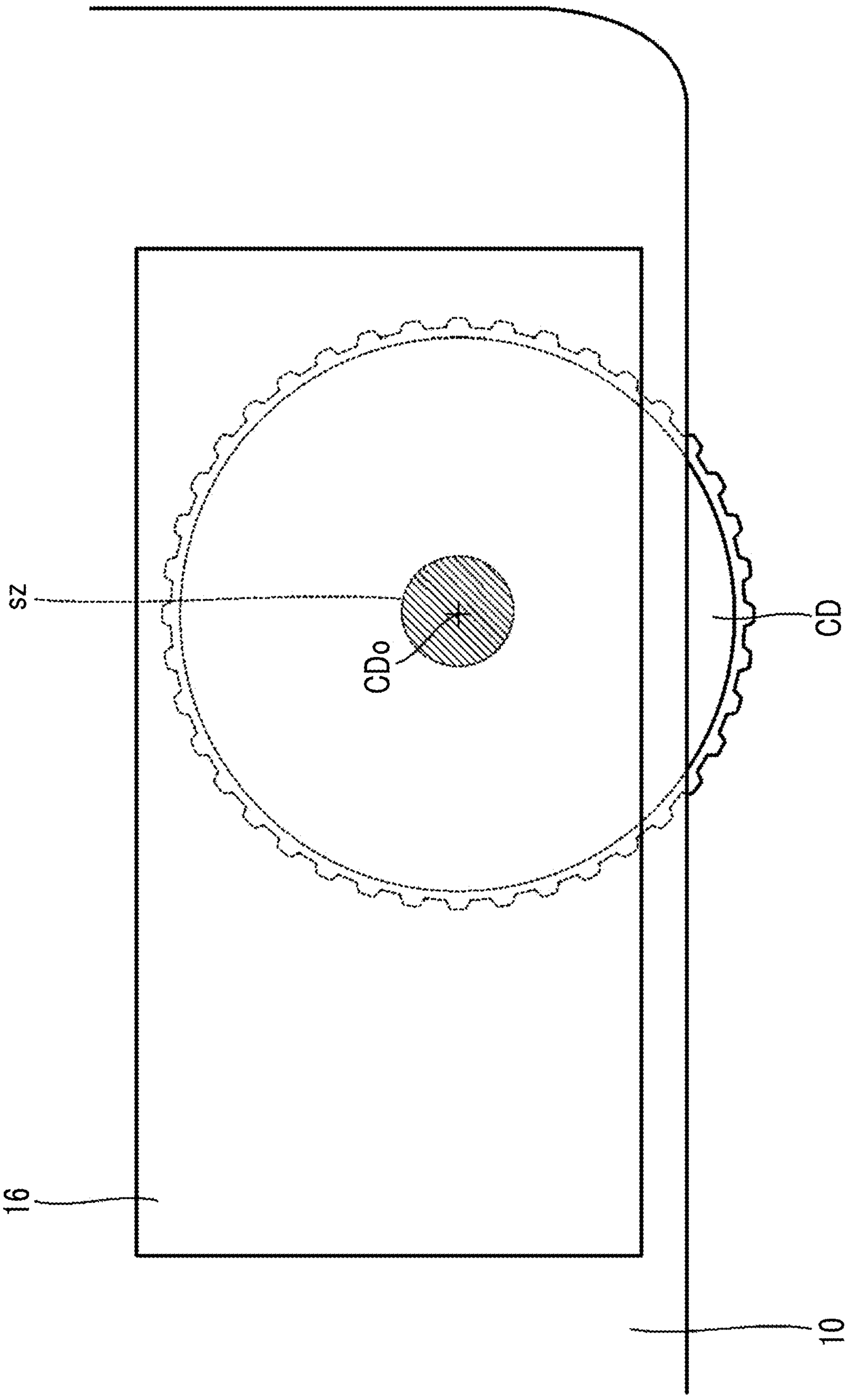

FIG. 15 is a plan view showing an example in a case where a contact detection region is limited to a part within a disposition region of the command dial.

Figure 16:
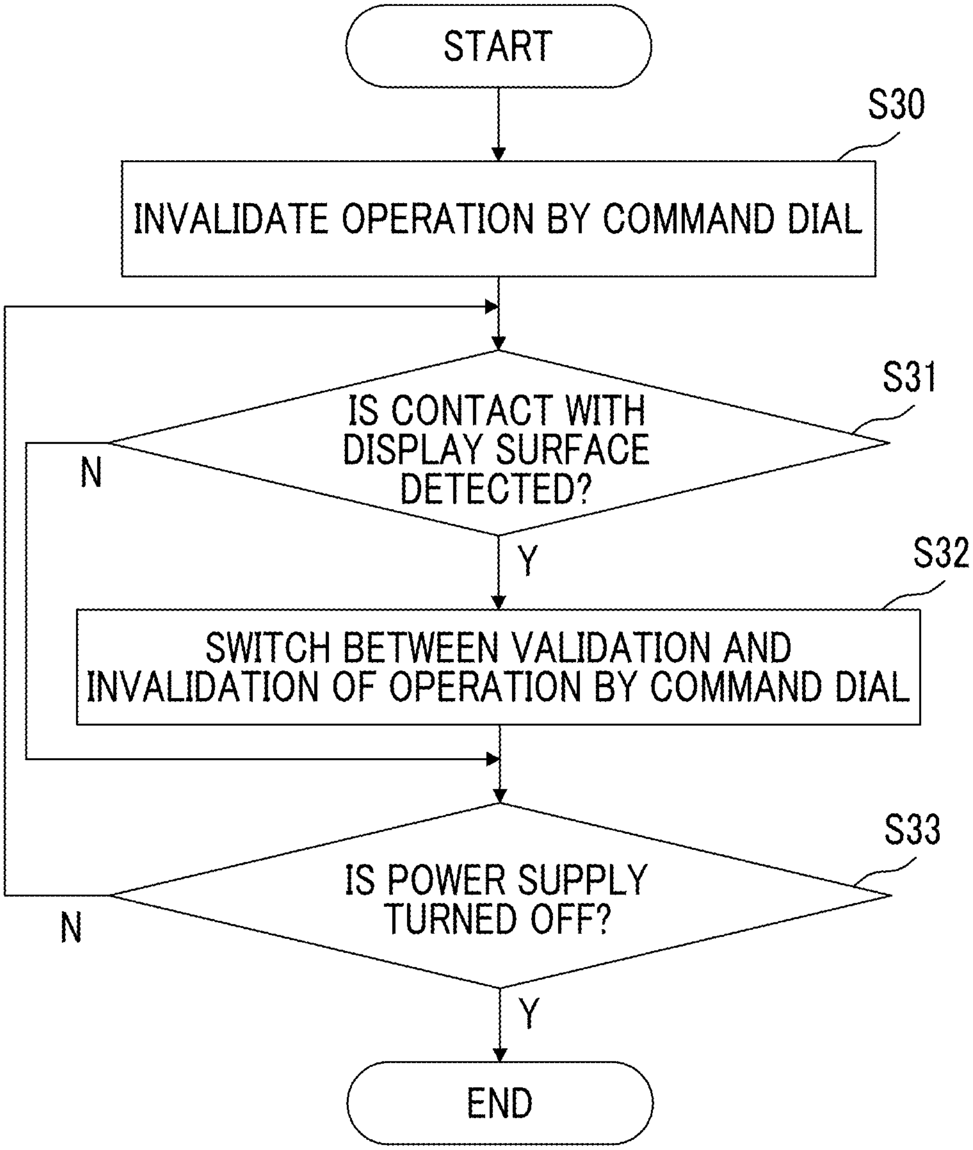

FIG. 16 is a flowchart showing a procedure of processing of switching between validity and invalidity of the operation by the command dial.

Figure 17:
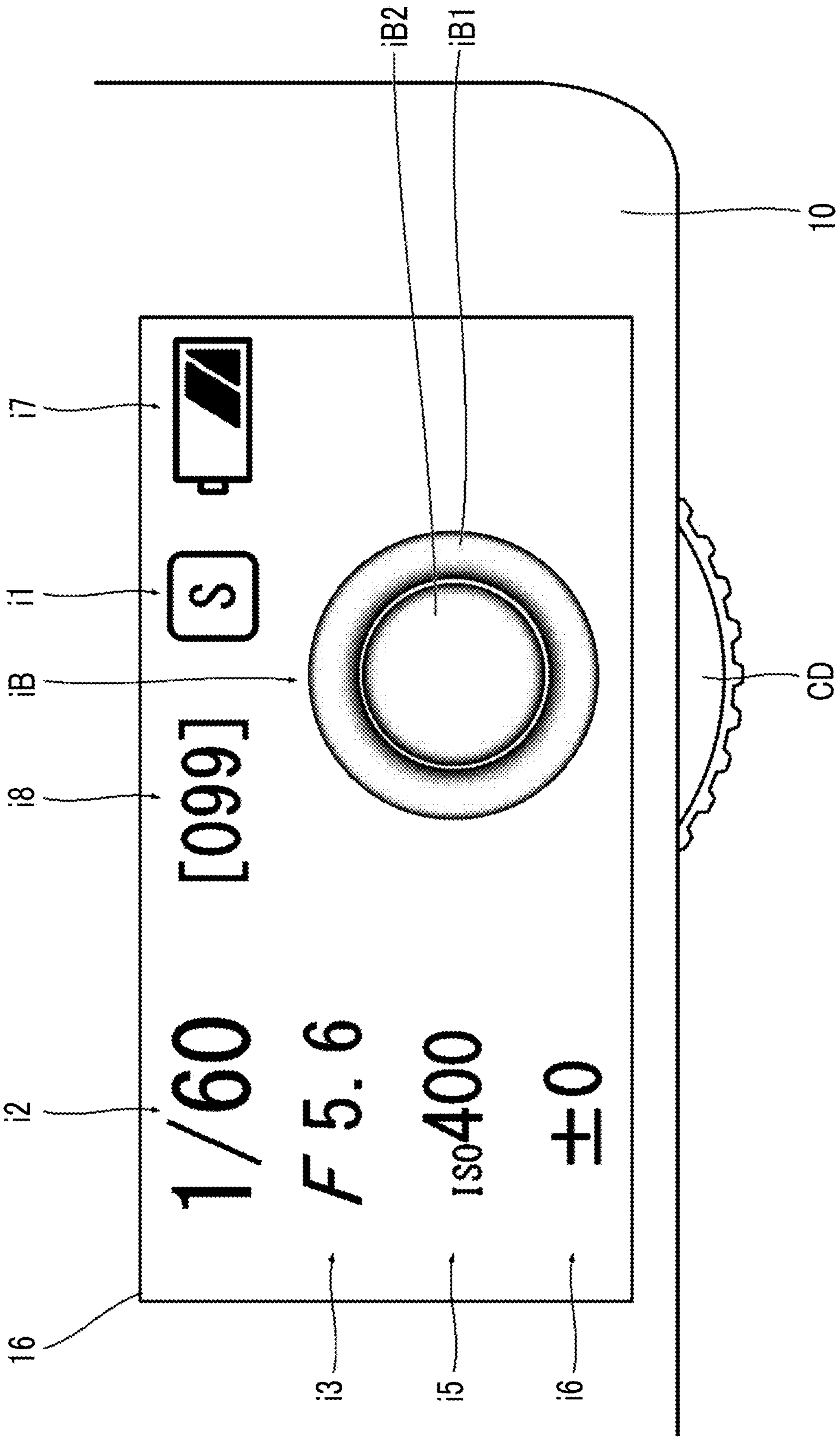

FIG. 17 is a plan view showing an example of the display on the sub-display.

Figure 18:
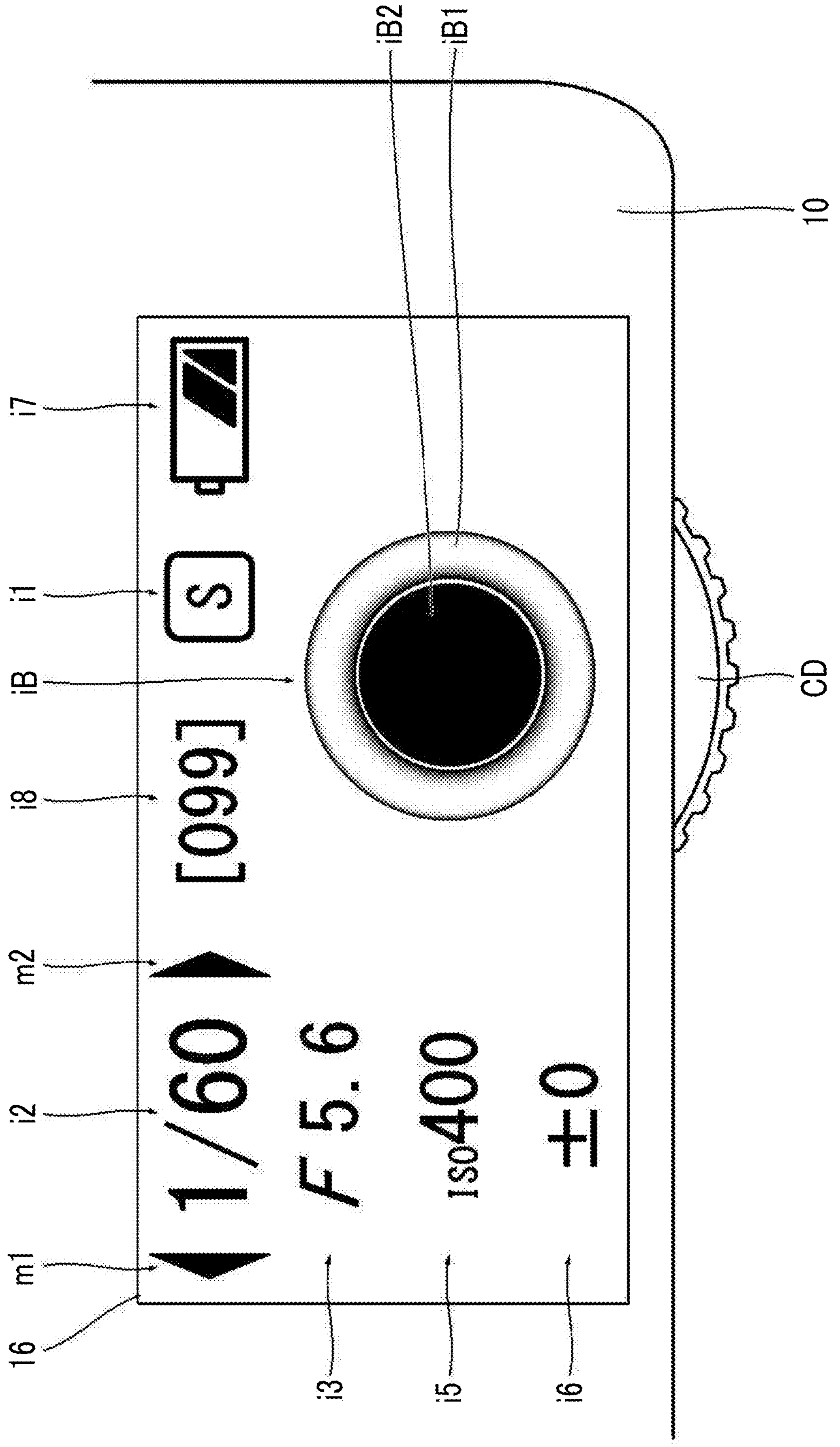

FIG. 18 is a plan view showing an example of the display on the sub-display.

Figure 19:
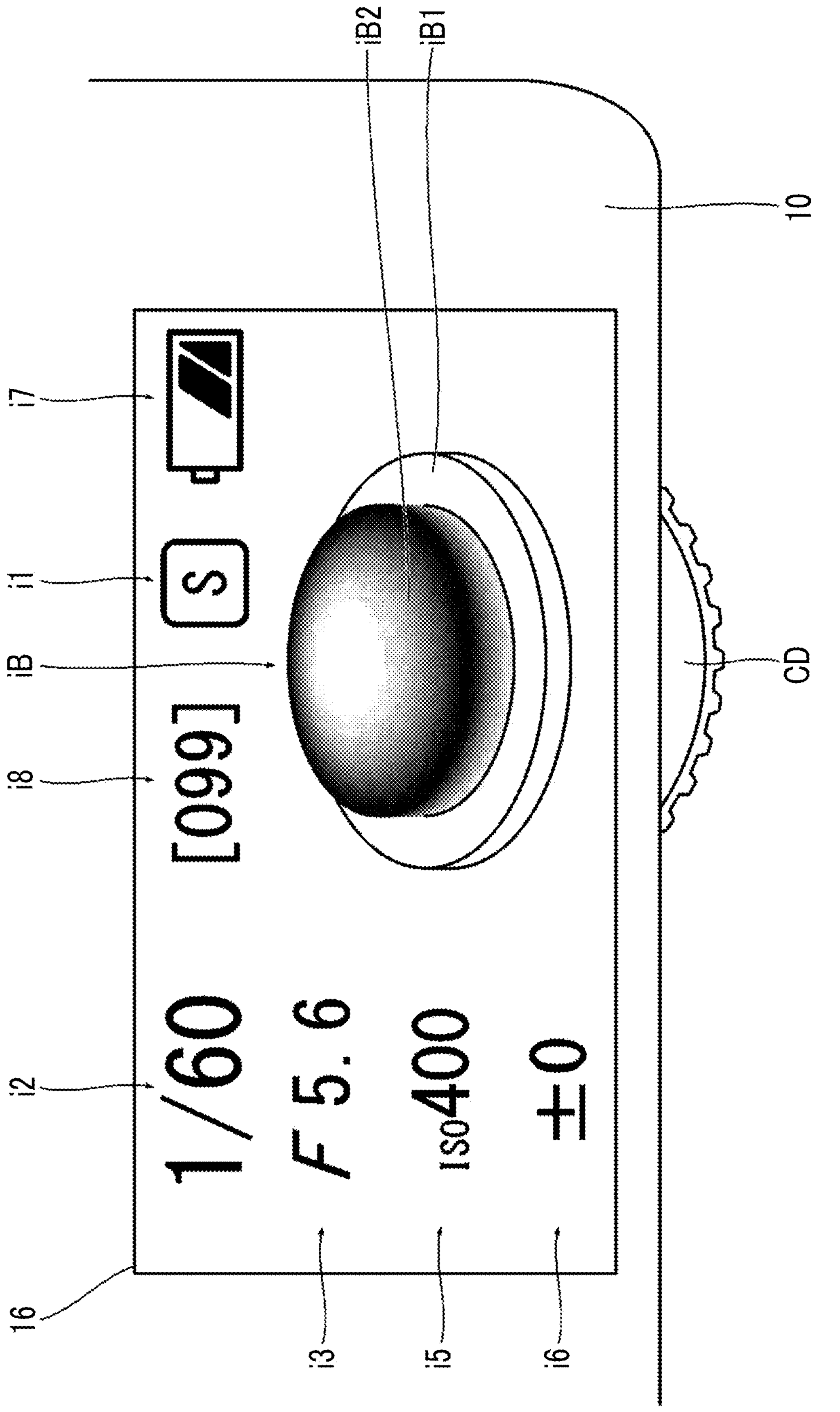

FIG. 19 is a diagram showing a modification example of an image picture of a button.

Figure 20:
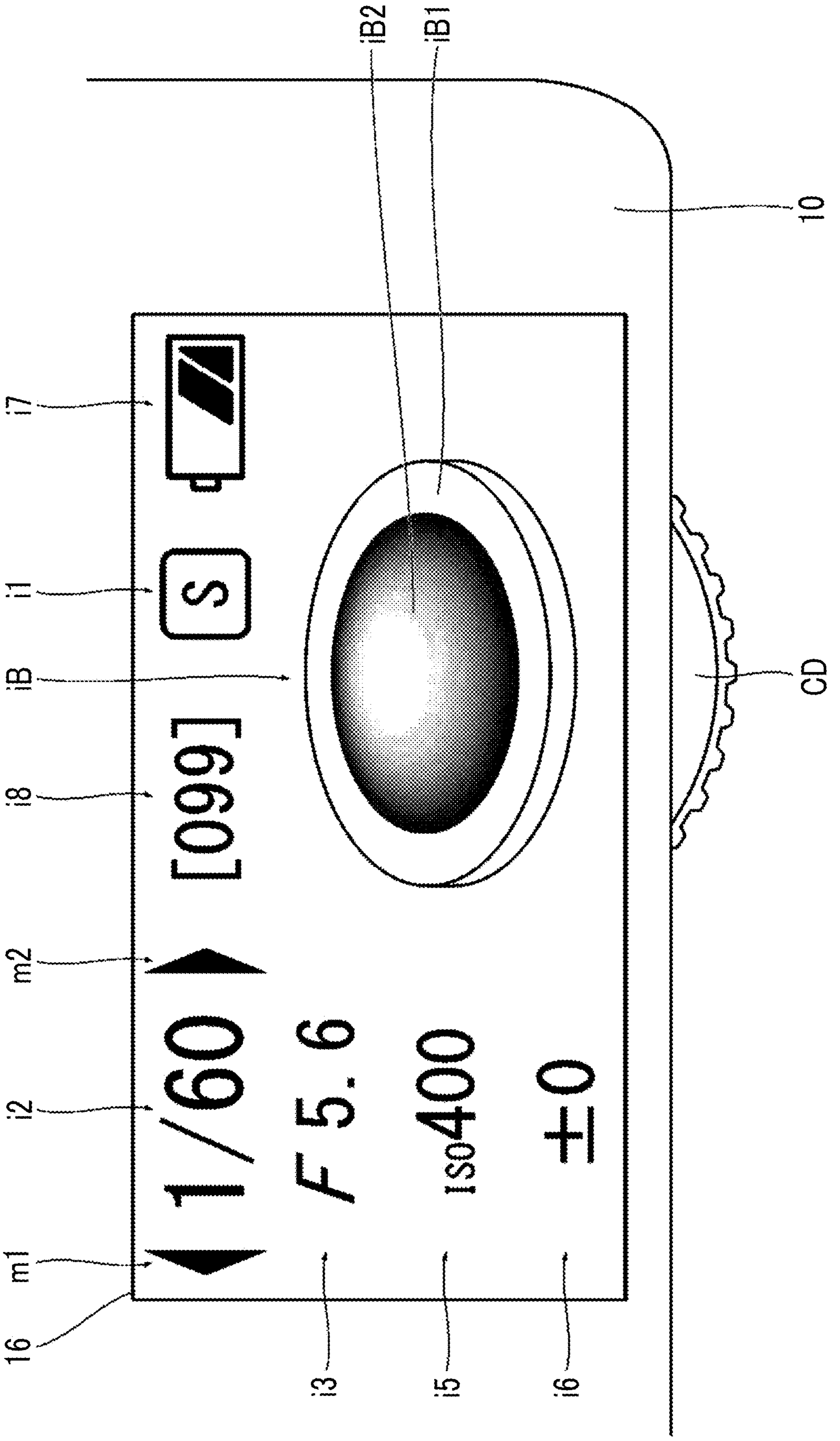

FIG. 20 is a diagram showing a modification example of the image picture of the button.

Figure 21:
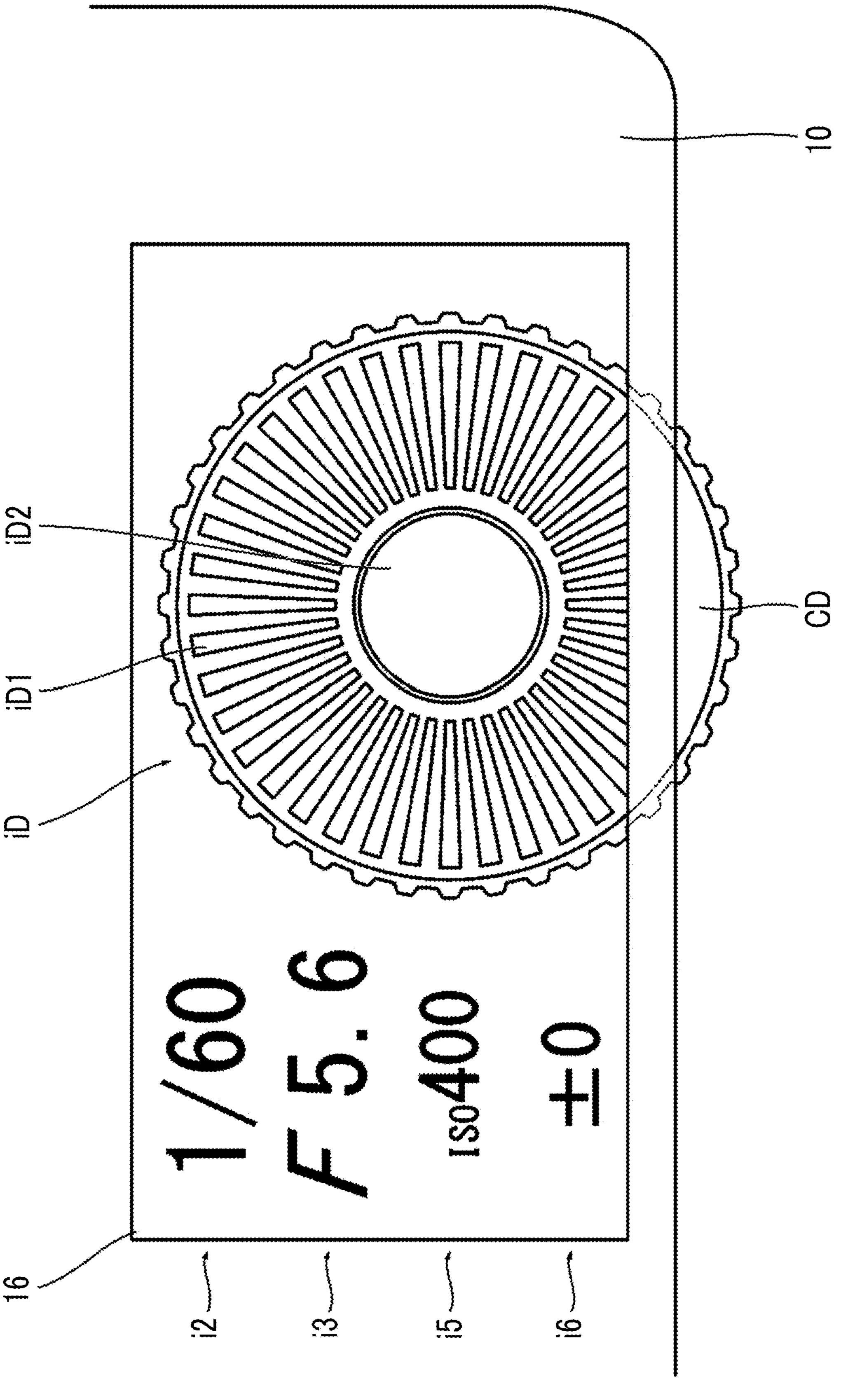

FIG. 21 is a plan view showing an example of the display on the sub-display.

Figure 22:
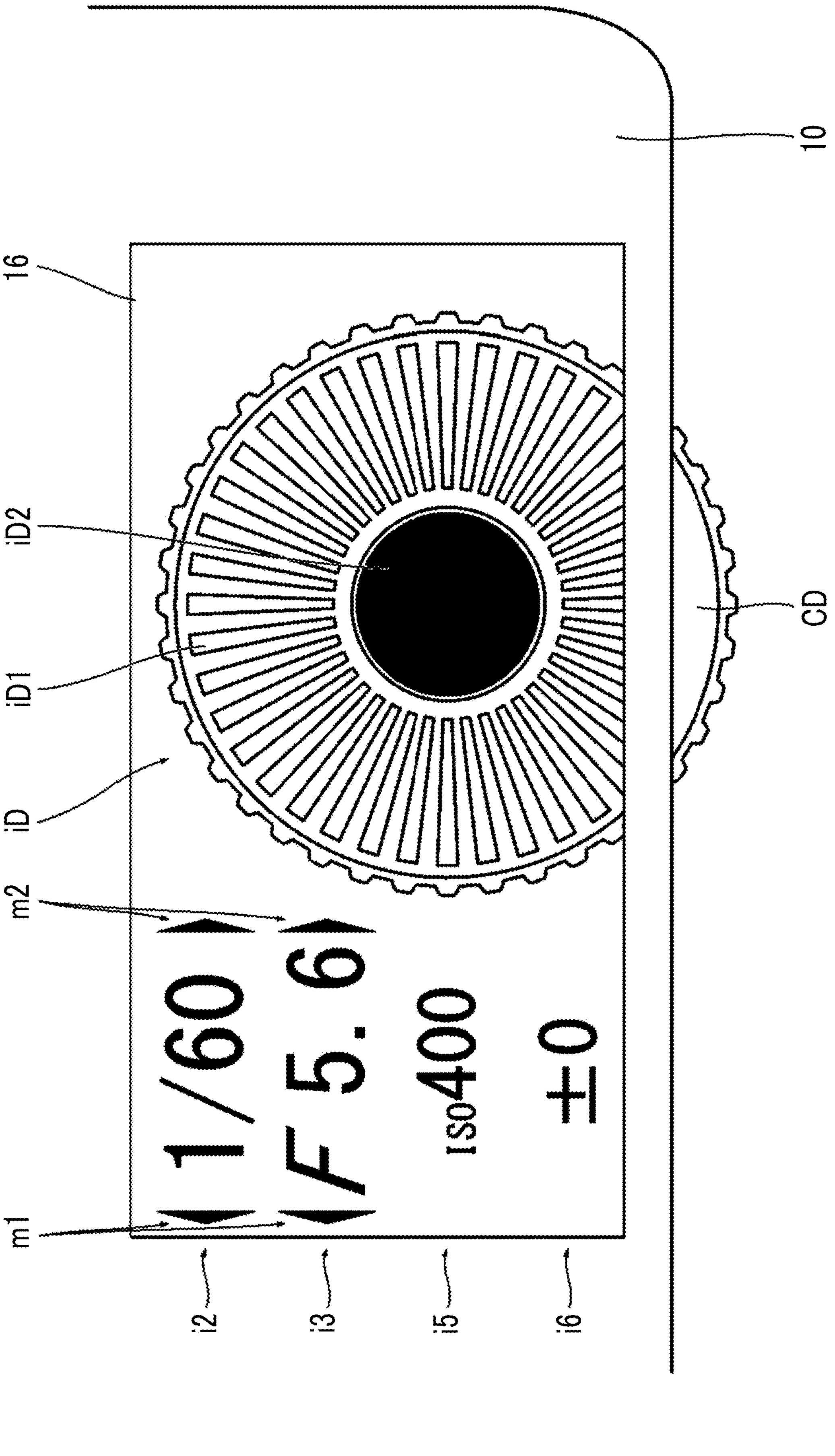

FIG. 22 is a plan view showing an example of the display on the sub-display.

Figure 23:
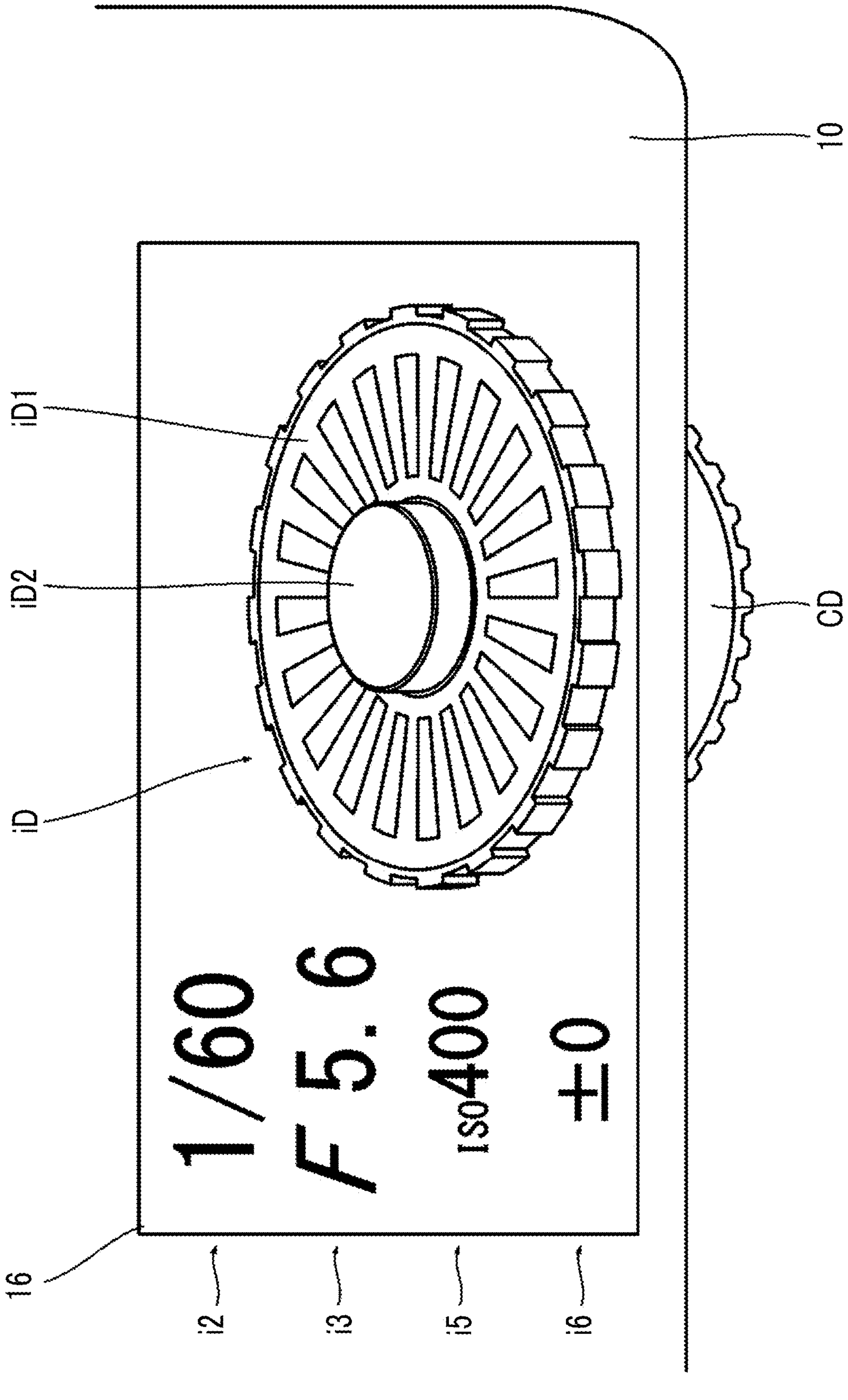

FIG. 23 is a diagram showing a modification example of an image picture of a dial.

Figure 24:
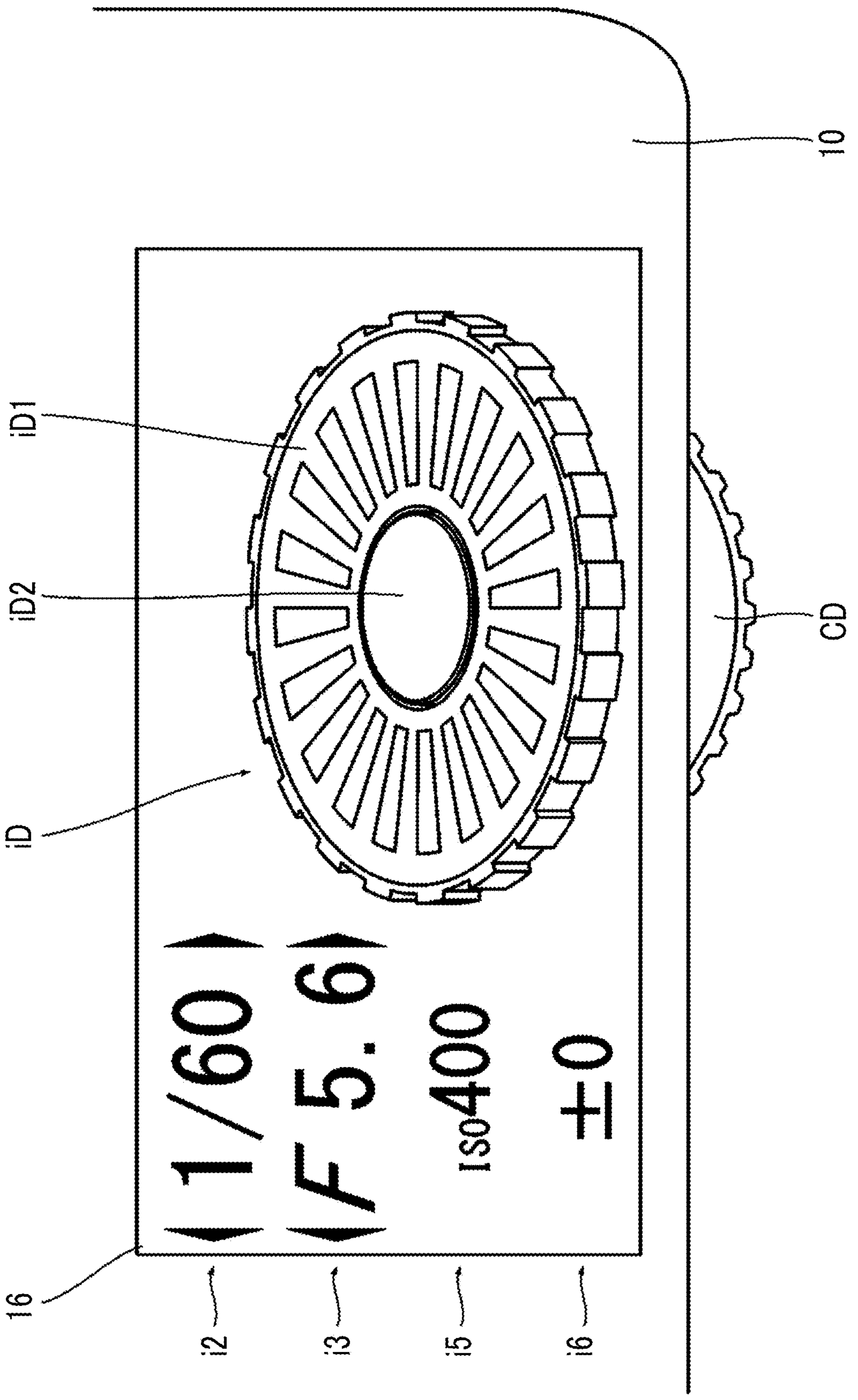

FIG. 24 is a diagram showing a modification example of the image picture of the dial.

Figure 25:
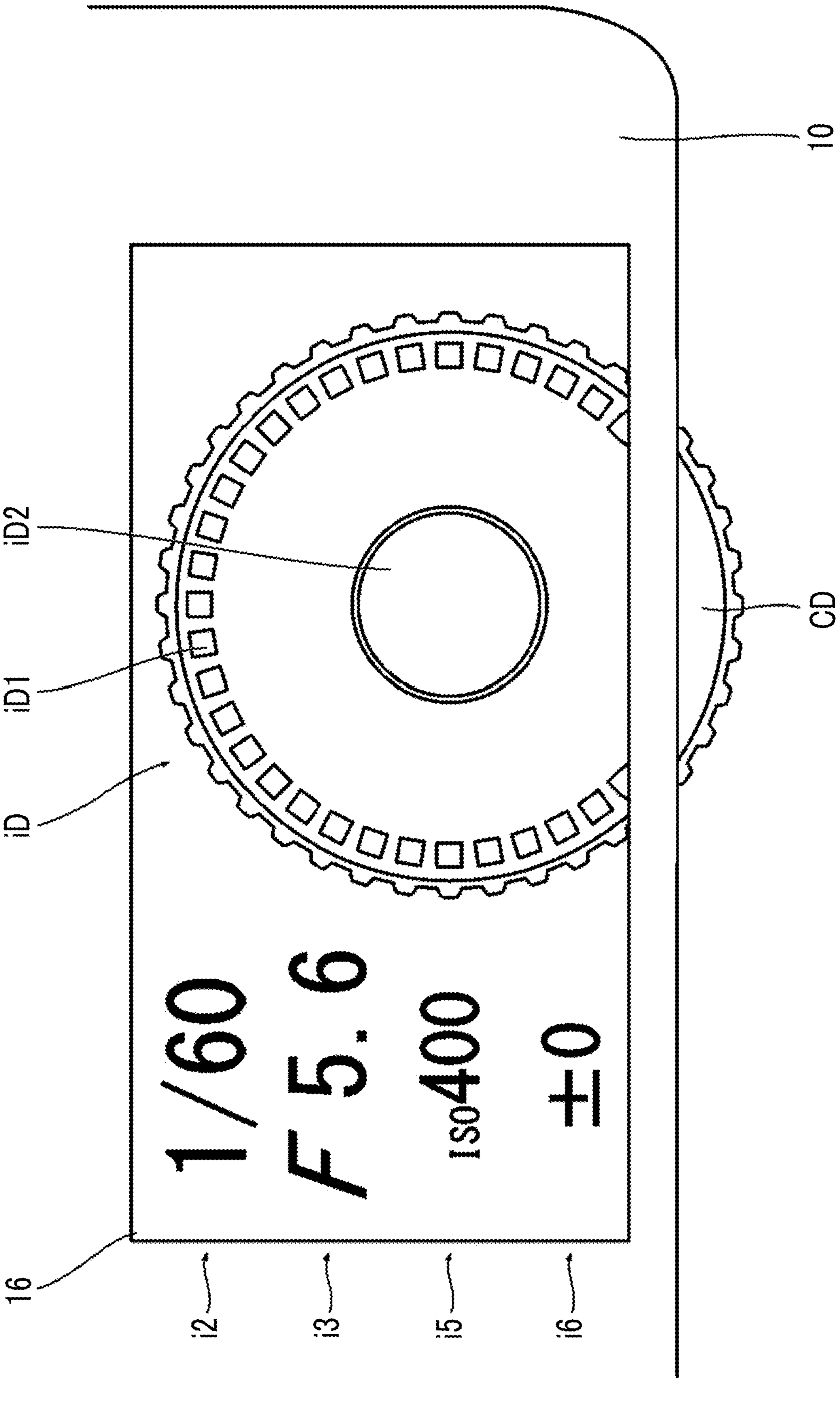

FIG. 25 is a plan view showing another example of the modification example of the image picture of the dial.

Figure 26:
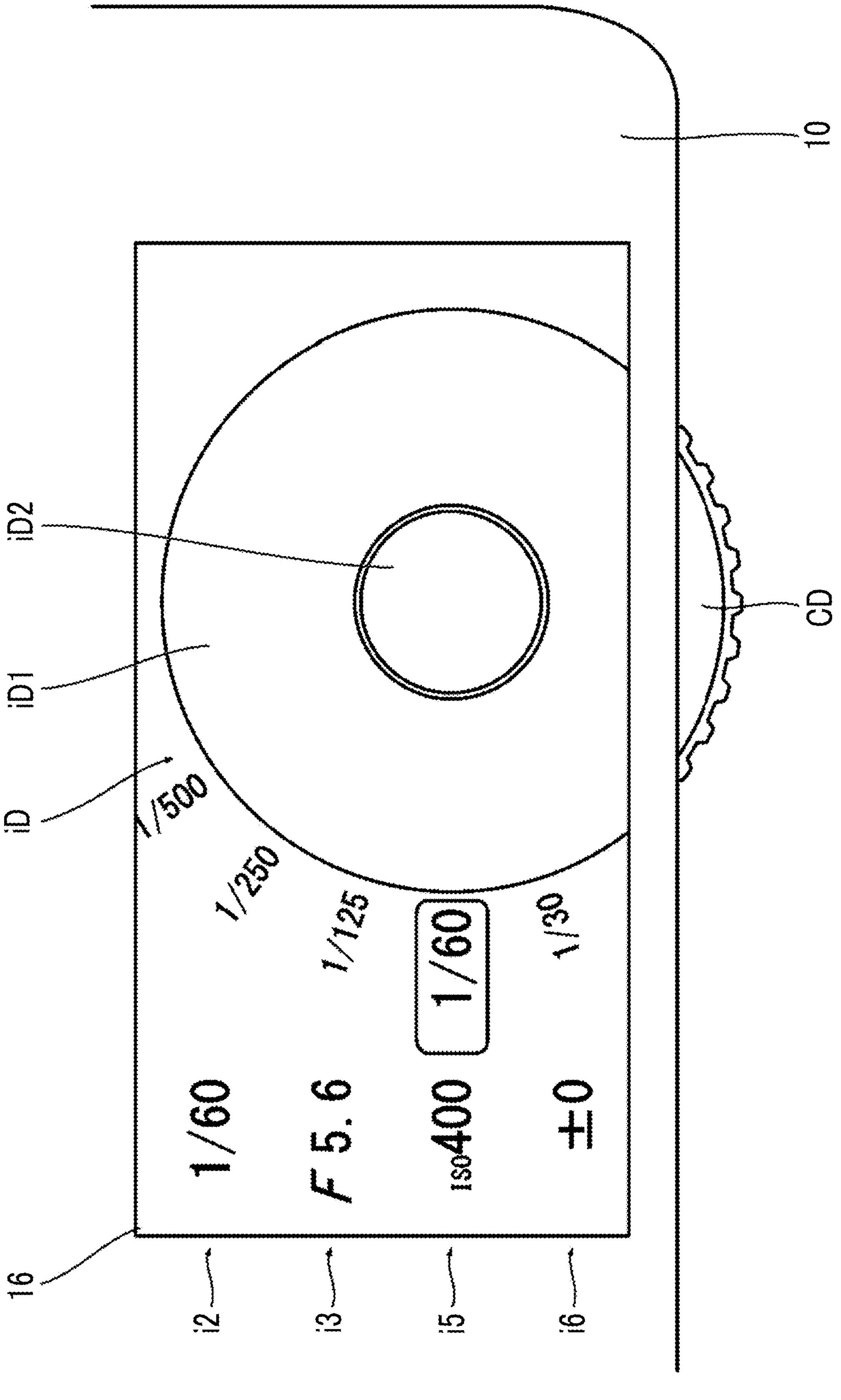

FIG. 26 is a diagram showing another example expressing a rotation operation of the command dial.

Figure 27:
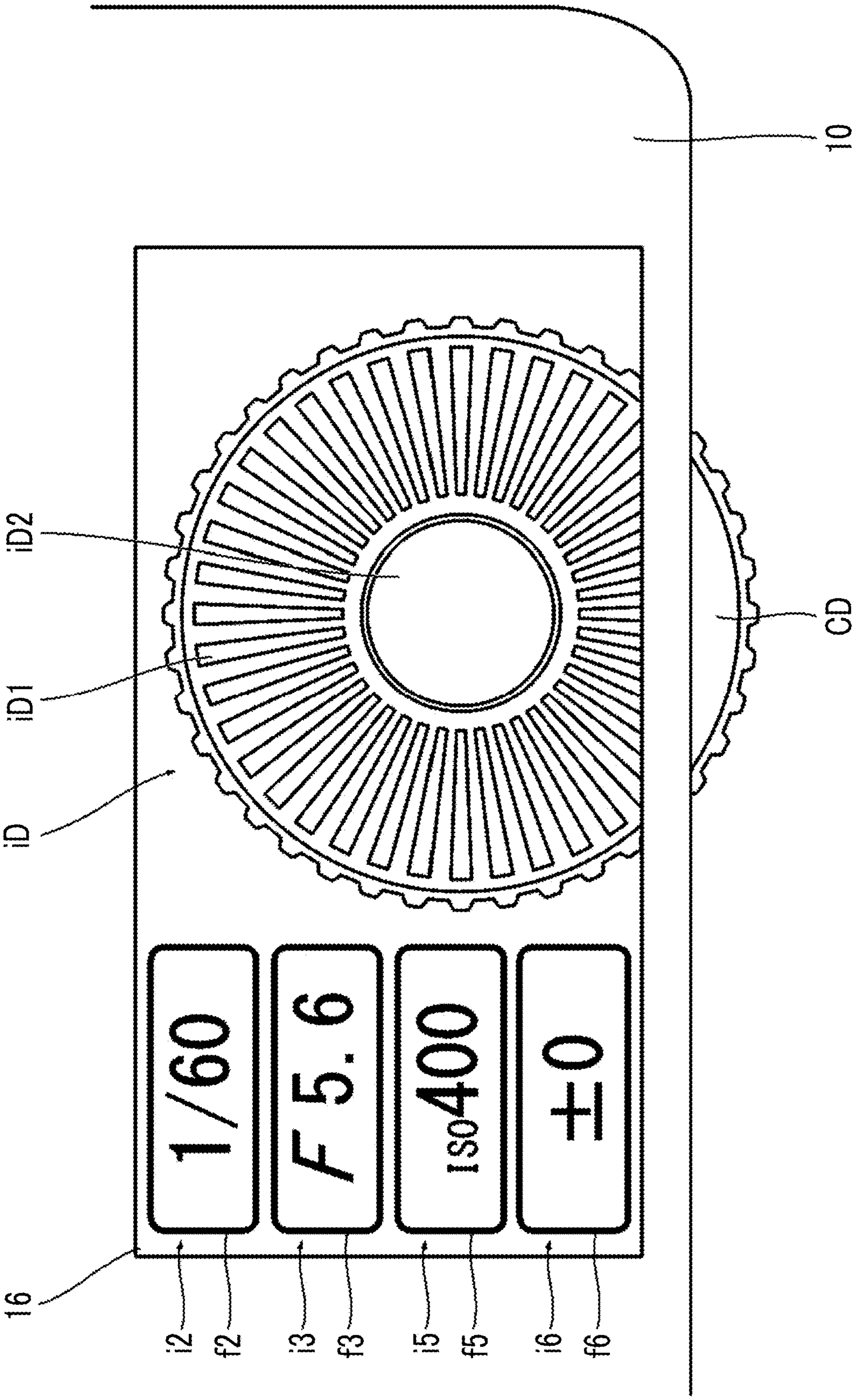

FIG. 27 is a diagram showing a modification example of a display form of setting contents of the camera.

Figure 28:
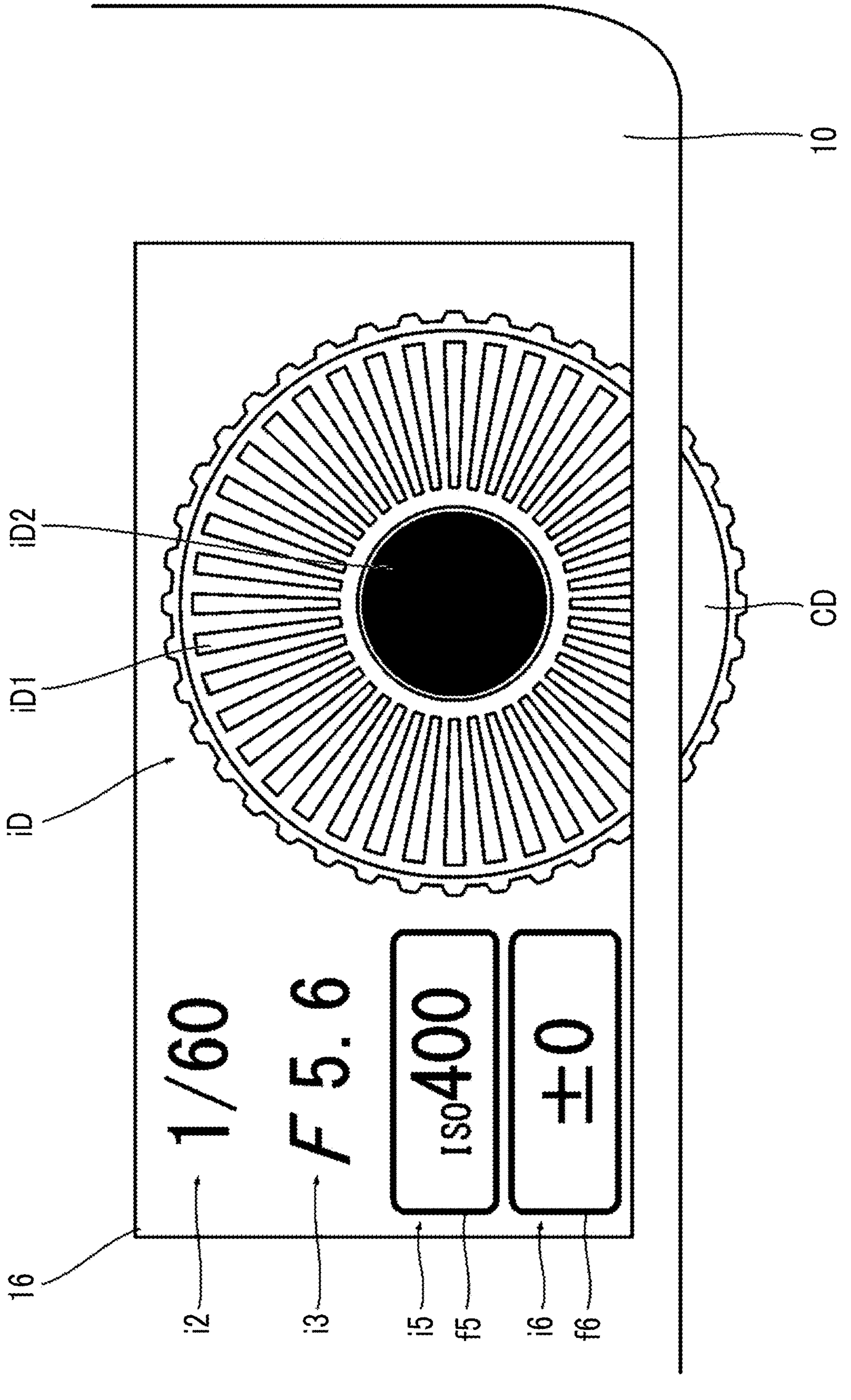

FIG. 28 is a diagram showing a modification example of the display form of the setting contents of the camera.

Figure 29:
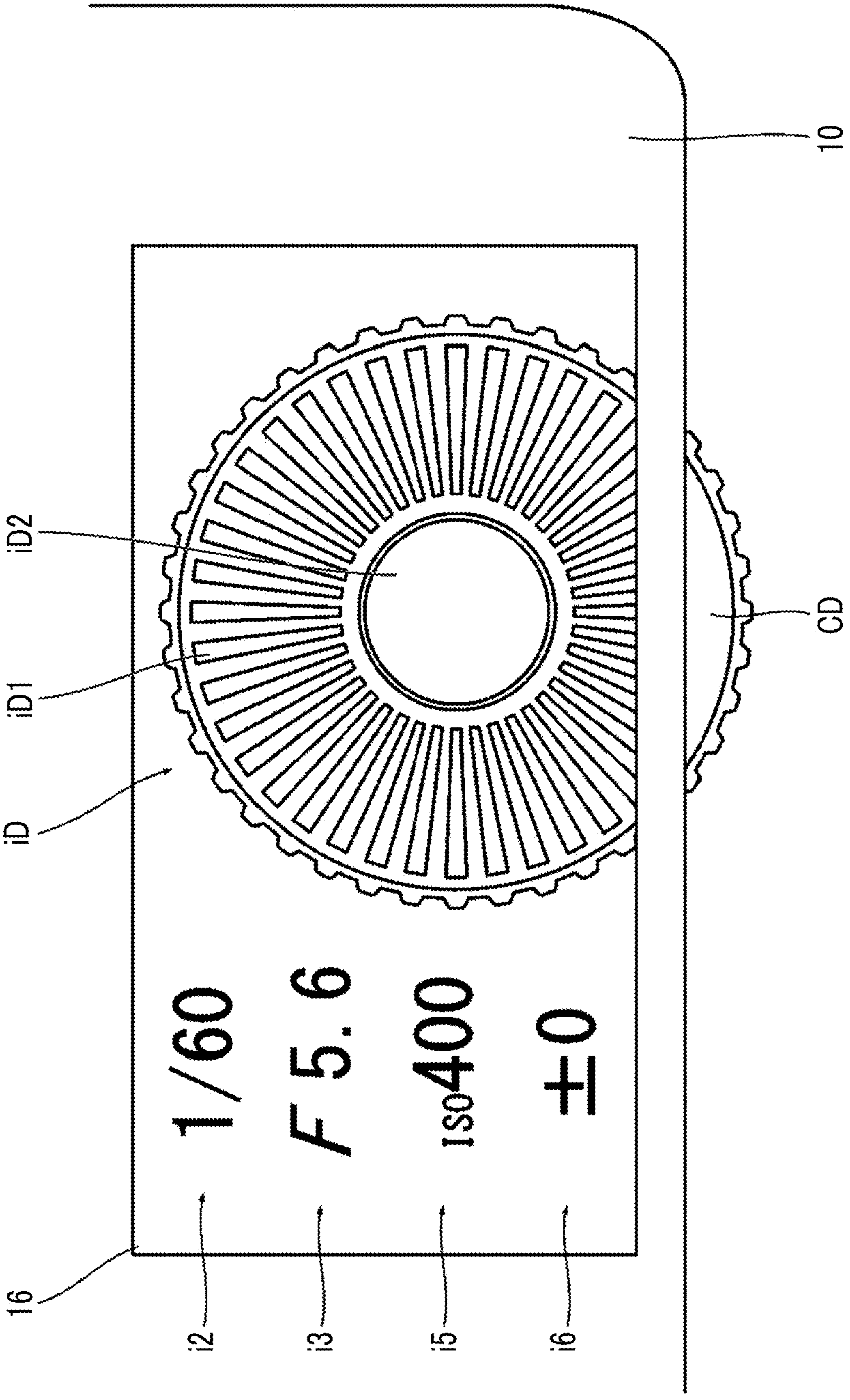

FIG. 29 is a diagram showing another modification example of the display form of the setting contents of the camera.

Figure 30:
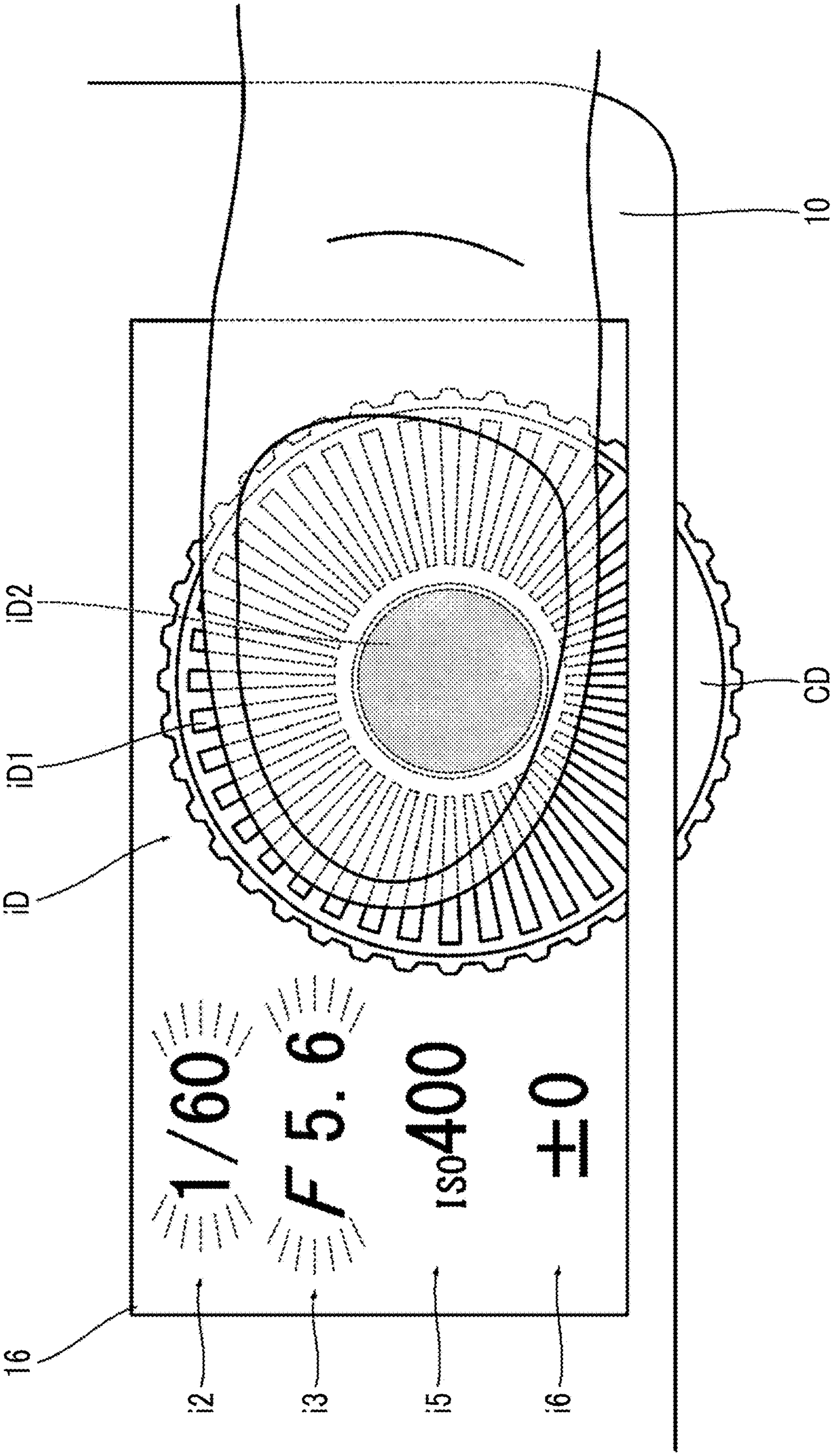

FIG. 30 is a diagram showing still another modification example of the display form of the setting contents of the camera.

Figure 31:
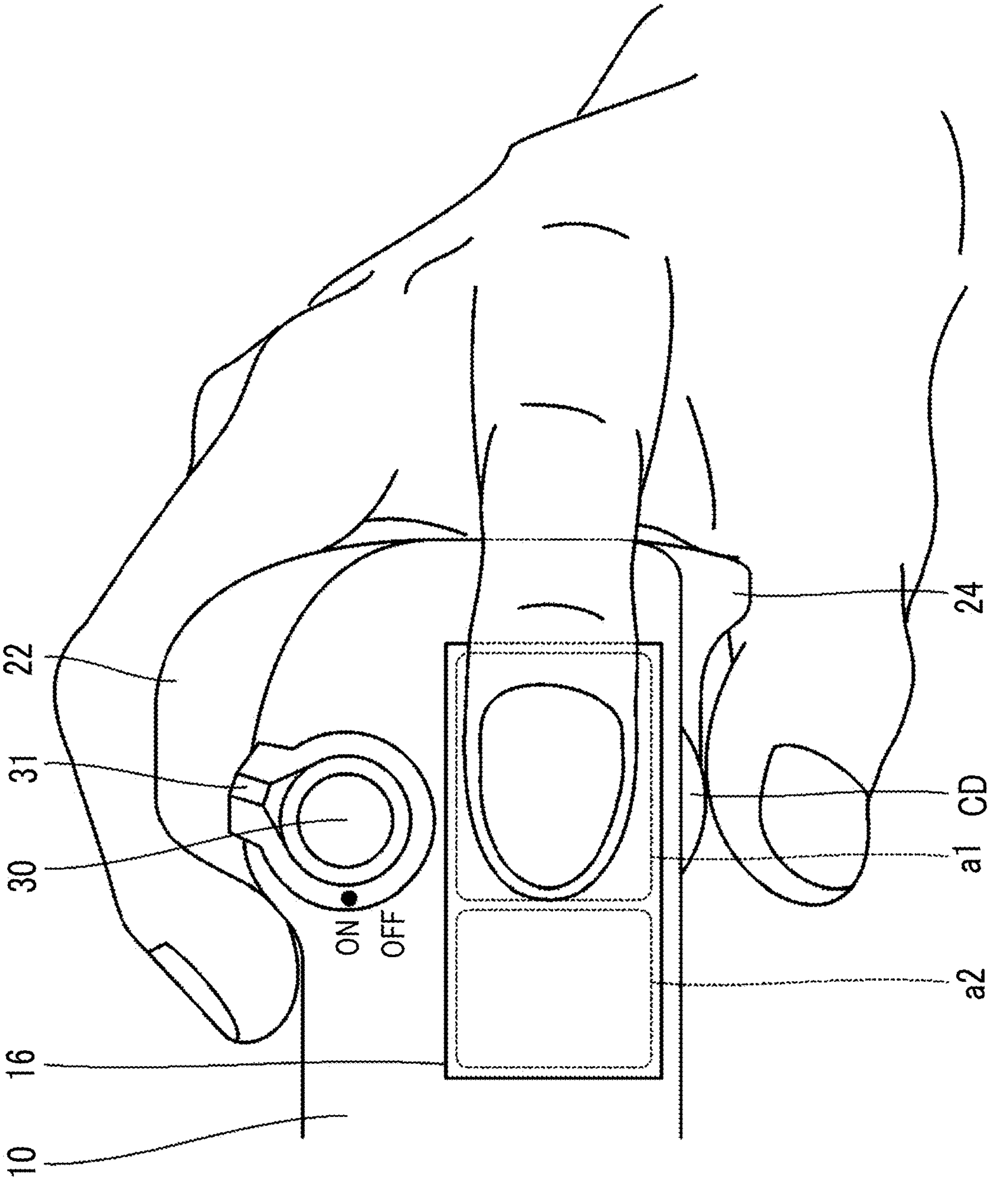

FIG. 31 is a plan view showing a disposition of a finger of a hand operating the command dial.

Figure 32:
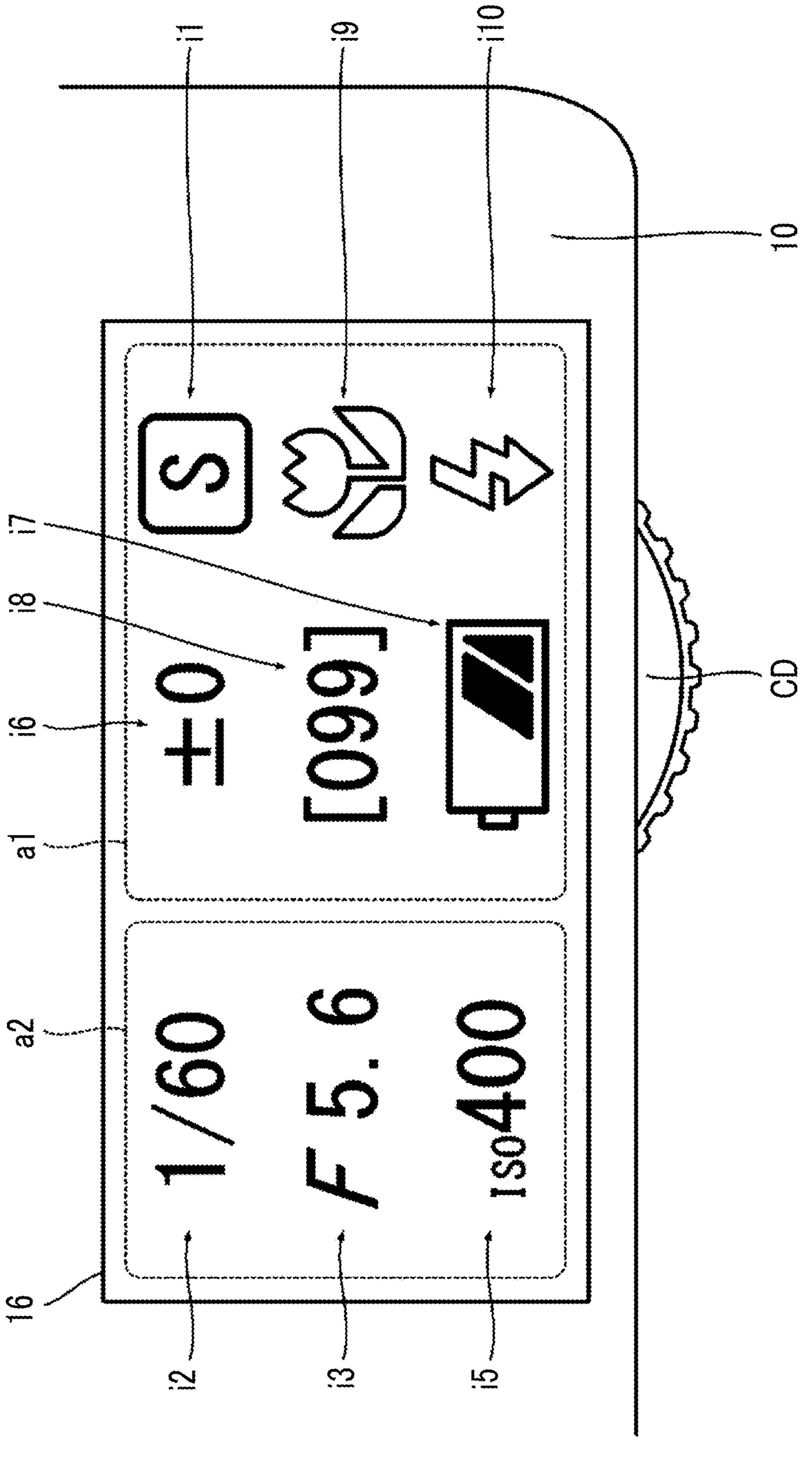

FIG. 32 is a plan view showing an example of the display on the sub-display.

Figure 33:
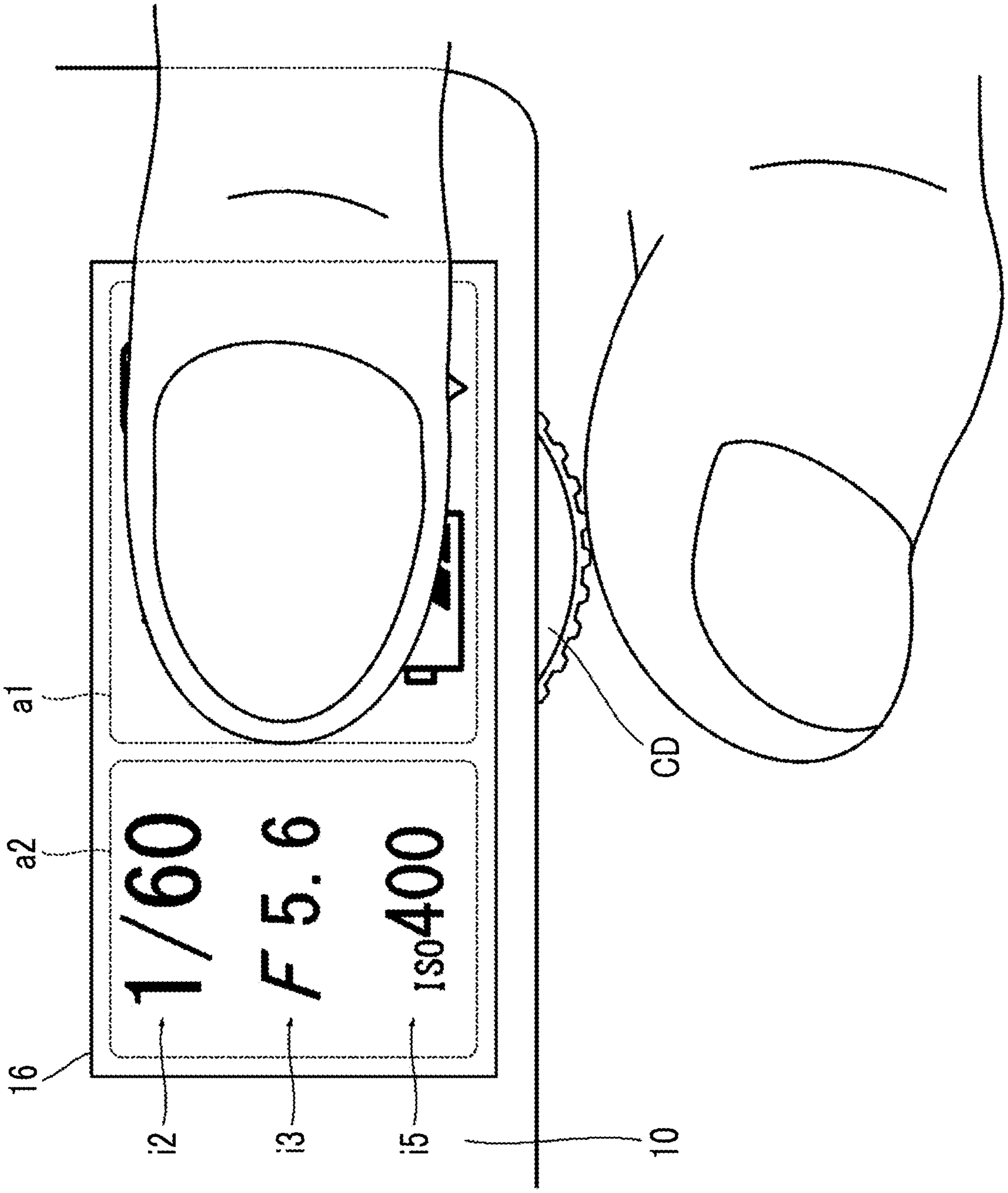

FIG. 33 is a plan view showing a relationship between the finger of the hand operating the command dial and the display on the sub-display.

Figure 34:
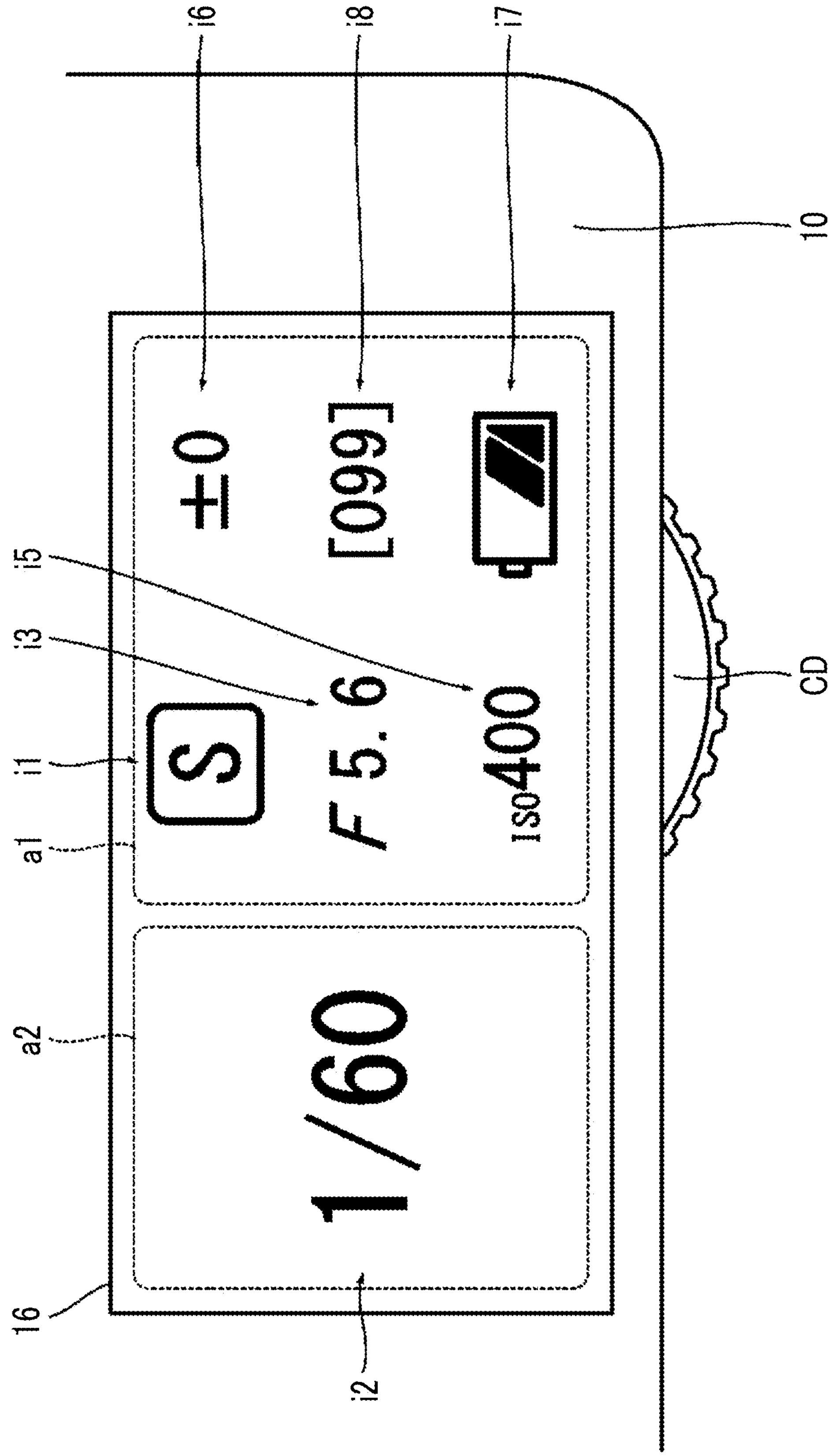

FIG. 34 is a plan view showing an example of the display on the sub-display in a case where information on a setting value of an item to be changed in the setting by the command dial is displayed in a region not covered by the finger.

Figure 35:
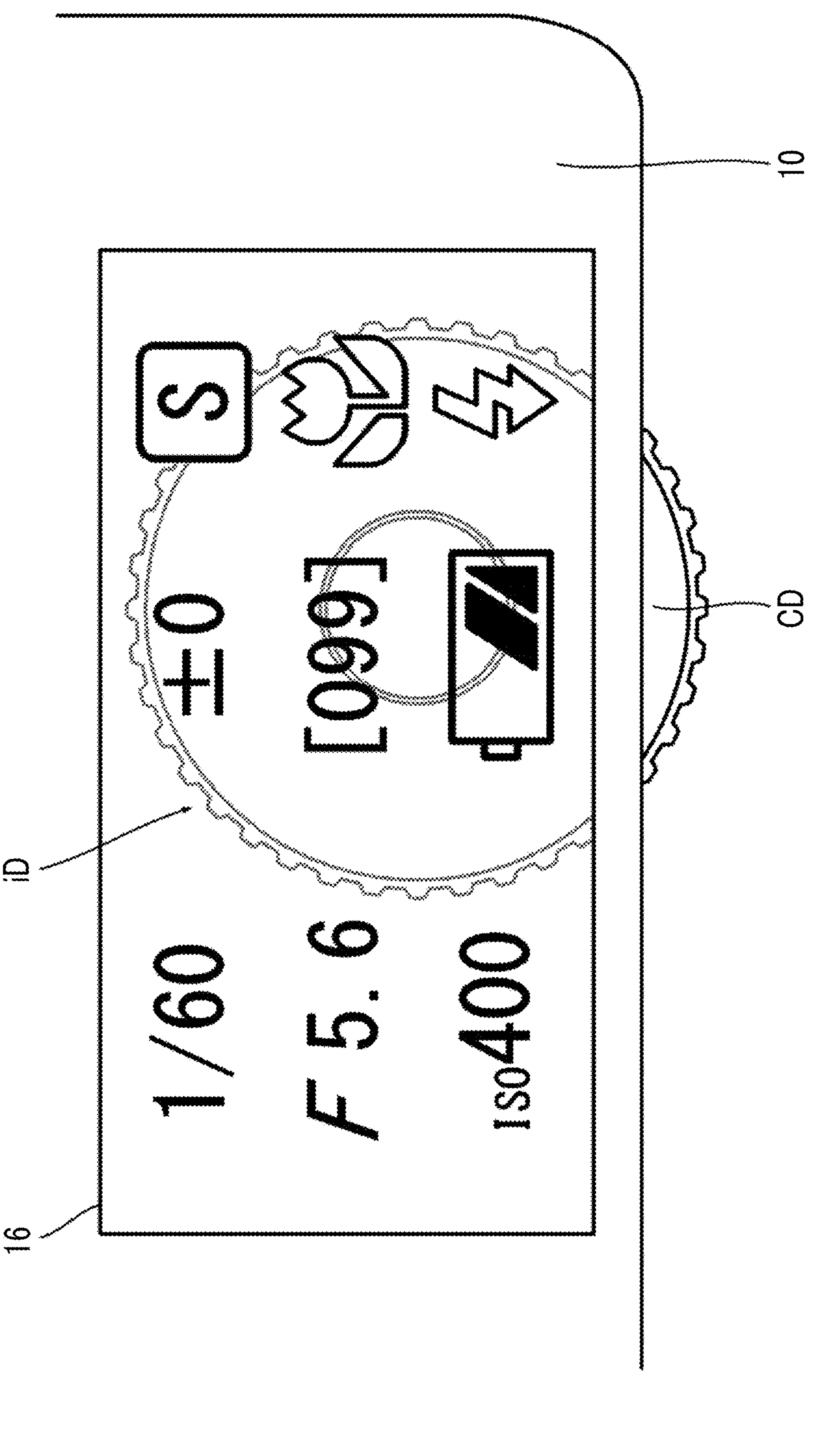

FIG. 35 is a plan view showing a modification example of the display on the sub-display.

Figure 36:
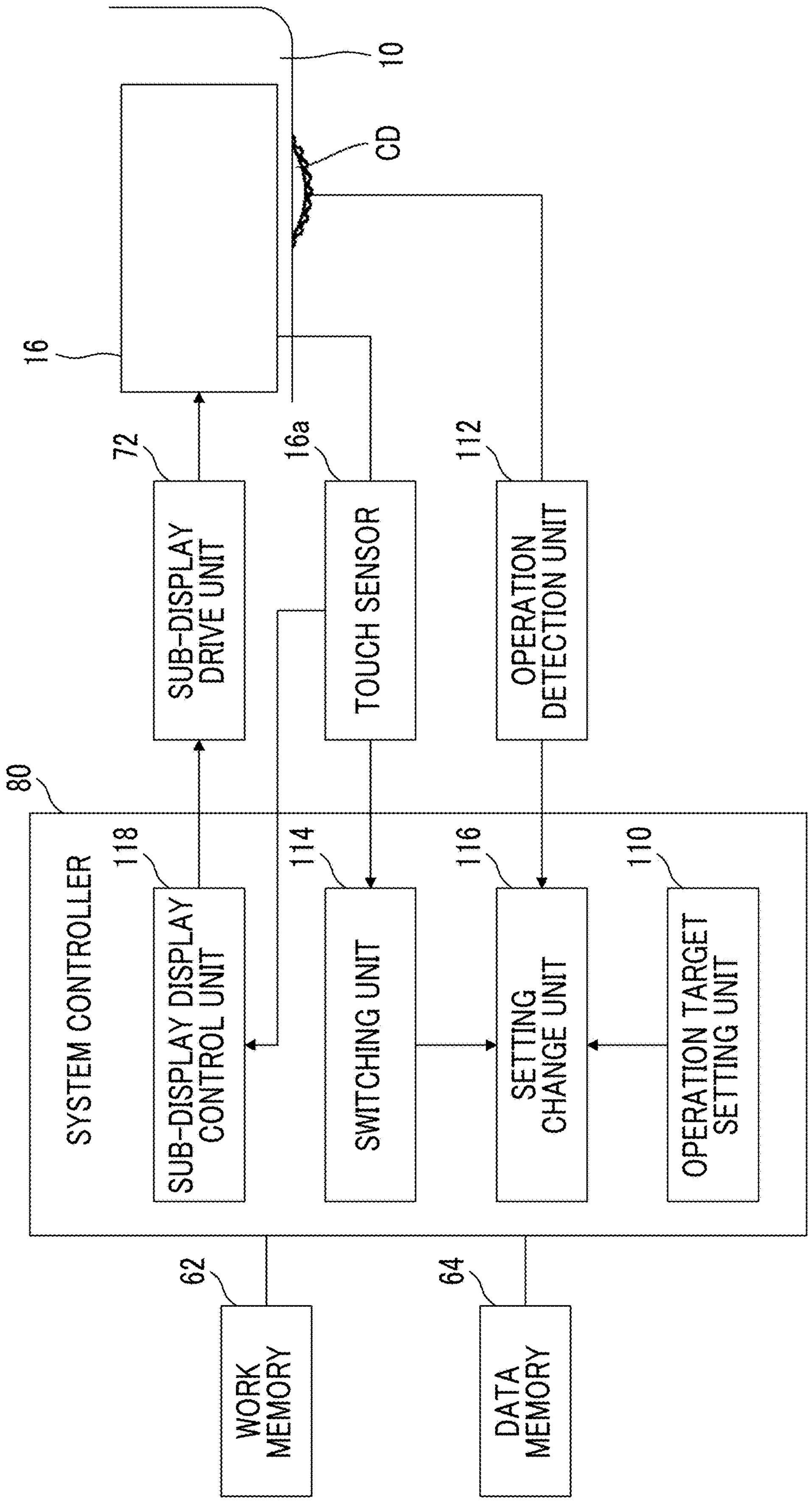

FIG. 36 is a block diagram showing a system configuration of an operation system by using the command dial in the digital camera of the embodiment.

Figure 37:
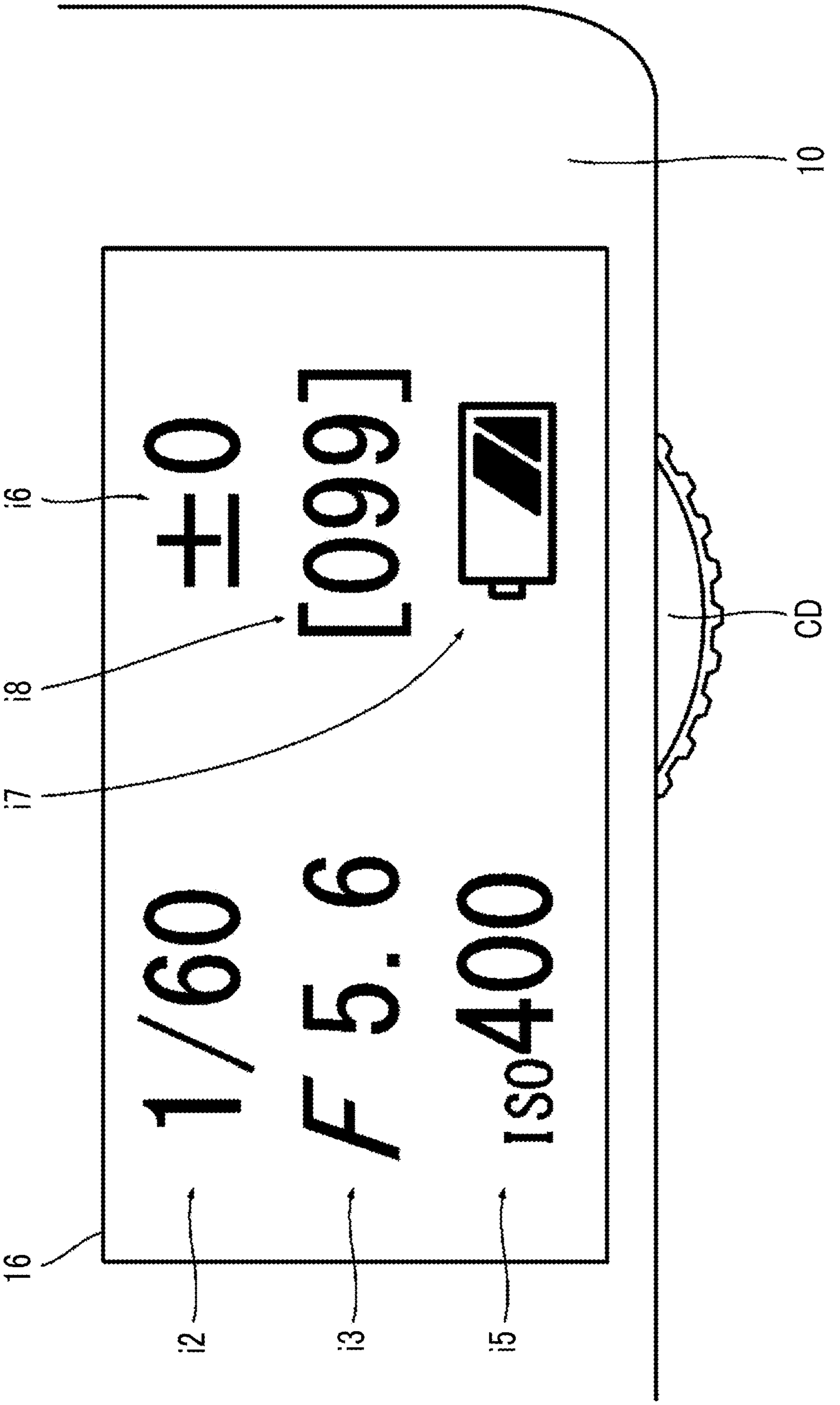

FIG. 37 is a plan view showing an example of the display on the sub-display.

Figure 38:
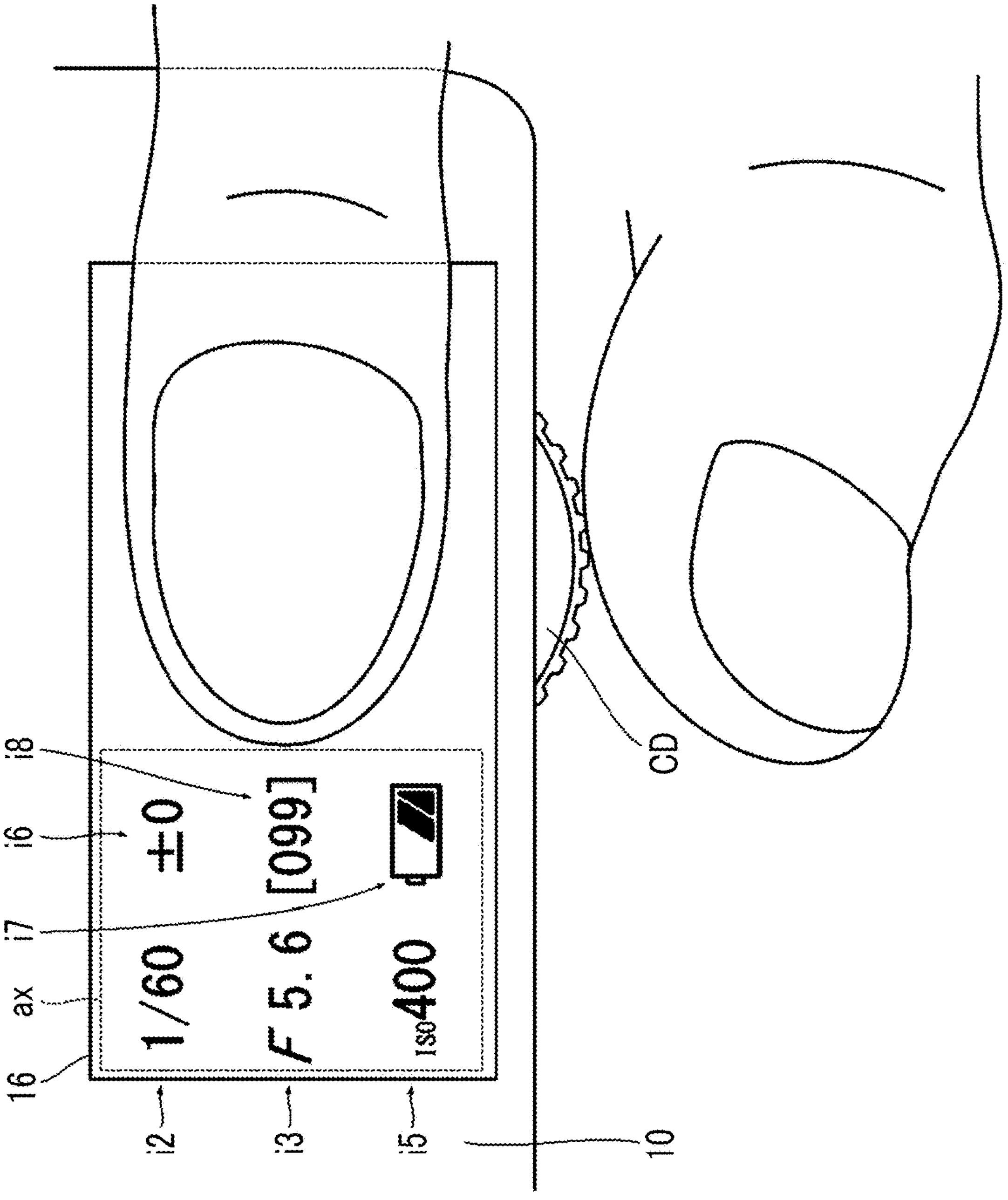

FIG. 38 is a plan view showing an example of the display on the sub-display.

Figure 39:
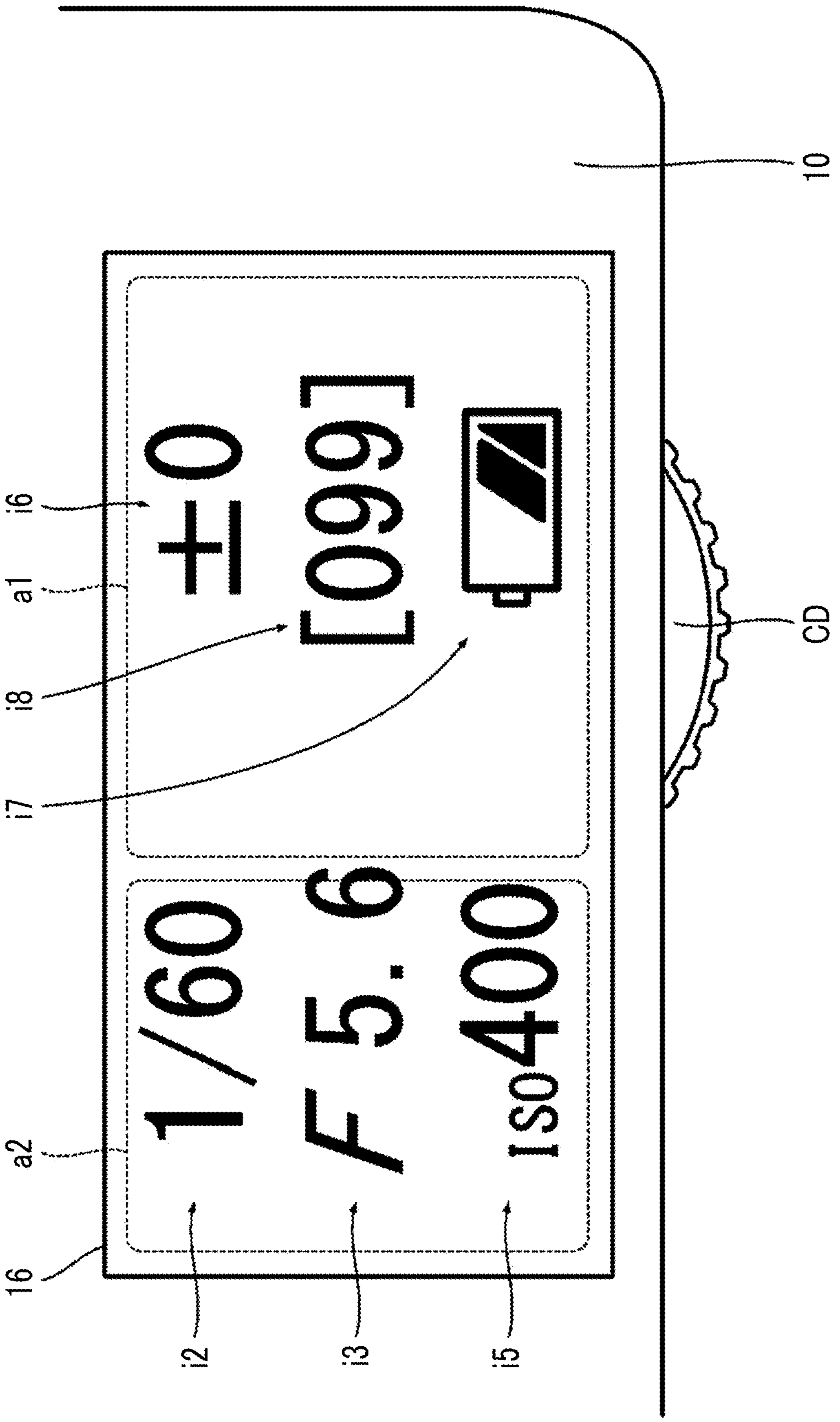

FIG. 39 is a plan view showing an example of the display on the sub-display.

Figure 40:
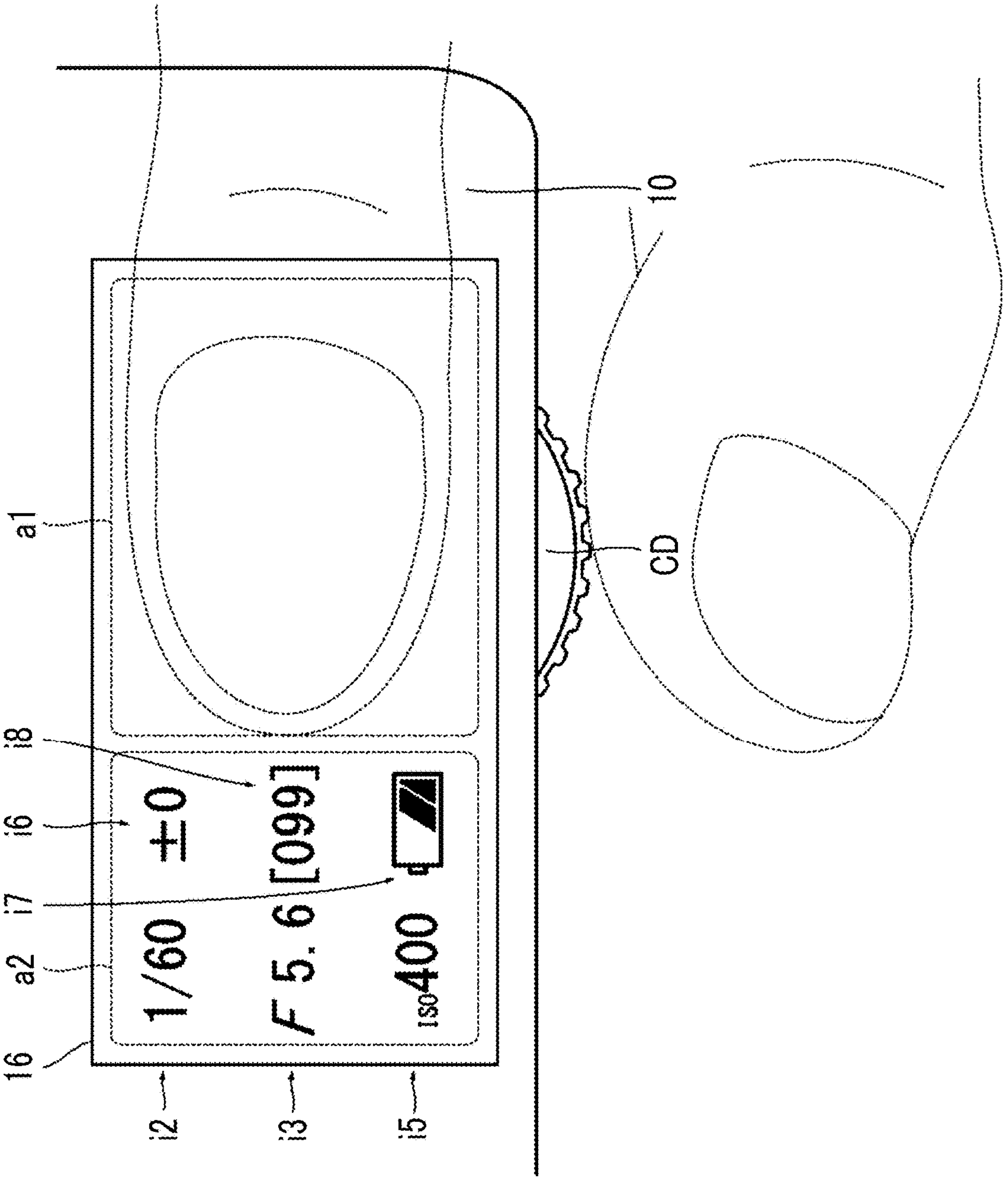

FIG. 40 is a plan view showing an example of the display on the sub-display.

Figure 41:
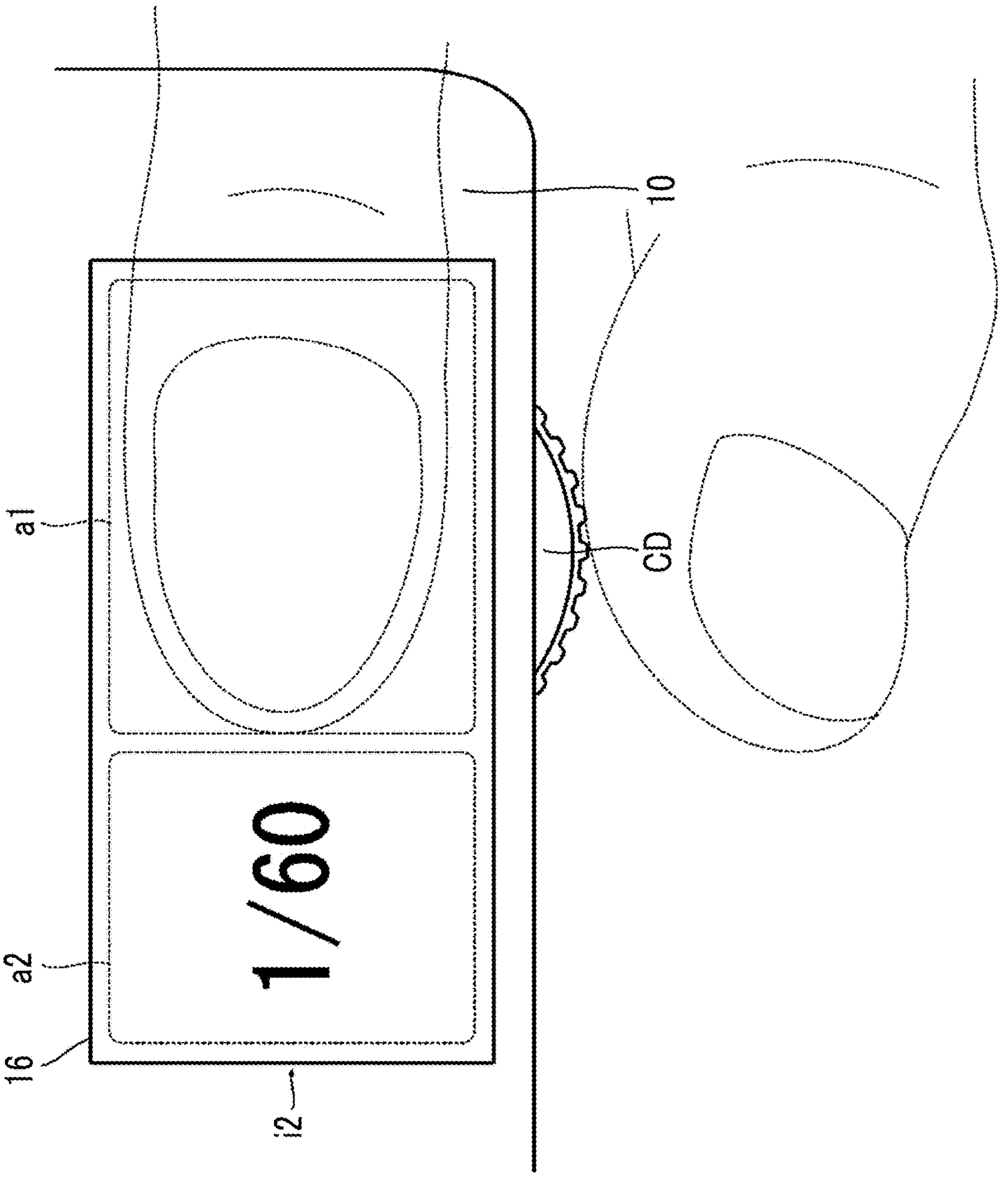

FIG. 41 is a plan view showing an example of the display on the sub-display in a case where only the setting value of the item to be changed in the setting by the command dial is displayed.

DESCRIPTION OF THE PREFERRED EMBODIMENTS

A preferred embodiment of the invention will be described in detail below with reference to accompanying drawings.

First Embodiment

[Appearance]

Figure 1:
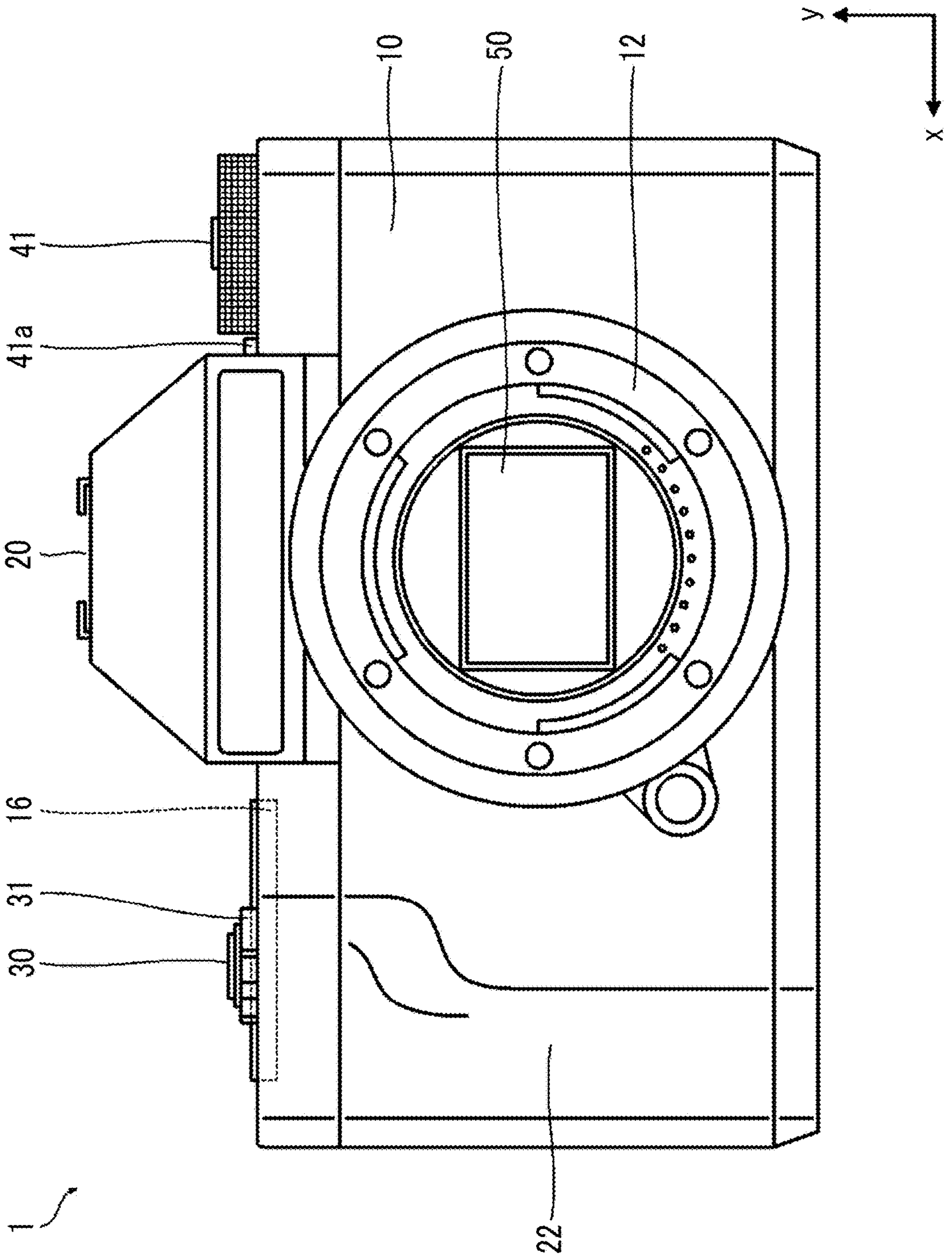
FIG. 1 is a front view showing an example of a digital camera.
Figure 2:
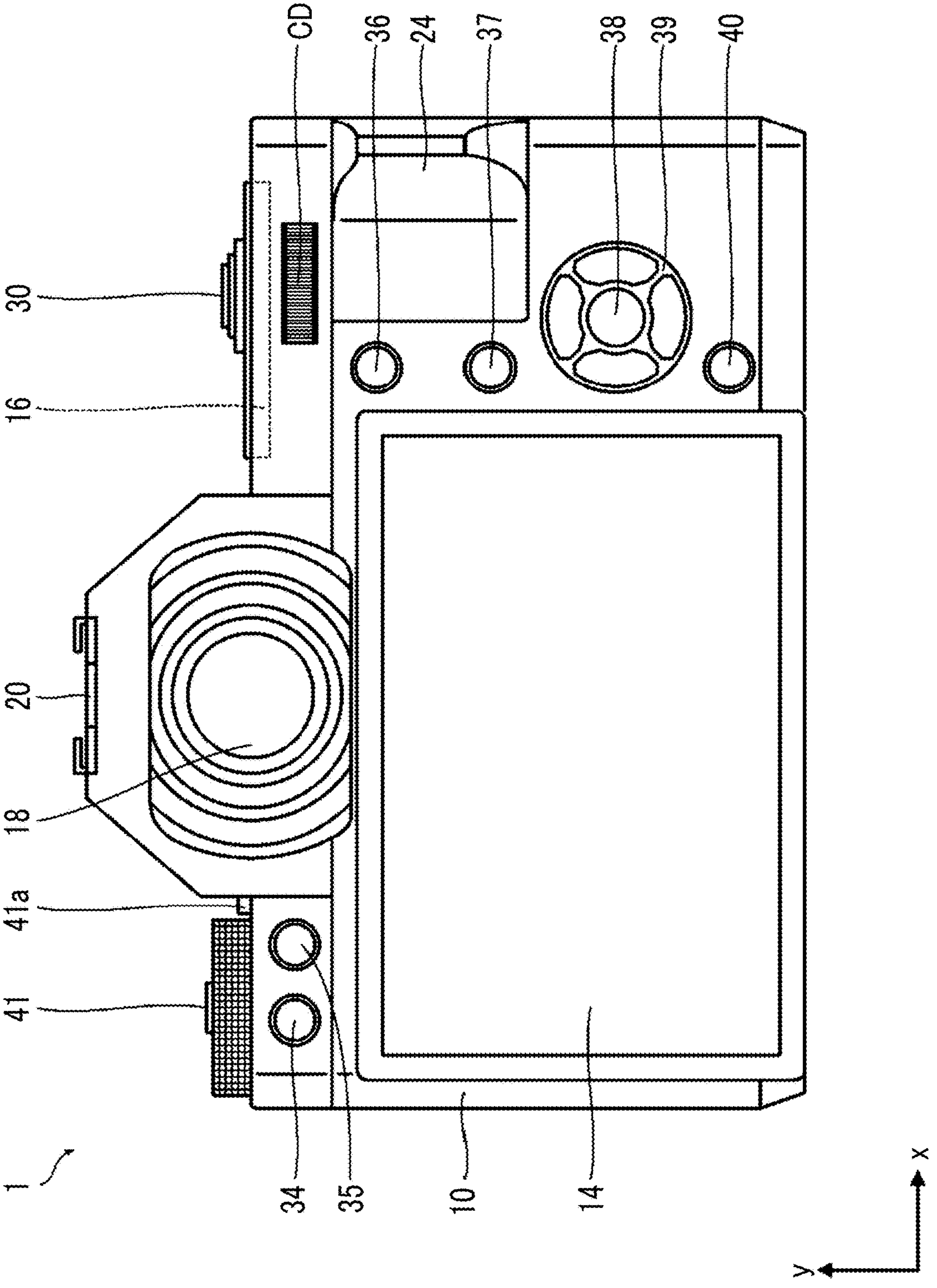
FIG. 2 is a back view showing an example of the digital camera.
Figure 3:
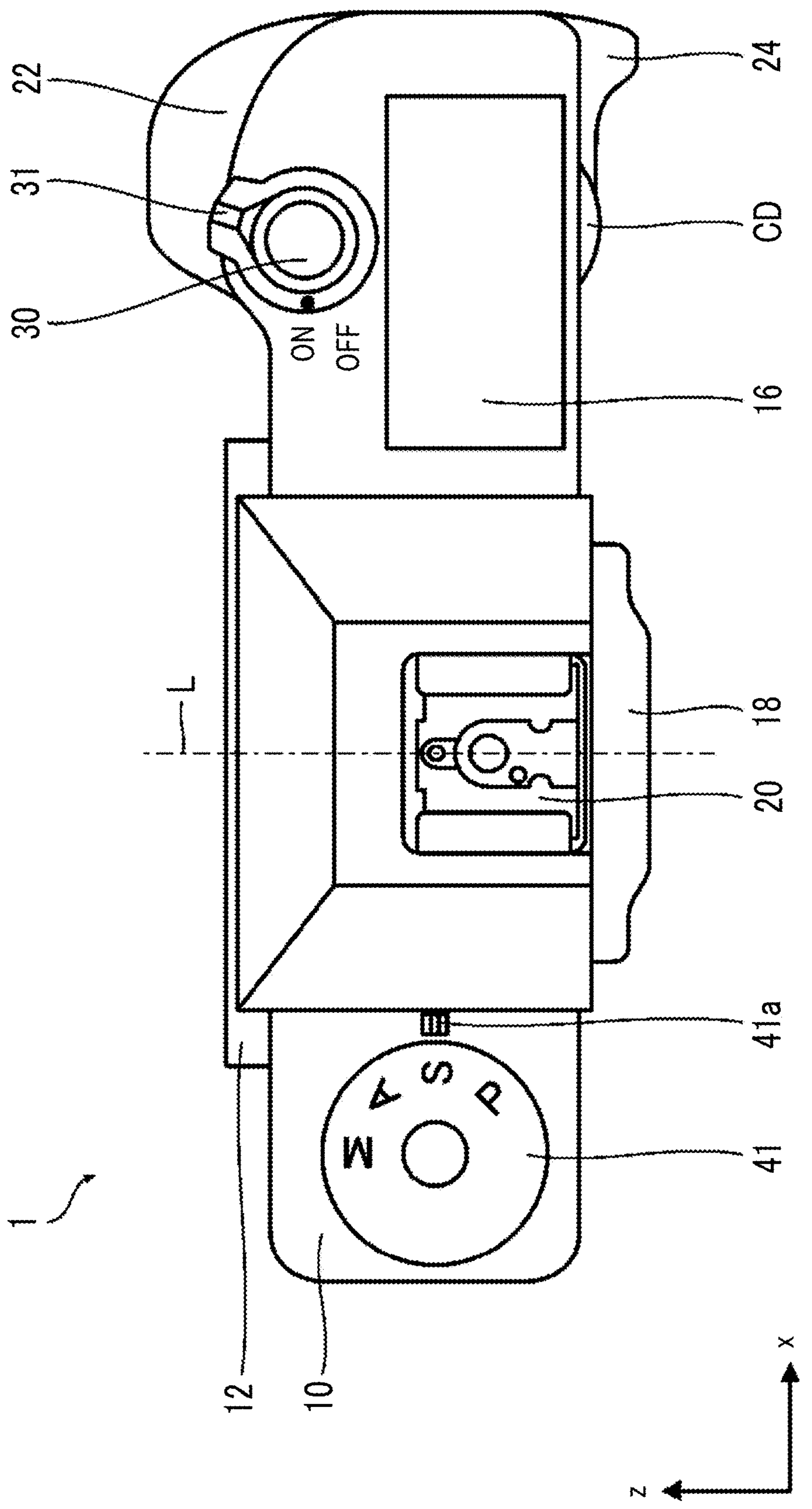
FIG. 3 is a plan view showing an example of the digital camera.

FIGS. 1, 2, and 3 are a front view, a back view, and a plan view, respectively, showing an example of a digital camera to which the invention is applied.

In this specification, a direction along an optical axis L (a z direction in FIG. 3) is referred to as a front-rear direction and a subject side is referred to as a front direction. Further, on a plane orthogonal to the optical axis L, a direction along a long side of an image sensor 50 (an x direction in FIG. 1) is referred to as a lateral direction or a left-right direction and a direction along a short side of the image sensor 50 (a y direction in FIG. 1) is referred to as a vertical direction or an up-down direction.

A digital camera 1 of this embodiment is a lens-interchangeable digital camera, and is a non-reflex digital camera. The lens-interchangeable digital camera is a digital camera of which a lens can be interchanged. The non-reflex digital camera is a digital camera not including a reflex mirror for guiding incident light from a lens to an optical viewfinder, and is also referred to as a mirrorless digital camera.

Figure 4:
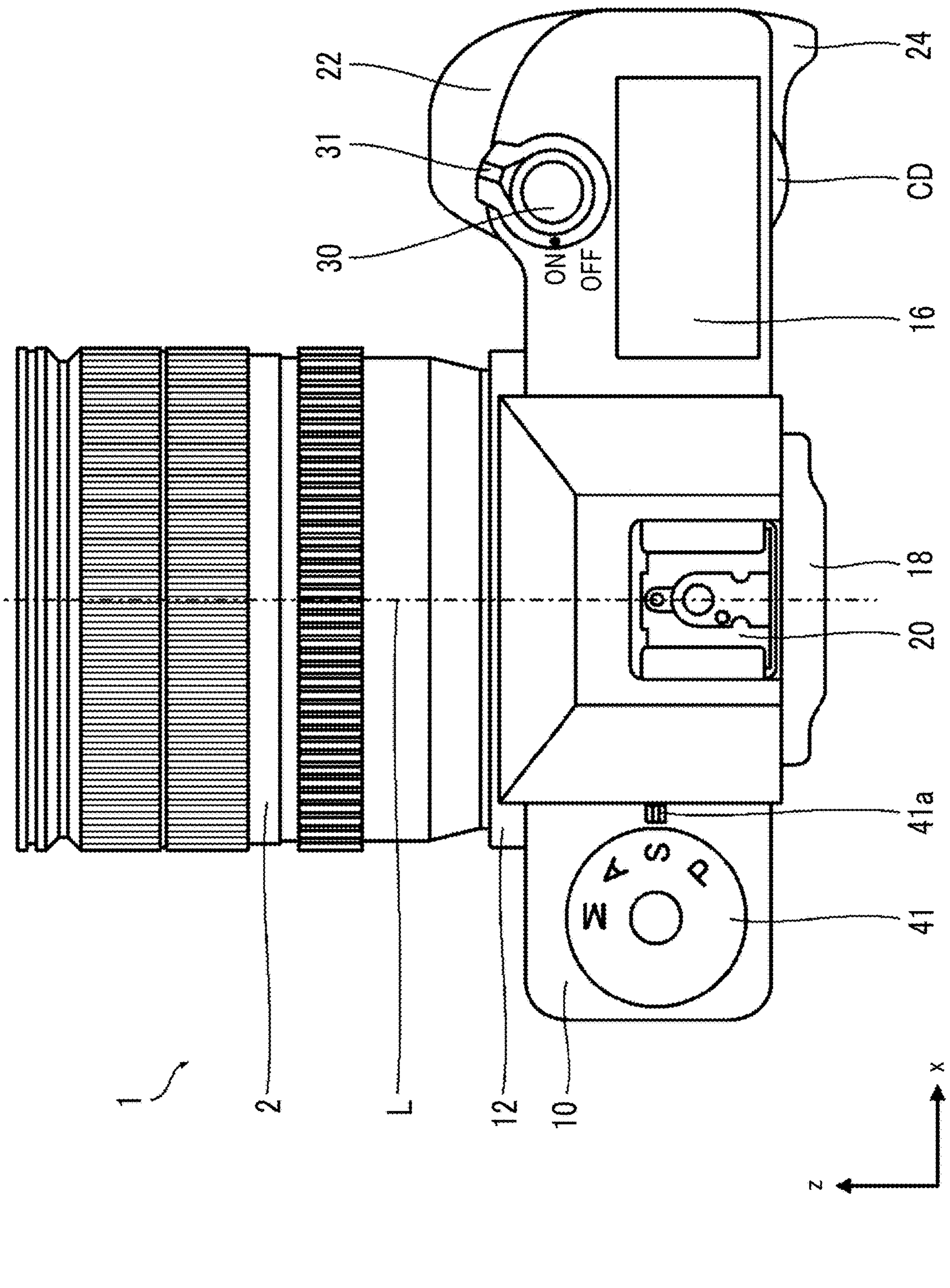
FIG. 4 is a plan view of the digital camera on which a lens is mounted.

FIG. 4 is a plan view of the digital camera on which a lens is mounted. As shown in FIG. 4, the digital camera 1 of this embodiment is used in a state in which a lens 2 is mounted on a camera body 10.

As shown in FIGS. 1 to 4, the camera body 10 is provided with a lens mount 12, a main-display 14, a sub-display 16, an electronic view finder 18, a hot shoe 20, and the like. Further, a shutter button 30, a power supply lever 31, a playback button 34, a delete button 35, an AF lock button 36, an AE lock button 37, a menu button 38, selector buttons 39, a display button 40, a mode dial 41, a command dial CD, and the like are provided as operation members.

«Camera Body»

The camera body 10 has the shape of a rectangular box that is thin in the front-rear direction. One (left side in FIG. 1) end portion of the camera body 10 is formed as a grip portion. A user grips the grip portion to perform a release operation. The grip portion is provided with a grip 22 on the front surface side and a thumb rest 24 on the back surface side.

«Lens Mount»

The lens mount 12 is a mounting portion for the lens 2. As shown in FIG. 1, the lens mount 12 is provided on the front surface of the camera body 10. The lens 2 is mounted on the lens mount 12 attachably and detachably. The lens mount 12 is formed of a bayonet type.

«Main-Display»

The main-display 14 is a display mainly used for the display of an image. The main-display 14 is provided on the back surface of the camera body 10 as shown in FIG. 2. The main-display 14 is formed of, for example, a color liquid crystal display (LCD).

As described above, the main-display 14 is mainly used for the display of the image. The image to be displayed includes a live view image in addition to an imaged image. The live view is a function of displaying an image captured by an image sensor in real time. It is possible to confirm the angle of view, a focus state, and the like on the main-display by performing the live view.

Further, the main-display 14 is also used as a graphical user interface (GUI). That is, in a case where various settings are performed, a setting screen is displayed on the main-display 14 and the various settings are performed on the setting screen.

«Sub-Display»

The sub-display 16 is a display mainly used for the display of setting contents of the camera. The sub-display 16 is formed of a display smaller than the main-display 14.

The sub-display 16 is provided on a top surface of the camera body 10 as shown in FIG. 3. In particular, in the digital camera 1 of the embodiment, the sub-display 16 is provided at an end portion on a grip portion side on the top surface of the camera body 10. A display surface of the sub-display 16 configures a part of the top surface of the camera body 10.

The display surface of sub-display 16 has a rectangular shape, and the short side thereof is disposed in parallel to the optical axis L. More specifically, the short side thereof is disposed along the front-rear direction (z direction), and the long side thereof is disposed along the lateral direction (x direction).

The sub-display 16 is formed of a so-called touch panel. That is, the sub-display 16 has a structure of combining a display with a sensor (touch sensor) that detects contact with the display surface of the display. Therefore, in the digital camera of the embodiment, the display portion of the sub-display 16 configures the display section and a sensor portion (touch sensor) configures a contact detection unit. The display portion is formed of, for example, a reflective LCD.

As described above, the sub-display 16 displays the setting contents of the digital camera 1. Specific display contents will be described below.

«Electronic View Finder»

The electronic view finder (EVF) 18 is an electronic finder in which the LCD is built. As shown in FIG. 2, the electronic view finder 18 is provided on the upper part of the camera body 10 (so-called warship part), and an eyepiece part is provided on the back surface.

«Hot Shoe»

The hot shoe 20 is a mounting portion of an external flash. As shown in FIG. 3, the hot shoe 20 is provided on the top surface of the camera body 10.

«Operation Member»

The camera body 10 is provided with the shutter button 30, the power supply lever 31, the playback button 34, the delete button 35, the AF lock button 36, the AE lock button 37, the menu button 38, the selector buttons 39, the display button 40, the mode dial 41, the command dial CD, and the like as the operation members.

<Shutter Button>

The shutter button 30 is provided on the top surface (upper surface) of the camera body 10 and disposed on a grip portion side. The shutter button 30 is formed of a so-called two-stage switch that has a half-pressed stage and a fully-pressed stage. In a case where the shutter button 30 is half pressed, imaging preparations, that is, respective pieces of processing such as AE, AF, and AWB are executed. Then, in a case where the shutter button 30 is fully pressed, main imaging, that is, capturing of an image for recording is performed. The AE is an abbreviation of automatic exposure and refers to a function that the camera automatically measures the brightness of a subject and decides proper exposure. Further, the AF is an abbreviation of automatic focus and refers to a function that the camera automatically measures a distance to the subject and focuses on the subject. Further, the AWB is an abbreviation of automatic white balance and refers to a function that the camera automatically determines a light situation and reproduces an appropriate color state.

<Power Supply Lever>

The power supply lever 31 is disposed coaxially with the shutter button 30. The power supply lever 31 is formed of a rotary lever. In a case where the power supply lever 31 is rotated to an ON position, a power supply of the digital camera 1 is turned on. In a case where the power supply lever 31 is rotated to an OFF position, the power supply of the digital camera 1 is turned off.

<Playback Button>

The playback button 34 is a button that switches a mode of the digital camera 1 to a playback mode. The playback button 34 is provided on the back surface of the camera body 10 and disposed above the main-display 14. In a case where the playback button 34 is pressed in a state where the mode of the digital camera 1 is set to the imaging mode, the mode of the digital camera 1 is switched to the playback mode. In the case where the playback mode is set, the last captured image is displayed on the main-display 14.

A function of switching from the playback mode to the imaging mode is assigned to the shutter button 30. In a case where the shutter button 30 is pressed in a state where the playback mode is set, the mode of the digital camera 1 is switched to the imaging mode.

<Delete Button>

The delete button 35 is a button that performs an instruction to delete the imaged image displayed on the main-display 14. The delete button 35 is provided on the back surface of the camera body 10 and disposed above the main-display 14. In a case where the delete button 35 is pressed in a state where the imaged image is displayed on the main-display 14, a screen that confirms the deletion is displayed on the main-display 14. In a case where the execution of the deletion is instructed according to the display on the main-display 14, the imaged image during playback is deleted from a memory card.

<AF Lock Button>

The AF lock button 36 is a button that performs an instruction to lock the focus. As shown in FIG. 2, the AF lock button 36 is provided on the back surface of the camera body 10 and disposed near a thumb rest 24. In a case where the AF lock button 36 is pressed, the focus is locked.

<AE Lock Button>

The AE lock button 37 is a button that performs an instruction to lock the exposure. As shown in FIG. 2, the AE lock button 37 is provided on the back surface of the camera body 10 and disposed near the thumb rest 24. In a case where the AE lock button 37 is pressed, the exposure is locked.

<Menu Button>

The menu button 38 is a button that calls a menu screen on the main-display 14. The menu button 38 is provided on the back surface of the camera body 10. This menu button 38 is pressed to display the menu screen on the main-display 14. The setting screen for performing various setting can be called from the menu screen.

The menu button 38 functions also as an OK button. The OK button refers to a button for instructing OK for a selection item, a confirmation item, or the like.

<Selector Button>

The selector buttons 39 is formed of four buttons of up, down, left, and right disposed on the same circle with the menu button 38 as the center. A function according to a setting situation of the digital camera 1 is assigned to each button. For example, in the case where the digital camera 1 is set to the playback mode, in FIG. 2, a function of one-frame advance is assigned to the button in the right direction, and a function of one-frame return is assigned to the button in the left direction. A function of zoom-in is assigned to the button in the upper direction, and a function of zoom-out is assigned to the button in the lower direction. In the case where the digital camera 1 is set to the imaging mode, in FIG. 2, a function of calling the setting screen of white balance is assigned to the button in the right direction, and a function of calling the setting screen of the self-timer is assigned to the button in the left direction. A function of calling the setting screen of an AF mode is assigned to the button in the upper direction, and a function of calling the setting screen of a consecutive imaging mode is assigned to the button in the lower direction. Furthermore, in a case where the various setting screens are called on the main-display 14, the four buttons function as buttons that move a cursor in each direction on the screens.

<Display Button>

The display button 40 is a button that performs an instruction to switch the display on the main-display 14. The display button 40 is provided on the back surface of the camera body 10. In a case where the display button 40 is pressed in a state where the playback mode or the imaging mode is set, the display on the main-display 14 can be switched. For example, in a case where the display button 40 is pressed in the state where the playback mode is set, an imaging condition, histogram, and the like of an image displayed on the main-display 14 are displayed on the image in an overlapped manner. For example, in a case where the display button 40 is pressed in the state where the imaging mode is set, various pieces of information such as the imaging condition or the histogram are displayed on the live view image in an overlapped manner.

The display button 40 functions as a BACK button. The BACK button is a button that performs an instruction to return the display on the main-display 14 to one previous state. For example, the display button 40 is pressed in a state where various setting screens are displayed on the main-display 14, the display on the main-display 14 is returned to one previous state. Accordingly, it is possible to cancel the selection item, the confirmation item, or the like.

<Mode Dial>

The mode dial 41 is a dial that sets the imaging mode. Each symbol of "P", "S", "A", and "M" is displayed on the same circumference at regular intervals on the top surface of the mode dial 41. The symbol "P" represents the program, the symbol "S" represents the shutter speed priority, the symbol "A" represents the aperture stop priority, and the symbol "M" represents the manual.

Here, the program refers to a mode in which a combination of the F-number and the shutter speed can be changed while the exposure is constantly maintained. The program is an imaging mode in which so-called program shift is possible.

The shutter speed priority refers to a mode in which the camera automatically decides an F-number such that the proper exposure is achieved for a shutter speed selected by the user.

The aperture stop priority refers to a mode in which the camera automatically decides a shutter speed such that the proper exposure is achieved for an F-number selected by the user.

The manual refers to a mode in which the user selects the shutter speed and the F-number.

The mode dial 41 is formed such that click-stop is possible at a position of each symbol with respect to an indicator 41*a*. In a case where the symbol "P" is set to the indicator 41*a*, the imaging mode is set to the program. In a case where the symbol "S" is set to the indicator 41*a*, the imaging mode is set to the shutter speed priority. In a case where the symbol "A" is set to the indicator 41*a*, the imaging mode is set to the aperture stop priority. In a case where the symbol "M" is set to the indicator 41*a*, the imaging mode is set to the manual.

FIG. 3 shows an example in the case where the imaging mode is set to the shutter speed priority. In this case, the symbol "S" is set to the indicator 41*a*.

<Command Dial>

The command dial CD is an example of the rotary operation dial. The command dial CD is formed of a so-called buried type operation dial. That is, the command dial CD is built in the camera body 10, and a part of the outer periphery thereof is disposed on the surface of the camera body 10 in an exposed manner. In the digital camera 1 of the embodiment, the part of the outer periphery thereof is disposed on the back surface of the camera body 10 in an exposed manner. More specifically, the part of the outer periphery thereof is disposed in the upper right corner of the back surface. This position is a position where the operation is possible with the thumb of the right hand holding the grip portion of the camera body 10.

Figure 5:
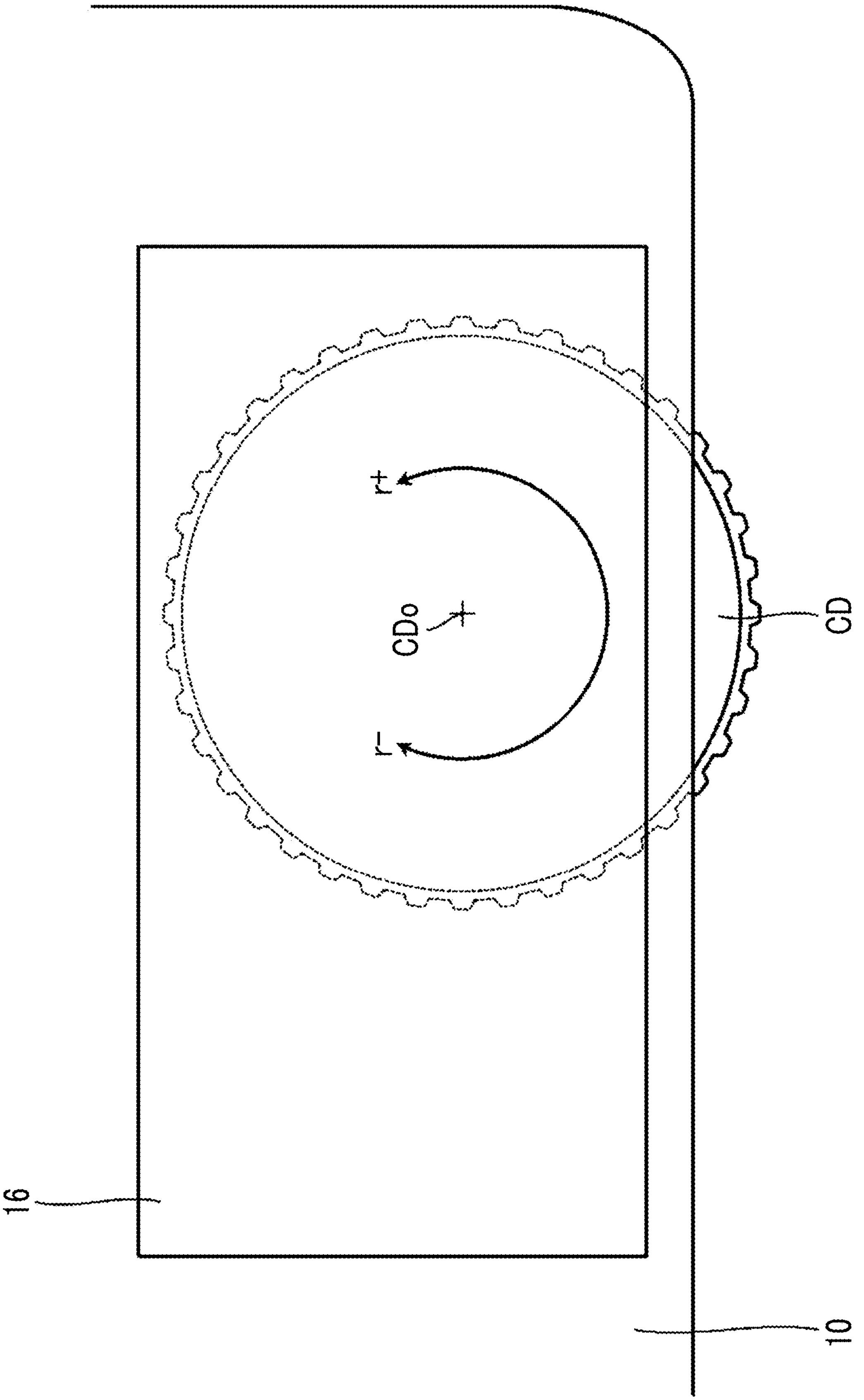
FIG. 5 is a plan view enlarging an installation part of a sub-display.

FIG. 5 is a plan view enlarging an installation part of a sub-display.

The command dial CD is disposed under the sub-display 16 in a case where the camera body 10 is viewed in a plan view. Further, a rotation axis $CD_O$ of the command dial CD is disposed orthogonally to the display surface of the sub-display 16. Furthermore, the rotation axis $CD_O$ of the command dial CD is disposed within the display surface of the sub-display 16. As a result, in the command dial CD, a portion hidden in the camera body 10 is covered by the sub-display 16, and a portion exposed from the camera body 10 is not covered and is disposed under the sub-display 16 in an overlapped manner. Further, in a case where the grip portion of the camera body 10 is held by the right hand, the sub-display 16 is disposed at a position where the index finger of the right hand can be placed (refer to FIG. 9).

The command dial CD has a disc shape, and unevenness for preventing slippage are periodically provided along the circumference direction on the outer periphery of the command dial CD.

The command dial CD is provided such that the rotation operation is possible endlessly and in both directions. That is, the command dial CD is provided such that the rotation operation is possible endlessly in a clockwise rotation direction r− with the rotation axis $CD_O$ as the center and in a counterclockwise rotation direction r+.

Further, the command dial CD has a click mechanism and is formed such that the click-stop is possible at regular angle intervals. The click-stop refers to a function of stopping the rotation with a click feeling. Since this type of click mechanism is a publicly known technique, a description of specific configuration thereof is omitted.

Figure 7:
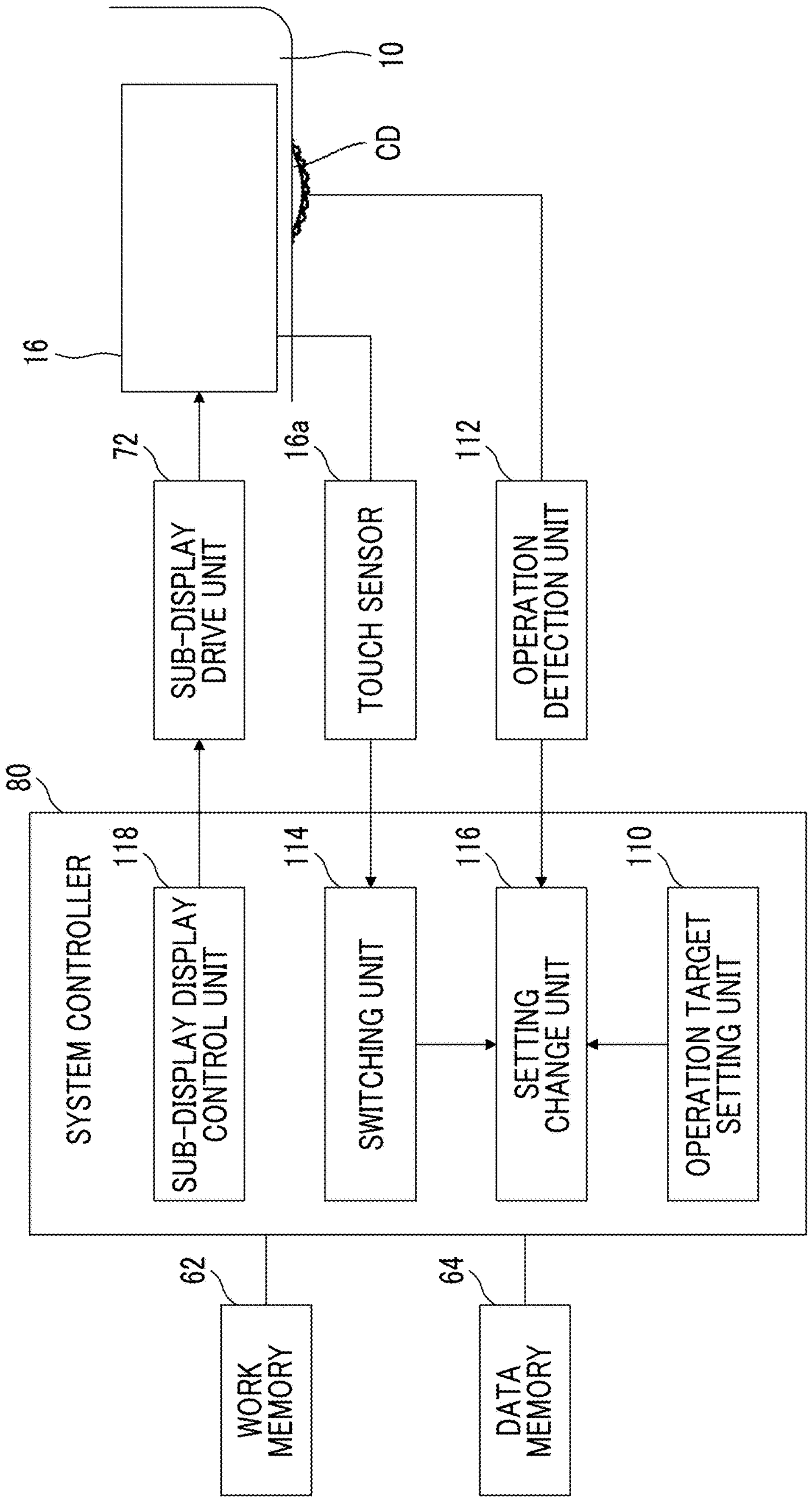
FIG. 7 is a block diagram showing a system configuration of an operation system by using a command dial.

The operation of the command dial CD is detected by an operation detection unit 112 (refer to FIG. 7). The operation detection unit 112 detects an operation direction and an operation amount of the command dial CD and outputs to the system controller 80. The operation detection unit 112 performs the detection, for example, with detection means such as a rotary encoder.

A target operated by the command dial CD is automatically switched according to a state of the digital camera 1. For example, in a case where the imaging mode is set, a function of performing the program shift is assigned in a case where a program mode is selected. Further, in a case where the playback mode is set, a function of zooming an image during playback is assigned. Further, in a case where various settings are performed by using the main-display 14, a function of changing a setting value is assigned. This point will be described below in detail.

Further, the operation of the command dial CD becomes valid only in a case where the operation is performed while the display surface of the sub-display 16 is touched. In other words, the display surface of the sub-display 16 is touched to release the lock, and the display surface of the sub-display 16 is released from the touch to set the lock. Therefore, in a case where the command dial CD is rotationally operated without touching the display surface of the sub-display 16, no setting is changed and an idle rotation is performed. This point will be described below in detail.

[Entire Control System]

Figure 6:
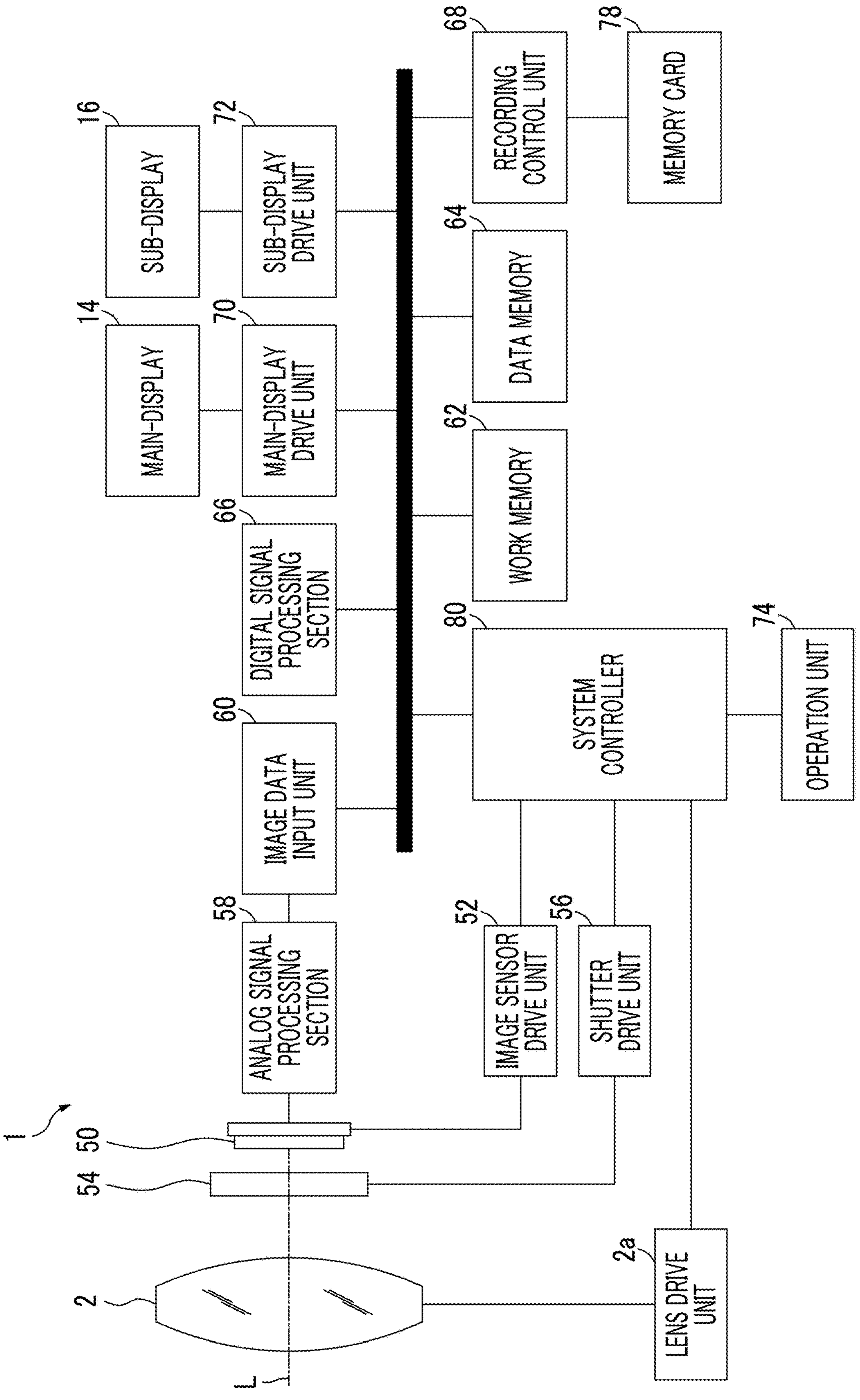
FIG. 6 is a block diagram showing the schematic configuration of the entire control system of the digital camera.

FIG. 6 is a block diagram showing the schematic configuration of the entire control system of the digital camera.

The digital camera 1 includes an image sensor 50, an image sensor drive unit 52, a shutter 54, a shutter drive unit 56, an analog signal processing section 58, an image data input unit 60, a work memory 62, a data memory 64, a digital signal processing section 66, a recording control unit 68, a main-display drive unit 70, a sub-display drive unit 72, an operation unit 74, a system controller 80, and the like.

The image sensor 50 converts an optical image of a subject, which is formed through the lens 2, into electrical signals and outputs the electrical signals. A publicly known image sensor, such as a charged coupled device (CCD)

image sensor or a complementary metal oxide semiconductor (CMOS) image sensor, is used as the image sensor 50.

The image sensor drive unit 52 drives the image sensor 50 according to a command output from the system controller 80.

The shutter 54 is formed of a square type focal-plane shutter and is disposed directly in front of the image sensor 50. FIG. 1 shows a state where the shutter is fully opened.

The shutter drive unit 56 drives the shutter 54 according to a command output from the system controller 80.

The analog signal processing section 58 receives the signals output from the image sensor 50 and performs required signal processing, such as correlative double sampling processing and amplification processing. Further, the analog signal processing section 58 converts analog image signals subjected to the required signal processing into digital image signals and outputs the digital image signals.

The image data input unit 60 receives the digital image signals to be output from the analog signal processing section 58, according to a command output from the system controller 80. Received image data corresponding to one sheet is stored in the work memory 62.

The work memory 62 is used as a memory for work. The data memory 64 is formed of a non-volatile memory, such as electrically erasable programmable read only memory (EEPROM), and data required for control and the like are stored in the data memory 64.

The digital signal processing section 66 performs required signal processing, such as demosaicing processing, white balance correction, gamma correction, and outline correction, on the image data received in the work memory 62, and generates predetermined image data formed of brightness data (Y data) and color difference data (Cr and Cb data).

The recording control unit 68 accesses a memory card 78, and reads and writes data according to a command output from the system controller 80. Image data obtained by imaging is recorded in the memory card 78.

The main-display drive unit 70 drives the main-display 14 according to a command output from the system controller 80.

The sub-display drive unit 72 drives the sub-display 16 according to a command from the system controller 80.

The operation unit 74 includes the shutter button 30, the power supply lever 31, the playback button 34, the delete button 35, the AF lock button 36, the AE lock button 37, the menu button 38, the selector buttons 39, the display button 40, the mode dial 41, the command dial CD, and the like, and outputs a signal in response to the operation of each operation member to the system controller 80.

The system controller 80 is a control unit that controls the operation of each unit of the digital camera 1. The system controller 80 is formed of a microcomputer. That is, the microcomputer functions as the system controller 80 by executing a predetermined control program.

The system controller 80 also functions as a control unit for the lens 2. The system controller 80 controls the operation of the lens 2 through a lens drive unit 2*a* provided in the lens 2. The lens 2 comprises a stop, a focus lens, and the like. The lens drive unit 2*a* comprises a stop drive unit that drives the stop, a focus lens drive unit that drives the focus lens, and the like.

Pieces of processing from the imaging to the recording are roughly as follows.

First, the analog signal processing section 58 receives a signal output from the image sensor 50 by the full press of the shutter button 30. The signal is subjected to a predetermined analog signal processing to convert the signal to a digital signal and output in the analog signal processing section 58.

The work memory 62 receives the signal output from the analog signal processing section 58 through the image data input unit 60. Then, the signal is added to the digital signal processing section 66 from the work memory 62.

In the digital signal processing section 66, the added signal is subjected to a predetermined signal processing to generate image data for recording. The generated image data is temporarily stored in the work memory 62, then converted to a predetermined recording format, and stored in the memory card 78 through the recording control unit 68.

[Operation System by Using Command Dial]

«Configuration»

FIG. 7 is a block diagram showing a system configuration of an operation system by using the command dial.

The operation system by using the command dial CD is mainly formed of an operation target setting unit 110 that sets an operation target of the command dial CD, the operation detection unit 112 that detects the operation of the command dial CD, a touch sensor 16*a* that detects the contact with the display surface of the sub-display 16, a switching unit 114 that switches between validity and invalidity of the operation by the command dial CD based on a detection result of the touch sensor 16*a*, a setting change unit 116 that changes the setting of the item set by the operation target setting unit 110 based on the operation of the command dial CD in the case where the operation by the command dial CD is valid, and a sub-display display control unit 118 that controls the display on the sub-display 16.

<Operation Target Setting Unit>

The operation target setting unit 110 sets the operation target of the command dial CD. As described above, the target operated by the command dial CD is automatically switched according to the state of the digital camera 1.

In the case where the digital camera 1 is in the playback mode, the function of zooming the image during playback is assigned to the command dial CD. In this case, the image is enlarged in a case where the command dial CD is rotated in the counterclockwise direction, and the image is reduced in a case where the command dial CD is rotated in the clockwise direction.

Further, in the case where various settings are performed by using the main-display 14, the function of changing the setting value is assigned to the command dial CD. In this case, the setting value is advanced in the case where the command dial CD is rotated in the counterclockwise direction, and the setting value is lowered in the case where the command dial CD is rotated in the clockwise direction.

Furthermore, in the case where the digital camera 1 is in the imaging mode, the function according to the mode is assigned to the command dial CD.

Specifically, in the case of the program mode, the function of the program shift is assigned. That is, a function of changing the combination of the F-number and the shutter speed while the exposure is constantly maintained. In this case, the shutter speed is advanced (F-number is lowered) in the case where the command dial CD is rotated in the counterclockwise direction, and the shutter speed is lowered (F-number is advanced) in the case where the command dial CD is rotated in the clockwise direction.

Further, in the case of a shutter speed priority mode, a function of changing the setting of the shutter speed is assigned. In this case, the shutter speed is advanced in the case where the command dial CD is rotated in the counterclockwise direction, and the shutter speed is lowered in the case where the command dial CD is rotated in the clockwise direction.

Further, in the case of an aperture stop priority mode, a function of changing the setting of the F-number is assigned. In this case, the F-number is advanced in the case where the command dial CD is rotated in the counterclockwise direction, and the F-number is lowered in the case where the command dial CD is rotated in the clockwise direction.

Further, in the case of a manual mode, a function of changing the setting of the shutter speed or the F-number is assigned. Which item to be changed in the setting depends on the setting by the user.

The data memory 64 stores a table in which the function assigned according to the state of the digital camera 1 is defined. The operation target setting unit 110 sets the operation target of the command dial CD with reference to this table.

The function of the operation target setting unit 110 is provided as one function of the system controller 80. That is, the microcomputer executes the predetermined control program to provide the function of the operation target setting unit 110 as one function of the system controller 80.

<Operation Detection Unit>

The operation detection unit 112 detects the operation of the command dial CD. That is, the operation detection unit 112 detects the operation direction and the operation amount of the command dial CD. The operation detection unit 112 is formed of, for example, the detection means such as the rotary encoder.

<Touch Sensor>

The touch sensor 16*a* detects the contact with the display surface of the sub-display 16. As described above, the touch sensor 16*a* configures the sensor portion of the sub-display 16 formed of the touch panel.

<Switching Unit>

The switching unit 114 switches between validity and invalidity of the operation by the command dial CD based on the detection result of the touch sensor 16*a*. In the digital camera 1 of the embodiment, the operation by the command dial CD is validated while the contact with the display surface of the sub-display 16 is detected by the touch sensor 16*a*.

This function of the switching unit 114 is provided as one function of the system controller 80. That is, the microcomputer executes the predetermined control program to provide the function of the switching unit 114 as one function of the system controller 80.

<Setting Change Unit>

In the case where the operation by the command dial CD is valid, the setting change unit 116 changes the setting of the operation target set by the operation target setting unit 110 based on the operation of the command dial CD. The setting is changed only in the case where the operation by the command dial CD is valid. A current setting of the operation target is maintained even in the case where the command dial CD is operated in the case where the operation by the command dial CD is invalid.

The function of the setting change unit 116 is provided as one function of the system controller 80. That is, the microcomputer executes the predetermined control program to provide the function of the setting change unit 116 as one function of the system controller 80.

<Sub-display Display Control Unit>

The sub-display display control unit 118 controls the display on the sub-display 16 through the sub-display drive unit 72. The sub-display 16 displays information on the setting contents of the digital camera 1 and information indicating a state of the command dial CD.

The information on the setting contents of the digital camera 1 is information indicating a setting situation for a specific item of the digital camera 1.

The information indicating the state of the command dial CD is information indicating whether the command dial CD is validated.

Figure 8:
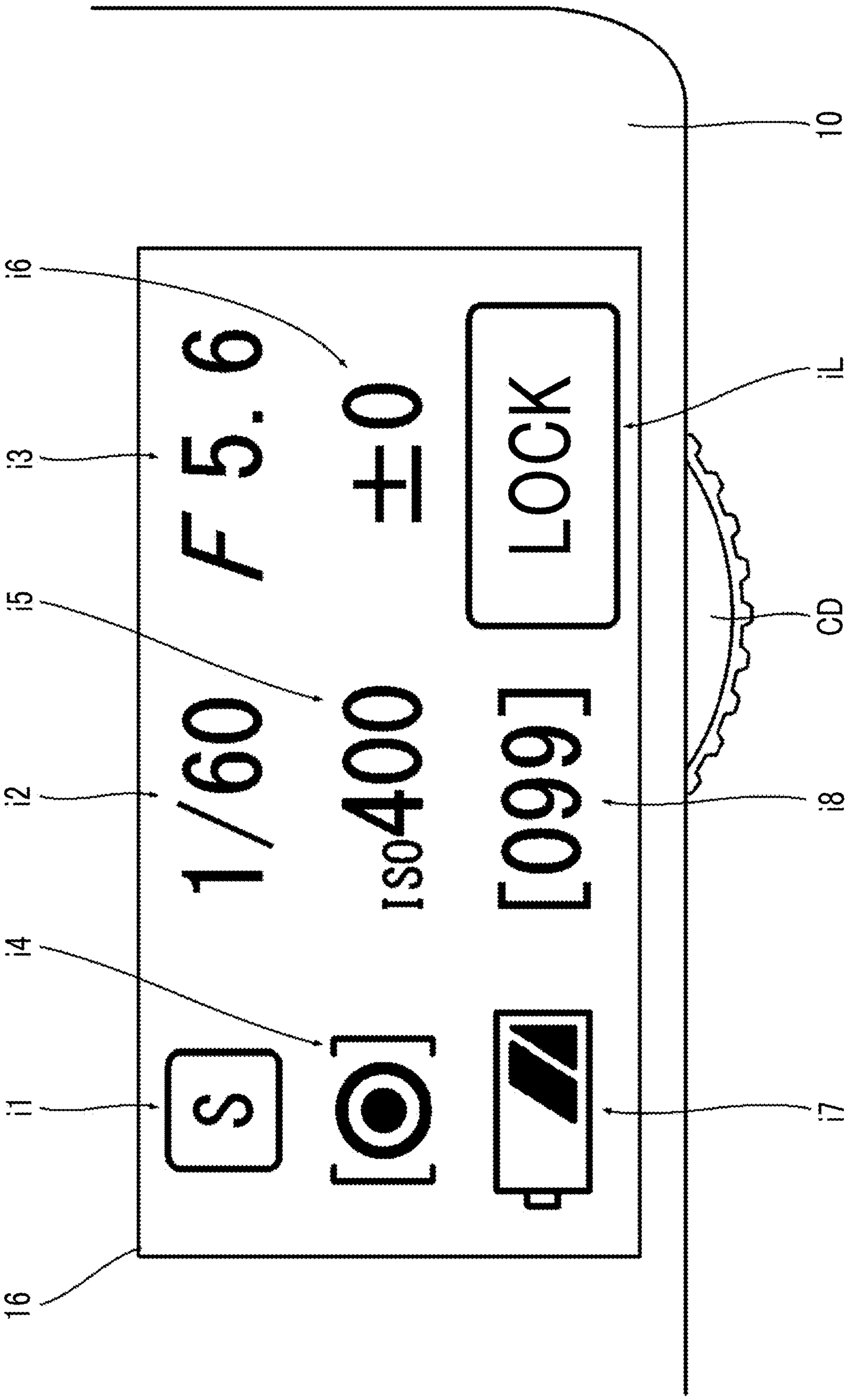
FIG. 8 is a plan view showing an example of a display on the sub-display.

FIG. 8 is a plan view showing an example of the display on the sub-display.

In the digital camera 1 of the embodiment, currently set imaging mode information i1, currently set shutter speed information i2, currently set F-number information i3, currently set photometry mode information i4, currently set international organization for standardization sensitivity (ISO) information i5, currently set exposure correction amount information i6, current battery remaining amount information i7, and the current number of capturable images information i8 are displayed as the information on the setting contents of the digital camera 1. The imaging mode information i1, the photometry mode information i4, and the battery remaining amount information i8 among these pieces of information are displayed in the shape of an icon.

FIG. 8 shows an example in a case where the currently set imaging mode is the shutter speed priority, the shutter speed is 1/60 second, the F-number is F5.6, the photometry mode is multi-photometry, the ISO sensitivity is ISO400, the exposure correction amount is ±0, the battery remaining amount is about half or less, and the number of capturable images is 99.

Further, a lock icon iL is displayed as the information indicating the state of the command dial CD. The lock icon iL is formed of a figure in which a character of LOCK is displayed within a rectangular frame. The lock icon iL is displayed in a case where the operation of the command dial CD is invalid. Therefore, in a case where the operation of the command dial CD is valid, the lock icon iL is not displayed on the sub-display 16.

These pieces of information are displayed in a defined layout. That is, each piece of information is displayed in a predetermined size at a predetermined position.

The sub-display display control unit 118 acquires information necessary for the display and controls the display on the sub-display 16 such that the acquired information is displayed in the defined layout.

The function of the sub-display display control unit 118 is provided as one function of the system controller 80. That is, the microcomputer executes the predetermined control program to provide the function of the sub-display display control unit 118 as one function of the system controller 80.

«Operation Method by Using Command Dial (Setting Method)»

<Operation Method>

Figure 9:
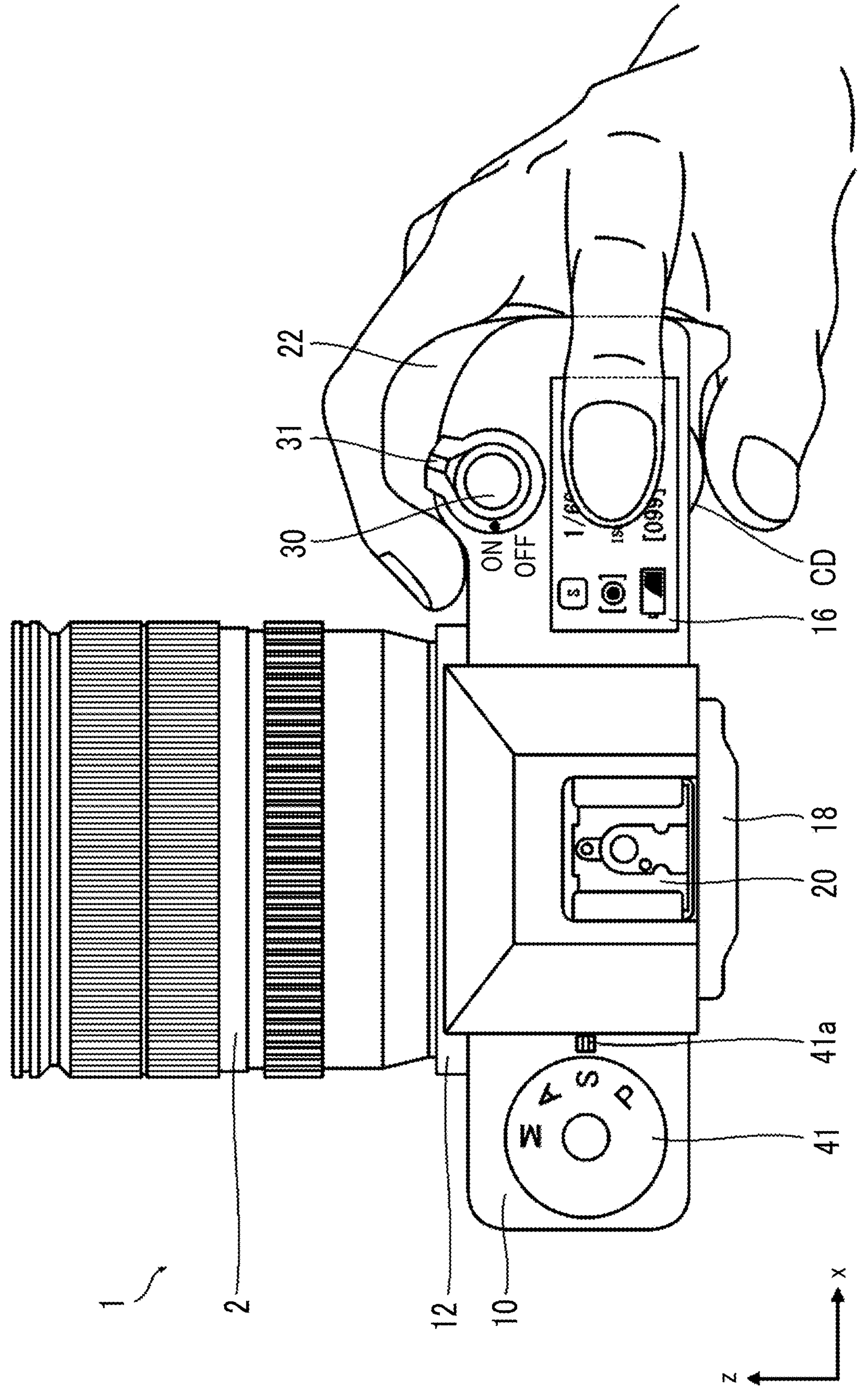
FIG. 9 is a plan view showing an operation form of the digital camera in a case where an operation by the command dial is valid.

FIG. 9 is a plan view showing an operation form of the digital camera in a case where an operation by the command dial is valid. Further, FIG. 10 is a plan view showing an operation form of the digital camera in a case where the operation by the command dial is invalid.

As shown in FIG. 9, the display surface of the sub-display 16 is touched to validate the operation of the command dial CD. That is, the display surface of the sub-display 16 is touched to release an electronic lock of the command dial CD.

Figure 10:
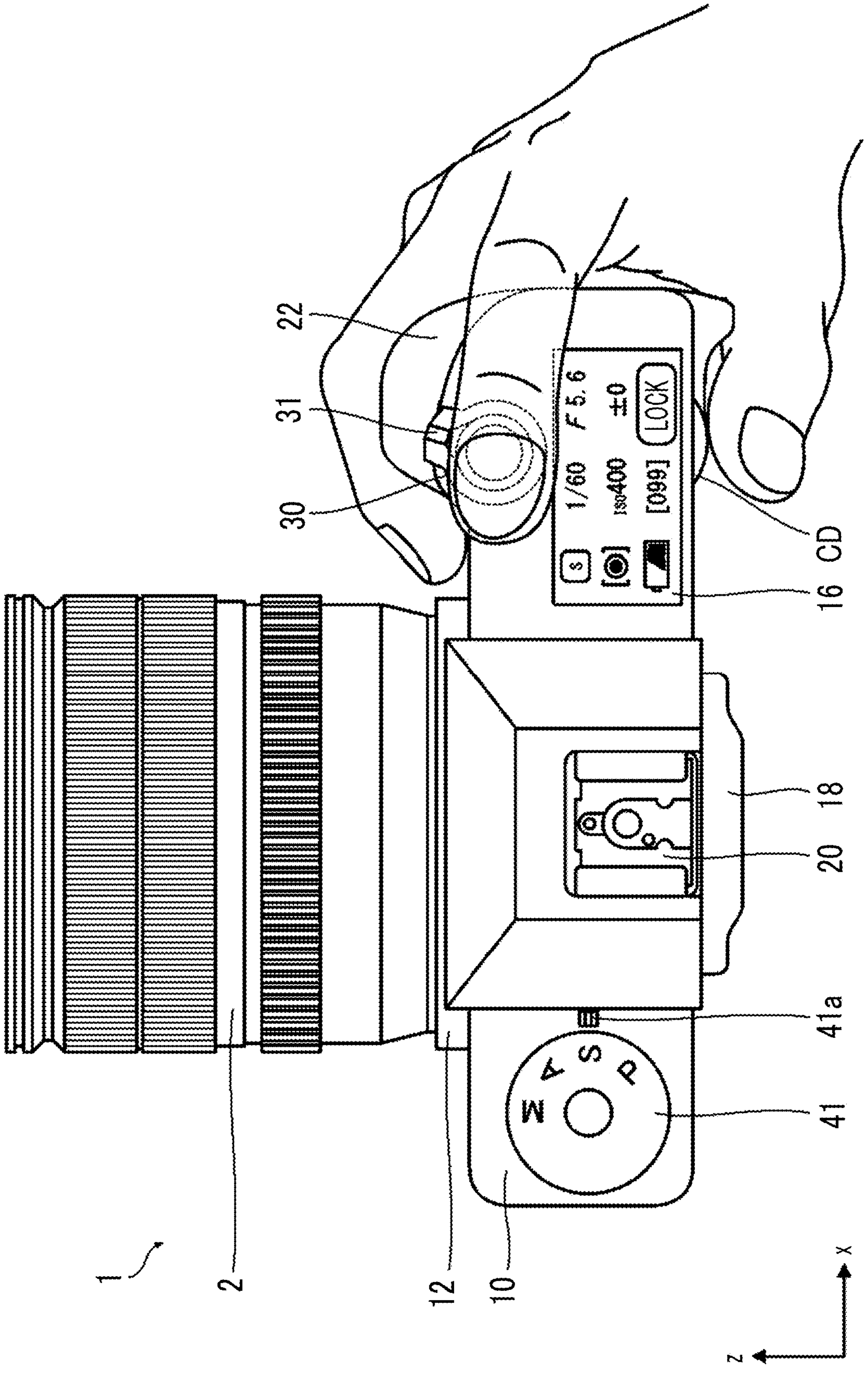
FIG. 10 is a plan view showing an operation form of the digital camera in a case where the operation by the command dial is invalid.

On the other hand, in a case where the display surface of the sub-display 16 is not touched as shown in FIG. 10, the operation by the command dial CD is invalidated. That is, in the case where the display surface of the sub-display 16 is not touched, the command dial CD is electronically locked. In this case, the setting is not changed even in the case where the command dial CD is rotated.

In this manner, the display surface of the sub-display 16 is touched to validate the operation of the command dial CD.

Since the sub-display 16 is disposed on the command dial CD in an overlapped manner, the position can be found even by groping. Accordingly, the operation can be performed easily even under a dark situation or the like. In particular, in the digital camera 1 of the embodiment, since the sub-display 16 is disposed on the rotation axis of the command dial CD, it is possible to more easily find the position of the sub-display 16. Further, it is possible to place the finger on the sub-display 16 in a natural manner and thus to provide good operability. Further, in the digital camera 1 of the embodiment, since the command dial CD and the sub-display 16 are provided at the end portion on the grip portion side, the operation of the command dial CD can be performed while the grip portion is gripped and thus it is possible to provide good operability.

<Internal Processing of Digital Camera>

Figure 11:
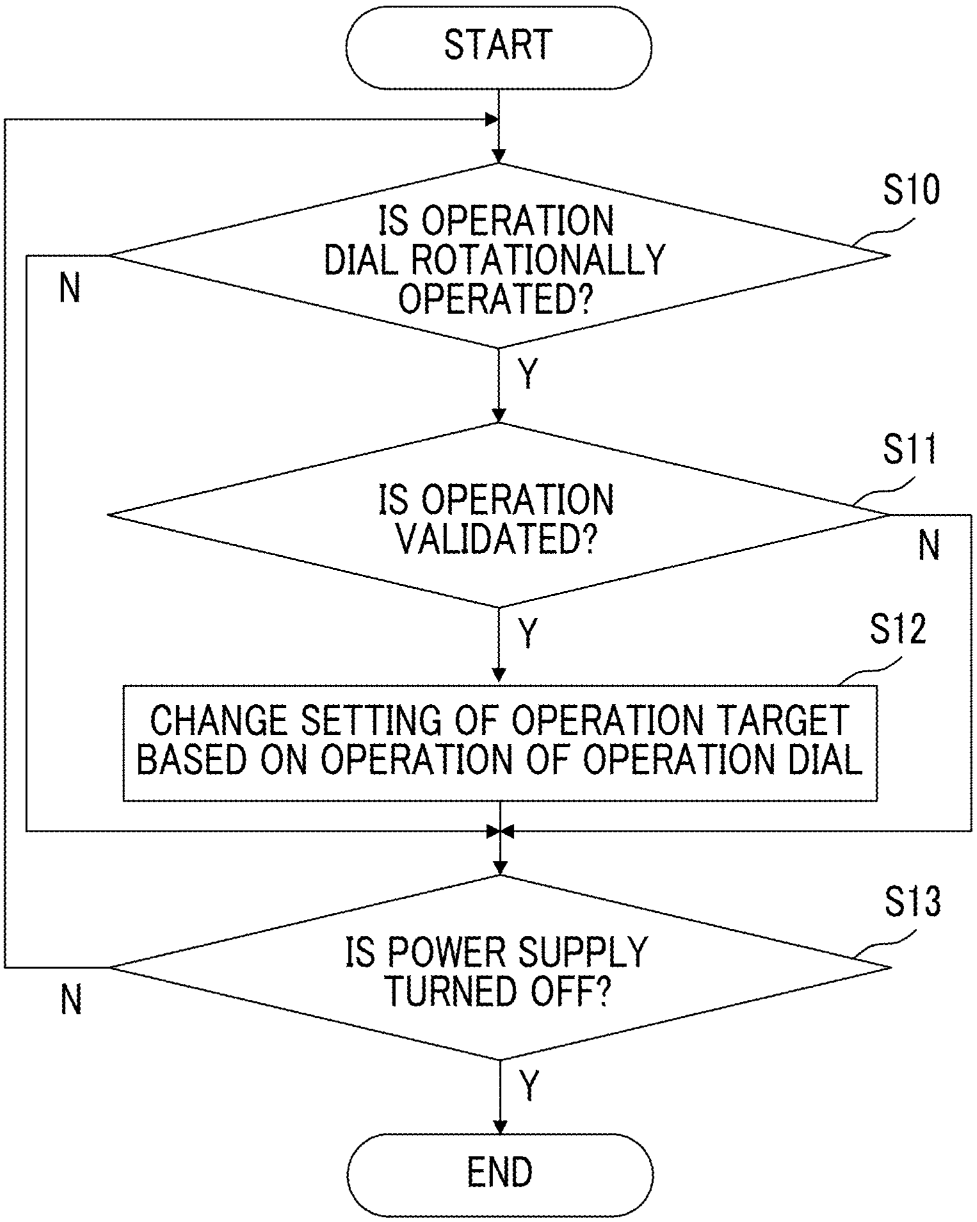
FIG. 11 is a flowchart showing a processing procedure of a setting change by using the command dial.

FIG. 11 is a flowchart showing a processing procedure of a setting change by using the command dial.

The setting change unit 116 determines whether the command dial CD is rotationally operated based on an output from the operation detection unit 112 (step S10).

In a case where it is determined that the command dial CD is rotationally operated, the setting change unit 116 determines whether the operation by the command dial CD is validated (step S11).

Here, the operation by the command dial CD is validated in the case where the finger touches the display surface of the sub-display 16, that is, in the case where the contact is detected by the touch sensor 16*a*. This point will be described below.

In a case where it is determined that the operation by the command dial CD is validated, the setting change unit 116 changes the setting of the operation target based on the operation of the command dial CD. The operation target is the operation target set by the operation target setting unit 110.

For example, in a case where the digital camera 1 is set to the imaging mode and the shutter speed priority mode is selected as the mode, the operation target is the shutter speed. Therefore, in this case, the setting of the shutter speed is changed based on the operation of the command dial CD.

The setting is changed based on the operation direction (rotation direction) and the operation amount (rotation amount) of the command dial CD. For example, in the case where the operation target is the shutter speed, the setting value is advanced in the case where the command dial CD is rotated in the counterclockwise direction. That is, in the case where the operation target is the shutter speed, the shutter speed increases in the case where the command dial CD is rotated in the counterclockwise direction. At this time, the shutter speed increases by one step for each one click. Further, in the case where the command dial CD is rotated clockwise, the setting value is lowered. That is, in the case where the command dial CD is rotated clockwise, the shutter speed decreases. At this time, the shutter speed decreases by one step for each one click.

In step S11, in a case where it is determined that the operation by the command dial CD is not validated, the setting change unit 116 does not perform the setting change with respect to the operation target. In this case, the command dial CD performs the idle rotation.

The fact that the operation by the command dial CD is not validated means that the operation by the command dial CD is invalid. In this case, the command dial CD is in an electronically locked state.

In the case where the operation by the command dial CD is invalid, the sub-display 16 displays the lock icon iL. The user can recognize that the operation of the command dial CD is invalid by the display of the lock icon iL.

Thereafter, the setting change unit 116 determines whether the power supply is turned off (step S13). In a case where it is determined that the power supply is not turned off, the processing returns to step S10 to execute again a series of pieces of processing described above. On the other hand, In a case where it is determined that the power supply is turned off, the processing ends.

In this manner, the change in the setting by using the command dial CD is possible only in the case where the operation by the command dial CD is validated.

Figure 12:
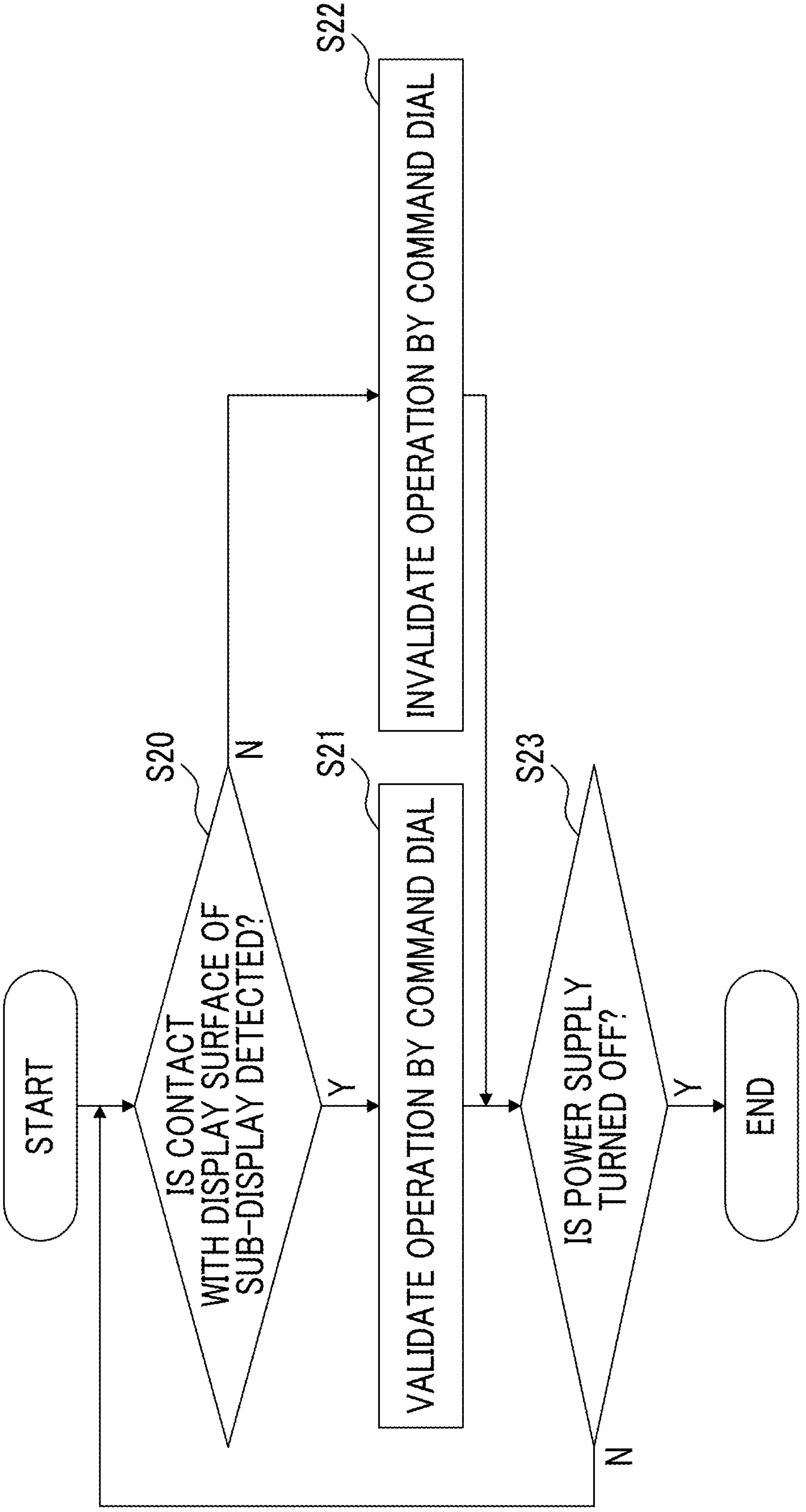
FIG. 12 is a flowchart showing a procedure of processing of switching between validity and invalidity of the operation by the command dial.

FIG. 12 is a flowchart showing a procedure of processing of switching between validity and invalidity of the operation by the command dial.

In a case where the power supply of the digital camera 1 is turned on, the switching unit 114 determines whether the contact with the display surface of the sub-display 16 is detected (step S20). The switching unit 114 determines whether the contact with the display surface of the sub-display 16 is detected based on an output from the touch sensor 16*a*.

In a case where it is determined that the contact with the display surface of the sub-display 16 is detected, the switching unit 114 validates the operation by the command dial CD (step S21).

On the other hand, in a case where it is determined that the contact with the display surface of the sub-display 16 is not detected, the switching unit 114 invalidates the operation by the command dial CD (step S22). In this case, the command dial CD is electronically locked.

Thereafter, the switching unit 114 determines whether the power supply is turned off (step S23). In a case where it is determined that the power supply is not turned off, the switching unit 114 returns to step S20 to execute again the series of pieces of processing described above. On the other hand, In a case where it is determined that the power supply is turned off, the processing ends.

In this manner, in the digital camera 1 of the embodiment, the operation by the command dial CD is validated while the contact with the display surface of the sub-display 16 is detected, that is, while the finger touches the display surface of the sub-display 16.

The series of pieces of processing described above is performed by the system controller 80 executing the predetermined program (setting program).

<Display on Sub-Display>

(A) and (B) of FIG. 13 are plan views showing displays on the sub-display in the case where the operation by the command dial is valid and in the case where the operation by the command dial is invalid. (A) of FIG. 13 shows the display in the case where the operation by the command dial CD is invalid, and (B) of FIG. 13 shows the display in the case where the operation by the command dial CD is valid.

In the case where the operation by the command dial CD is invalid as shown in (A) of FIG. 13, the sub-display 16 displays the lock icon iL.

On the other hand, in the case where the operation by the command dial CD is valid as shown in (B) of FIG. 13, the lock icon iL is not displayed.

The finger touches the display surface of the sub-display 16 to validate the operation of the command dial CD. Therefore, the display on the sub-display 16 is in the state shown in (B) of FIG. 13 by touching the display surface thereof with the finger and is in the state shown in (A) of FIG. 13 by releasing the finger from the display surface thereof. That is, the switching is performed from the display shown in (A) of FIG. 13 to the display shown in (B) of FIG. 13 (in a direction indicated by arrow ab) by touching the display surface with the finger from the state where the display surface is not touched. The switching is performed from the display shown in (B) of FIG. 13 to the display shown in (A) of FIG. 13 (in a direction indicated by arrow ba) by releasing the finger from the display surface from the state where the display surface is touched.

In this manner, since the sub-display 16 displays the lock icon iL in the case where the operation by the command dial CD is invalid, it is possible to easily grasp that the operation of the command dial CD is invalid from the display on the sub-display 16.

[Modification Example]

«Modification Example of Display on Sub-Display»

(A) and (B) of FIG. 14 are plan views showing a modification example of the displays on the sub-display in the case where the operation by the command dial is valid and in the case where the operation by the command dial is invalid. (A) of FIG. 14 shows the display in the case where the operation by the command dial CD is invalid, and (B) of FIG. 14 shows the display in the case where the operation by the command dial CD is valid.

In the example, a display color of the sub-display 16 is inverted between the case where the operation by the command dial CD is valid and the case where the operation by the command dial CD is invalid as shown in (A) and (B) of FIG. 14. That is, a color of background, character or the like is inverted.

In this manner, it is possible to grasp at a glance whether the command dial CD is valid from the display on the sub-display 16 by switching the display form of information to be displayed on the sub-display 16 between the case where the operation by the command dial CD is valid and the case where the operation by the command dial CD is invalid.

«Modification Example of Information to be Displayed on Sub-Display»

The information to be displayed on the sub-display 16 is not particularly limited, but it is preferable to display information on the setting contents of the camera as in the above embodiment. Accordingly, it is possible to easily grasp a setting situation of the camera from the display on the sub-display 16.

Further, in a case where the information on the setting contents of the camera is displayed on the sub-display 16, it is preferable that the setting contents include at least information on the setting value of the item that may be changed in the setting by the command dial CD. In the digital camera of the above embodiment, the shutter speed and the F-number may be changed in the setting by the command dial CD. Therefore, in this case, it is preferable that the setting contents are displayed on the sub-display 16 including at least information on the shutter speed and the F-number information.

Examples of the information to be displayed on the sub-display 16 as the information on the setting contents of the camera are flash setting information, flash dimming correction amount information, macro mode setting information, consecutive imaging mode setting information, white balance setting information, AF mode setting information, image size setting information, image quality setting information, and camera shake correction setting information in addition to the information described in the above embodiment.

«Modification Example of Detection of Contact»

In the above embodiment, a region where the contact is detected on the display surface of the sub-display 16 is not particularly mentioned, but the region where the contact is detected (contact detection region) may be limited to a part of the display surface. In this case, it is preferable to set the contact detection region within a disposition region of the command dial CD. The disposition region of the command dial CD refers to a region where the command dial CD and the display surface of the sub-display 16 overlap each other in a case where the display surface of the sub-display 16 is viewed in a plan view. That is, the region overlapped with the command dial CD is the disposition region of the command dial CD on the display surface of the sub-display 16, and this region is set as a detection region of the contact. Since the disposition region of the command dial CD can be grasped easily from an installation position of the command dial CD, the disposition region thereof can be found easily even under the dark situation or the like. Accordingly, it is possible to provide good operability. Further, it is possible to prevent an erroneous detection by limiting the contact detection region to such region.

In a case where the contact detection region is limited to a part within the disposition region of the command dial CD, it is preferable to set the contact detection region on the axis of the command dial CD.

FIG. 15 is a plan view showing an example in the case where the contact detection region is limited to a part within the disposition region of the command dial. In FIG. 15, a region indicated by hatched lines is a contact detection region sz.

The contact detection region sz is set on the rotation axis $CD_O$ of the command dial CD as shown in FIG. 15. Since a position of the rotation axis of the command dial CD can be grasped easily from the installation position of the command dial CD, the position thereof can be found easily even under the dark situation or the like. Accordingly, it is possible to provide good operability.

Second Embodiment

In a digital camera of the embodiment, the operation by the command dial CD can be switched alternately between valid and invalid every time the contact with the display surface of the sub-display 16 is detected. That is, the display surface of the sub-display 16 functions as a toggle type switch in the digital camera of the embodiment.

A basic configuration of the camera is the same as the configuration of the digital camera in the first embodiment except that the configuration of switching between validity and invalidity of the operation of the command dial CD is different. Therefore, only processing of switching between validity and invalidity of the operation of the command dial CD will be described herein.

[Operation of Switching between Validity and Invalidity of Operation by Command Dial]

FIG. 16 is a flowchart showing a procedure of the processing of switching between validity and invalidity of the operation by the command dial.

In a case where the power supply of the digital camera 1 is turned on, the switching unit 114 invalidates the operation by the command dial CD (step S30). In this case, the command dial CD is in the electronically locked state. Therefore, the command dial CD is in the locked state at the time the power supply is turned on.

Thereafter, the switching unit 114 determines the presence or absence of the contact with the display surface of the sub-display 16 based on the output from the touch sensor 16*a* (step S31).

In a case where it is determined that the display surface of the sub-display 16 is touched, the switching unit 114 switches between validity and invalidity of the operation by the command dial CD (step S32). That is, in a case where the previous state is valid, the state is switched to invalid. In a case where the previous state is invalid, the state is switched to valid. Since the operation of the command dial CD is invalid immediately after the power supply is turned on, the state can be switched to valid in a case where the contact is detected for the first time after the power supply is turned on.

In this manner, the switching unit 114 switches alternately between validity and invalidity of the operation by the command dial CD every time the contact with the display surface of the sub-display 16 is detected.

Thereafter, it is determined whether the power supply of the digital camera 1 is turned OFF (step S33). In a case where the power supply is turned OFF, the processing ends.

In this manner, the operation by the command dial CD is switched between valid and invalid every time the display surface of the sub-display 16 is touched. That is, the command dial CD is switched between locking and unlocking. Accordingly, it is possible to lock and unlock the command dial CD with a simple operation.

In particular, since the display on the sub-display 16 is not hidden even during the operation of the command dial CD in the digital camera of the embodiment, it is possible to ensure good visibility of the sub-display 16.

Third Embodiment

In a digital camera of the embodiment, an image picture of a button is displayed on the sub-display. The display form of this image picture of the button can be switched in conjunction with the switching between validity and invalidity of the operation by the command dial CD.

The basic configuration of the camera is the same as the configuration of the digital camera in the first embodiment except that the display on the sub-display 16 is different. Therefore, only the display on the sub-display 16 will be described herein. The control of the display on the sub-display 16 is performed by the sub-display display control unit 118.

[Display on Sub-Display]

FIGS. 17 and 18 are plan views showing examples of the display on the sub-display. FIG. 17 shows the display in the case where the operation by the command dial CD is invalid, and FIG. 18 shows the display in the case where the operation by the command dial CD is valid.

The sub-display 16 displays the information on the setting contents of the digital camera and an image picture of the button iB as shown in FIGS. 17 and 18.

«Setting Contents of Camera»

In the example, the currently set imaging mode information i1, the currently set shutter speed information i2, the currently set F-number information i3, the currently set ISO sensitivity information i5, the currently set exposure correction amount information i6, the current battery remaining amount information i7, and the current number of capturable images information i8 are displayed as the information on the setting contents of the digital camera. The information on the setting contents of the camera is displayed in a margin region. The margin region refers to a region excluding a display region of the image picture of the button iB.

FIGS. 17 and 18 show examples in a case where the currently set imaging mode is the shutter speed priority, the shutter speed is 1/60 second, the F-number is F5.6, the ISO sensitivity is ISO400, the exposure correction amount is ±0, the battery remaining amount is about half or less, and the number of capturable images is 99.

The information on the setting contents of the camera to be displayed on the sub-display 16 includes the information on the item that may be changed in the setting by the command dial CD. In the case of the digital camera of the embodiment, the shutter speed and the F-number are the items that may be changed in the setting by the command dial CD. Therefore, the information on the setting contents of the camera to be displayed on the sub-display 16 includes the shutter speed information i2 and the F-number information i3.

Further, an item to be changed in the setting by the command dial CD at the present time among the items to be displayed on the sub-display 16 as the information on the setting contents of the camera is displayed in a form different from other items. FIGS. 17 and 18 show examples in a case where the item to be changed in the setting by the command dial CD at the present time is the shutter speed. The shutter speed information i1 is displayed in a size larger than the information on other items as shown in FIGS. 17 and 18. Accordingly, it is possible to grasp that the item to be changed in the setting by the command dial CD at the present time is the shutter speed from the display on the sub-display 16.

In a case where the imaging mode is the aperture stop priority mode, the item to be changed in the setting by the operation by the command dial CD is the F-number. In this case, the F-number information i3 is displayed in a size larger than the information on other items.

Further, in a case where the imaging mode is the program mode, the item to be changed in the setting by the operation by the command dial CD is the program shift. In this case, since a combination of the shutter speed and the F-number is changed in the setting, the shutter speed information i2 and the F-number information i3 are displayed in a size larger than the information on other items.

Further, in a case where the operation by the command dial CD is validated for the item to be changed in the setting by the command dial CD at the present time, since the fact indicates that the setting change is possible by the command dial CD as shown in FIG. 18, triangular carry-down mark m1 and carry-up mark m2 are displayed on both sides of the item. The carry-down mark m1 is a mark indicating that the setting value can be lowered. The carry-up mark m2 is a mark indicating that the setting value can be advanced. In a case where the carry-down mark m1 is displayed, it indicates that the setting value can be lowered. Further, in a case where the carry-up mark m2 is displayed, it indicates that the setting value can be advanced. Therefore, in a case where both marks are displayed, it indicates that the setting at the present time can be lowered and advanced further. On the other hand, in a case where only the carry-up mark m2 is displayed, it indicates that the setting at the present time is a lower limit value. Similarly, in a case where only the carry-down mark m1 is displayed, it indicates that the setting at the present time is an upper limit value. In this manner, it is possible to intuitively grasp the item to be changed in the setting and also the upper limit and the lower limit by displaying the carry-down mark m1 and the carry-up mark m2 together.

The information on the setting contents of the camera is displayed in the defined layout. The sub-display display control unit 118 acquires the information necessary for the display and controls the display on the sub-display 16 such that the acquired information is displayed in the defined layout.

«Image Picture of Button»

In the example, the image picture of the button iB is formed of an image in which a circular push-type button is viewed in a plan view. More specifically, the image picture of the button iB is formed of a figure composed of an annular outer frame part iB1 and a circular button portion iB2 disposed on the inner side of the outer frame part.

A position where the image picture of the button iB is displayed is on the rotation axis of the command dial CD. Accordingly, it is possible to clarify the association between the command dial CD and the image picture of the button iB. Further, accordingly, it is possible to easily grasp the operation intuitively.

In FIGS. 17 and 18, the display form of the image picture of the button iB is different between in the case where the operation by the command dial CD is valid and in the case where the operation by the command dial CD is invalid.

In the case where the operation by the command dial CD is invalid, the inner side of the button portion iB2 at the center of the image picture of the button iB is displayed in white as shown in FIG. 17.

On the other hand, in the case where the operation by the command dial CD is valid, the inner side of the button portion iB2 at the center of the image picture of the button iB is displayed in black as shown in FIG. 18.

The sub-display display control unit 118 switches the display form of the image picture of the button iB in conjunction with the switching between validity and invalidity of the operation by the command dial CD.

In this manner, the display form of the image picture of the button iB can be switched between the case where the operation by the command dial CD is valid and the case where the operation by the command dial CD is invalid. Accordingly, it is possible to easily grasp whether the operation by the command dial CD is valid from the display on the sub-display 16.

[Action Effect]

As described above, since the lock release button cannot be provided on the rotation axis thereof due to the structure of the buried type operation dial, there is a disadvantage that operability thereof is poor as compared with the operation dial provided on the top surface thereof.

However, according to the digital camera 1 of the embodiment, since the image picture of the button iB is displayed on the sub-display 16 disposed on the command dial CD, it is possible to provide the user with an operation feeling as if the lock release button is provided on the actual command dial CD. Accordingly, it is possible to provide good operability. In particular, it is possible to provide good operability intuitively for a user accustomed to the operation of the operation dial comprising the lock release button.

[Modification Example]

«Switching between Validity and Invalidity of Operation by Command Dial»

The operation by the command dial CD may be switched between valid and invalid by a toggle type as in the digital camera of the above second embodiment. That is, the operation by the command dial CD may be switched alternately between valid and invalid every time the display surface of the sub-display 16 is touched.

In the case of the toggle type, since the display on the sub-display 16 is not hidden by the finger even during the operation of the command dial CD, it is possible to ensure good visibility.

Further, since whether the operation by the command dial CD is valid can be grasped at a glance from the display on the sub-display 16, it is possible to provide good operability.

«Setting of Contact Detection Region»

In a case where the image picture of the button iB is displayed on the sub-display 16 as in the digital camera of the embodiment, it is possible to limit the contact detection region within the display region of the image picture of the button iB. For example, it is possible to align the contact detection region with the display region of the button portion iB2. Accordingly, it is possible to prevent the erroneous detection and to provide good operability.

«Modification Example of Image Picture of Button»

FIGS. 19 and 20 are diagrams showing modification examples of the image picture of the button. FIG. 19 shows the case where the operation by the command dial CD is invalid, and FIG. 20 shows the case where the operation by the command dial CD is valid.

In the examples, the image pictures of the button iB are displayed as three-dimensional images. That is, the image pictures of the button iB are represented by images having a stereoscopic effect drawn on a plane. In the image picture of the button iB, the form of the button portion iB2 is changed between the case where the operation by the command dial CD is valid and the case where the operation by the command dial CD is invalid. That is, in the case where the operation by the command dial CD is invalid, the button portion iB2 is displayed with a protruding figure as shown in FIG. 19. On the other hand, in the case where the operation by the command dial CD is valid, the button portion iB2 is displayed with a retracted figure as shown in FIG. 20.

In this manner, the image picture of the button can be displayed as the three-dimensional image. Accordingly, it is possible for the user to easily imagine that the button is pushed. Such display effectively acts particularly in the case where the operation by the command dial CD is switched between valid and invalid with the toggle type.

«Modification Example of Display Position of Image Picture of Button»

The image picture of the button iB is displayed on the rotation axis of the command dial CD in the above embodiment, but the position where the image picture of the button iB is displayed is not limited to this position. For example, the image picture of the button iB may be displayed at a position within a range where the index finger of the hand gripping the camera is placed in a natural manner. Further, the displaying position thereof may be changed dynamically. For example, the image picture of the button iB may be displayed at a position where the contact is detected. In this case, the touch sensor detects also a position where the finger touches in addition to the contact with the display surface. Then, the image picture of the button iB is displayed at the position where the contact is detected based on the detection result of the touch sensor.

«Modification Example of Display of Setting Contents of Camera»

In the above embodiment, the information on the item to be changed in the setting by the command dial CD is displayed in a size larger than the information on other items. However, the display form of the information on the item to be changed in the setting by the command dial CD is not limited thereto. The information on the item to be changed in the setting by the command dial CD may be displayed in a form distinguishable from the information on other items. For example, the information on the item to be changed in the setting by the command dial CD may be surrounded by the frame, displayed in boldface, or changed in a character color so as to be able to distinguish from the information on other items.

Further, in a case where the operation by the command dial CD is validated only while the display surface of the sub-display 16 is touched, the information on the item to be changed in the setting by the command dial CD may be turned on and off in a case where the display surface of the sub-display 16 is touched. Accordingly, it is possible to grasp the item to be changed in the setting by the command dial CD at a glance.

It is preferable to display the setting contents of the camera avoiding a region covered by the finger. The region covered by the finger refers to a region covered by the finger touched for validating the operation by the command dial CD. This region can be specified to some extent. That is, in a case where the sub-display 16 is disposed at the end portion on the grip portion side, since a right side region of the image picture of the button iB is the region covered by the finger, it is preferable to display avoiding this region. Specifically, the margin region is set on the left side (side opposite to grip portion) or the front side (subject side) of the image picture of the button iB and the information on the setting contents of the camera is displayed in the margin region as in the digital camera of the above embodiment.

Fourth Embodiment

In a digital camera of the embodiment, the sub-display displays an image picture of a dial. This image picture of the dial is formed of an image comprising the button at the center, and the display form of the button portion can be switched in conjunction with the switching between validity and invalidity of the operation by the command dial CD. Further, in the case where the operation by the command dial CD is valid, the image picture of the dial is rotated in conjunction with the rotation operation of the command dial CD.

The basic configuration of the camera is the same as the configuration of the digital camera in the first embodiment except that the display on the sub-display 16. Therefore, only the display on the sub-display 16 will be described herein. The control of the display on the sub-display 16 is performed by the sub-display display control unit 118.

[Display on Sub-Display]

FIGS. 21 and 22 are plan views showing examples of the display on the sub-display. FIG. 21 shows the display in the case where the operation by the command dial CD is invalid, and FIG. 22 shows the display in the case where the operation by the command dial CD is valid.

The sub-display 16 displays the information on the setting contents of the digital camera and an image picture of a dial iD as shown in FIGS. 21 and 22.

«Setting Contents of Camera»

In the example, the currently set shutter speed information i2, the currently set F-number information i3, the currently set ISO sensitivity information i5, and the currently set exposure correction amount information i6 are displayed as the information on the setting contents of the digital camera. The information on the setting contents of the camera is displayed in the margin region. In the example, the margin region is set on the left side of the image picture of the dial iD, and the information on the setting contents of the camera is displayed in the margin region. Accordingly, it is possible to prevent the information on the setting contents of the camera from being hidden by the finger of the hand touching the display surface and difficult to view.

FIGS. 21 and 22 show examples in a case where the currently set shutter speed is 1/60 second, the F-number is F5.6, the ISO sensitivity is ISO400, and the exposure correction amount is ±0.

The information on the setting contents of the camera to be displayed on the sub-display 16 includes the information on the item that may be changed in the setting by the command dial CD. In the case of the digital camera of the embodiment, the shutter speed and the F-number are the items that may be changed in the setting by the command dial CD. Therefore, the information on the setting contents of the camera to be displayed on the sub-display 16 includes the shutter speed information i2 and the F-number information i3.

Further, an item to be changed in the setting by the command dial CD at the present time among the items to be displayed on the sub-display 16 as the information on the setting contents of the camera is displayed in a form different from other items. FIGS. 21 and 22 show examples in a case where the item to be changed in the setting by the command dial CD at the present time is the program shift. That is, the examples in the case where the program mode is selected as the imaging mode are displayed. Since the combination of the shutter speed and the F-number is changed in the setting in the case of the program shift, the shutter speed information i2 and the F-number information i3 are displayed in a size larger than the information on other items. Accordingly, it is possible to grasp that the set imaging mode is the program mode and the shutter speed and the F-number are changed by the operation of the command dial CD from the display on the sub-display 16.

Further, in a case where the operation by the command dial CD is validated for the item to be changed in the setting by the command dial CD at the present time, since the fact indicates that the setting change is possible by the command dial CD as shown in FIG. 22, the triangular carry-down mark m1 and carry-up mark m2 are displayed on both sides of the item.

The information on the setting contents of the camera is displayed in the defined layout. The sub-display display control unit 118 acquires the information necessary for the display and controls the display on the sub-display 16 such that the acquired information is displayed in the defined layout.

«Image Picture of Dial»

As described above, the image picture of the dial iD is formed of the image comprising the button at the center. In the example, the image picture of the dial iD is formed of an image in which a disc-like dial comprising the button at the center is viewed in a plan view. More specifically, the image picture of the dial iD is formed of a figure composed of an annular dial portion iD1 and a circular button portion iD2 disposed at the center of the dial portion iD1. The image picture of the dial iD is displayed on the rotation axis of the command dial CD.

An image of the dial portion iD1 is formed of an image having an arc-like external shape obtained by extending a part of the outer periphery of the command dial CD exposed to the back surface of the camera body 10. That is, the image of the dial portion iD1 is displayed on the sub-display 16 in a form complementing a hidden portion of the actual command dial CD. Accordingly, it can be seen as the entire command dial CD is displayed.

The image of the dial portion iD1 has a periodical uneven shape in the outer periphery portion. This uneven shape is a shape imitating the unevenness for anti-slip provided in the outer periphery part of the actual command dial CD. It is possible to further clarify the relevance to the actual command dial CD by comprising such uneven shape in the outer periphery part. Further, in a case where the image picture of the dial iD is rotated, it is possible to further clarify a situation of the rotation as described below.

Further, the image of the dial portion iD1 has a radial pattern. In the case where the image picture of the dial iD is rotated, it is possible to further clarify the situation of the rotation by having such pattern.

An image of the button portion iD2 has a circular shape. The display form of the image of the button portion iD2 can be switched between the case where the operation by the command dial CD is valid and the case where the operation by the command dial CD is invalid.

In the case where the operation by the command dial CD is invalid as shown in FIG. 21, the inner side of a circle defining the outline of the image of the button portion iD2 is displayed in white (transparent).

On the other hand, in the case where the operation by the command dial CD is valid as shown in FIG. 22, the inner side of the circle defining the outline of the image of the button portion iD2 is displayed in black.

In this manner, it is possible to grasp at a glance whether the operation by the command dial CD is valid from the display on the sub-display 16 by switching the display form of the image of the button portion iD2 between the case where the operation by the command dial CD is valid and the case where the operation by the command dial CD is invalid.

The sub-display display control unit 118 switches the display form of the image picture of the dial iD in conjunction with the switching between validity and invalidity of the operation by the command dial CD.

«Rotation of Image Picture of Dial»

In the case where the operation by the command dial CD is valid, the image picture iD of the command dial CD displayed on the sub-display 16 is changed in conjunction with the rotation of the actual command dial CD, and the rotation operation of the command dial CD is expressed. Specifically, in the case where the command dial CD is rotationally operated, the image picture of the dial iD is rotated with the axis thereof as the center in conjunction with the rotation. That is, the state of the rotation is displayed by animation.

The image picture of the dial iD is rotated in conjunction with the operation of the command dial CD only in the case where the operation by the command dial CD is valid. The image picture of the dial iD is not rotated in the case where the operation by the command dial CD is invalid.

Therefore, the image picture of the dial iD is rotated in conjunction with the operation of the command dial CD only in the case where the command dial CD is operated while the display surface of the sub-display 16 is touched.

In this manner, it is possible to grasp at a glance whether the operation by the command dial CD is valid from the display on the sub-display 16 by rotating the image picture of the dial iD in conjunction with the operation of the command dial CD in the case where the operation of the command dial CD is valid.

[Action Effect]

According to the digital camera 1 of the embodiment as described above, the image picture of the dial iD is displayed on the sub-display 16 provided on the top surface of the camera body 10.

Accordingly, it is possible to provide the user with the operation feeling as if the actual command dial CD is provided on the top surface. Since the image picture of the dial iD displays also the image picture of the button for lock release, it is possible to provide intuitive and good operability for the user accustomed to the operation of the operation dial comprising the lock release button.

[Modification Example]

«Switching between Validity and Invalidity of Operation by Command Dial»

The operation by the command dial CD may be switched between valid and invalid by the toggle type as in the digital camera of the above second embodiment. That is, the operation by the command dial CD may be switched alternately between valid and invalid every time the display surface of the sub-display 16 is touched.

In the case of the toggle type, since the display on the sub-display 16 is not hidden by the finger even during the operation of the command dial CD, it is possible to ensure good visibility.

Further, since whether the operation by the command dial CD is valid can be grasped at a glance from the display on the sub-display 16, it is possible to provide good operability.

«Setting of Contact Detection Region»

In the case where the image picture of the dial iD comprising the button at the center is displayed on the sub-display 16 as in the digital camera of the embodiment, it is possible to limit the contact detection region within the display region of the image picture of the dial iD. Accordingly, it is possible to prevent the erroneous detection and to provide good operability.

In particular, it is possible to align the contact detection region with the display region of the button portion iD2. Accordingly, it is possible to prevent the erroneous detection and to provide good operability.

«Modification Example of Image Picture of Dial»

<Modification Example 1>

FIGS. 23 and 24 are diagrams showing modification examples of the image picture of the dial. FIG. 23 shows the case where the operation by the command dial CD is invalid, and FIG. 24 shows the case where the operation by the command dial CD is valid.

In the examples, the image pictures of the dial iD are displayed as the three-dimensional image. Specifically, a disc-like dial comprising a button at the center is represented by images having the stereoscopic effect. In particular, in the examples, the dial portion iD1 is formed of an annular figure and the button portion iD2 is formed of a columnar figure.

The radial pattern is attached to the dial portion iD1, and the uneven shape is attached to the outer periphery of the dial portion iD1.

A form of the button portion of this image picture of the dial iD is changed between the case where the operation by the command dial CD is valid and the case where the operation by the command dial CD is invalid. That is, in the case where the operation by the command dial CD is invalid, the button portion iD2 is displayed with a protruding figure as shown in FIG. 23. On the other hand, in the case where the operation by the command dial CD is valid, the button portion iD2 is displayed with a retracted figure as shown in FIG. 24.

Further, in the case where the command dial CD is rotationally operated and the operation is valid, the image picture of the dial iD is rotated in response to the operation. Accordingly, it is possible to grasp at a glance that the operation of the command dial CD is valid from the display on the sub-display 16.

In this manner, the image picture of the dial iD can be displayed as the three-dimensional image. Accordingly, it is possible for the user to easily imagine that the button is pushed. Such display effectively acts particularly in the case where the operation by the command dial CD is switched between valid and invalid with the toggle type.

<Modification Example 2>

FIG. 25 is a plan view showing another example of the modification example of the image picture of the dial. FIG. 25 shows the case where the operation by the command dial CD is invalid.

In the image picture of the dial iD in the example, a pattern is attached to the peripheral portion of the surface of the dial portion iD1. This pattern is formed by displaying rectangular figures in the circumference direction. That is, the pattern is formed by arranging the rectangular figures in the circumference direction at regular pitches.

It is possible to clarify the situation of the rotation in the case where the image picture of the dial iD is rotated by attaching the pattern displayed periodically in the circumference direction.

In the example, the rectangular figures are disposed in the circumference direction at regular pitches, but the figure configuring the pattern is not limited thereto. Circular figures may be disposed in the circumference direction at regular pitches.

«Other Examples Expressing Rotation Operation of Dial»

In the above embodiment, the image picture of the dial iD is rotated around the axis in conjunction with the rotation of the actual command dial CD as a method of expressing the rotation operation of the command dial CD. However, the method of expressing the rotation operation of the command dial CD is not limited thereto.

FIG. 26 is a diagram showing another example expressing the rotation operation of the command dial.

In the example shown in FIG. 26, a selectable setting value in the case of rotating the command dial CD is displayed on the left side portion of the image picture iD of the command dial CD. The selectable setting value is displayed along the outer periphery of the image picture iD of the command dial CD at regular intervals. A current setting value is displayed at a predetermined position and is surrounded by the frame and displayed.

FIG. 26 shows an example in a case where the item to be set by the command dial CD is the shutter speed. Further, FIG. 26 shows a case where the currently set shutter speed is 1/60 second. Further, FIG. 26 shows a case where the shutter speed is changed as . . . , 1/30 second, 1/60 second, 1/125 second, 1/500 second, . . . every time the command dial CD is rotated in the counterclockwise direction for one click.

In the example shown in FIG. 26, the current setting value is displayed at a position of nine o'clock. In this case, "1/60" representing 1/60 second which is the setting value of the current shutter speed is displayed at the position of nine o'clock. The selectable shutter speed is displayed at regular intervals with the position of nine o'clock as the reference.

In the case where the command dial CD is rotationally operated, a portion in which the selectable setting value is displayed is changed. The display of the setting value moves in conjunction with the rotation of the command dial CD. For example, in a case where the command dial CD is rotated clockwise for one click from the state shown in FIG. 26, the display portion of the selectable setting value is rotated clockwise and "1/30" moves to the position of nine o'clock. Similarly, in a case where the command dial CD is rotated counterclockwise for one click from the state shown in FIG. 26, the display portion of the selectable setting value is rotated counter clockwise and "1/125" moves to the position of nine o' clock.

In this manner, the image picture iD of the actual command dial CD may not be rotated and the selectable setting value may be moved to express the rotation operation of the command dial CD.

The selectable setting value may be displayed in the image picture. That is, the selectable setting value may be displayed side by side in an arc shape on a dial plate portion of the image picture as in the actual shutter speed dial. However, it is possible to prevent the display from being hidden by the finger and difficult to view by displaying the selectable setting value on a side portion, particularly on the left side portion of the image picture of the dial as in the example.

Further, as in the example, in a case where the image picture of the dial itself is not rotated, the external shape of the image picture of the dial may have a compact shape as shown in FIG. 26.

Further, as in the example, in the case where the setting value that can be selected by the command dial CD is displayed, the information on the item to be set by the command dial CD may be excluded from the information to be displayed as the setting contents of the camera. Accordingly, it is possible to eliminate a redundant display.

«Modification Example of Display Form of Setting Contents of Camera»

In the above embodiment, the information on the item to be changed in the setting by the command dial CD is displayed in a size larger than the information on other items. However, the display form of the information on the item to be changed in the setting by the command dial CD is not limited thereto. The information on the item to be changed in the setting by the command dial CD may be displayed in a form distinguishable from the information on other items.

<Modification Example 1>

FIGS. 27 and 28 are diagrams showing modification examples of the display form of setting contents of the camera. FIG. 27 shows the case where the operation by the command dial CD is invalid, and FIG. 28 shows the case where the operation by the command dial CD is valid. FIGS. 27 and 28 show the examples in the case where the item to be changed in the setting by the command dial CD is the program shift.

In the example, the information on the setting value of each item displayed as the information on the setting contents of the camera is surrounded by the rectangular frame and displayed. This frame disappears in the case where the operation by the command dial CD is validated. However, only the frame of the item of the operation target of the command dial CD disappears. That is, only the frame of the item to be changed in the setting by the operation of the command dial CD disappears.

FIGS. 27 and 28 show the examples in a case where the shutter speed information i2, the F-number information i3, the ISO sensitivity information i5, and the exposure correction amount information i6 are displayed as the information on the setting contents of the camera.

In the case where the operation by the command dial CD is invalid, the information on the setting value of each item is surrounded by frames f2, f3, f5, and f6 and displayed as shown in FIG. 27.

In the case of the program shift, the combination of the shutter speed and the F-number is changed in the setting. Therefore, in the case where the operation by the command dial CD is validated, the frame f2 surrounding the shutter speed information i2 and the frame f3 surrounding the F-number information i3 disappear as shown in FIG. 28.

In the case where the operation by the command dial CD is validated while the display surface of the sub-display 16 is touched (case of the digital camera of the first embodiment), the frames disappear while the display surface of the sub-display 16 is touched.

Further, the operation by the command dial CD is switched between valid and invalid with the toggle type (case of the digital camera of the second embodiment), the frames disappear while the operation by the command dial CD is validated.

Accordingly, it is possible to grasp that the set imaging mode is the program mode and the shutter speed and the F-number are changed by the operation of the command dial CD from the display on the sub-display 16.

<Modification Example 2>

FIGS. 29 and 30 are diagrams showing other modification examples of the display form of the setting contents of the camera. FIG. 29 shows the case where the operation by the command dial CD is invalid, and FIG. 30 shows the case where the operation by the command dial CD is valid. FIGS. 29 and 30 show the examples in the case where the item to be changed in the setting by the command dial CD is the program shift.

In the example, the information on the setting contents of the camera is displayed in the margin region. In the case where the operation by the command dial CD is validated, the information on the setting value of the item to be changed in the setting by the operation of the command dial CD is turned on and off.

FIGS. 29 and 30 show examples in a case where the shutter speed information i2, the F-number information i3, the ISO sensitivity information i5, and the exposure correction amount information i6 are displayed as the information on the setting contents of the camera.

The margin region is set in a region on the left side of the image picture of the dial iD. This region is a region that is hardly covered by the finger of the hand touching the display surface for the operation.

In the case of the program shift, the combination of the shutter speed and the F-number is changed in the setting. Therefore, in the case where the operation by the command dial CD is validated, the shutter speed information i2 and the F-number information i3 are turned on and off as shown in FIG. 30. In FIG. 30, radial dashed lines shown on both sides of the shutter speed information i2 and the F-number information i3 are images of turning on and off.

In the case where the operation by the command dial CD is validated while the display surface of the sub-display 16 is touched (case of the digital camera of the first embodiment), the setting values are turned on and off while the display surface of the sub-display 16 is touched.

Further, the operation by the command dial CD is switched between valid and invalid with the toggle type (case of the digital camera of the second embodiment), the setting values are turned on and off while the operation by the command dial CD is validated.

Accordingly, it is possible to grasp that the set imaging mode is the program mode and the shutter speed and the F-number are changed by the operation of the command dial CD from the display on the sub-display 16.

Fifth Embodiment

In a digital camera of the embodiment, the information on the setting contents of the camera is displayed on the sub-display in a layout considering a region covered by the finger.

In the case where the operation by the command dial CD is validated only while the display surface of the sub-display 16 is touched, the display on the sub-display 16 becomes difficult to view by the finger of the hand touching the display surface during the operation.

Thus, a display layout is set such that the display is not hidden by the finger of the hand touching the display surface for specific information.

The basic configuration of the camera is the same as the configuration of the digital camera in the first embodiment except that the display on the sub-display 16 is different. Therefore, only the display on the sub-display 16 will be described herein. The control of the display on the sub-display 16 is performed by the sub-display display control unit 118.

[Region Covered by Finger]

FIG. 31 is a plan view showing a disposition of the finger of the hand operating the command dial.

A position where the finger is placed on the display surface of the sub-display 16 for validating the operation by the command dial CD can be specified to some extent from a disposition relationship between the command dial CD and the sub-display 16 as shown in FIG. 31. It is possible to specify also the region covered by the finger from the position where the finger is placed. In FIG. 31, a region a1 indicated by the dashed lines is a region assumed to be covered by the finger during the operation of the command dial CD in the display region on the sub-display 16. Therefore, a region a2 excluding this region a1 is a region not covered by the finger, that is, a region where the visibility is always ensured.

[Display on Sub-Display]

FIG. 32 is a plan view showing an example of the display on the sub-display.

In the digital camera 1 of the embodiment, the currently set imaging mode information i1, the currently set shutter speed information i2, the currently set F-number information i3, the currently set ISO sensitivity information i5, the currently set exposure correction amount information i6, the current battery remaining amount information i7, the current number of capturable images information i8, macro mode setting information i9, and flash setting information i10 are displayed as the information on the setting contents of the digital camera 1.

The macro mode setting information i9 is information indicating whether a macro function provided in the camera is turned on. In a case where the macro function is turned on, an icon shown in FIG. 32 is displayed.

The flash setting information i10 is information indicating the setting situation of the flash. An icon corresponding to a flash mode is displayed. The flash mode is, for example, forced light emission, auto light emission, red-eye reduction, light emission prohibition, and the like.

FIG. 32 shows an example in a case where the currently set imaging mode is the shutter speed priority, the shutter speed is 1/60 second, the F-number is F5.6, the photometry mode is multi-photometry, the ISO sensitivity is ISO400, the exposure correction amount is ±0, the battery remaining amount is about half or less, the number of capturable images is 99, the macro function is turned on, and the flash is auto light emission.

Here, it is assumed that the item that can be changed in the setting by using the command dial CD is the shutter speed, the F-number, and the ISO sensitivity.

In this case, at least pieces of information on the shutter speed, the F-number, and the ISO sensitivity information are displayed in the region a2 assumed to not be covered by the finger.

Thus, in the digital camera of the embodiment, the pieces of information of the shutter speed information i2, the F-number information i3, and the ISO sensitivity information i5 among the pieces of information to be displayed on the sub-display 16 as the information on the setting contents of the digital camera 1 are displayed in the region a2 assumed to not be covered by the finger, and other pieces of information, that is, the imaging mode information i1, the exposure correction amount information i6, the battery remaining amount information i7, the number of capturable images information i8, the macro mode setting information i9, and the flash setting information i10 are displayed in the region a1 assumed to be covered by the finger as shown in FIG. 32.

FIG. 33 is a plan view showing a relationship between the finger of the hand operating the command dial and the display on the sub-display.

According to the display layout of the embodiment, the setting values of the items (shutter speed, F-number, and ISO sensitivity) that can be changed in the setting by the command dial CD are not hidden by the finger even during the operation of the command dial CD. Accordingly, it is possible to provide good operability.

The setting value of the item which is set as the operation target of the command dial CD at the present time may be displayed in the display form different from other items. In this case, the display form may be switched in a case where an operation change by the command dial CD is validated. For example, it is assumed that the item to be changed in the setting by the command dial CD is the shutter speed. In this case, in a case where the operation by the command dial CD is validated, the display form of the shutter speed is switched so as to be able to distinguish from other items. In the example shown in FIG. 33, the information i2 on the setting value of the shutter speed is displayed in a size larger than the information on the setting values of other items. Accordingly, it is possible to easily and visually recognize the item to be changed in the setting by the command dial CD.

It is preferable to set the contact detection region to the inner side of the region al assumed to be covered by the finger.

[Modification Example]

«Modification Example of Display Layout»

In the above embodiment, the information on the setting value of the item that can be changed in the setting by the command dial CD is displayed in the region a2 not covered by the finger. However, at least the item to be changed in the setting by the command dial CD at the present time may be displayed in the region a2 not covered by the finger. Therefore, the display on the sub-display 16 may be switched in conjunction with the switching of the operation target of the command dial CD.

FIG. 34 is a plan view showing an example of the display on the sub-display in the case where the information on the setting value of the item to be changed in the setting by the command dial is displayed in the region not covered by the finger.

FIG. 34 shows an example in a case where the currently set imaging mode information i1, the currently set shutter speed information i2, the currently set F-number information i3, the currently set ISO sensitivity information i5, the currently set exposure correction amount information i6, the current battery remaining amount information i7, and the current number of capturable images information i8 is displayed as the information on the setting contents of the digital camera. The example shows the case where the item to be changed in the setting by the command dial CD at the present time is the shutter speed. In this case, the information i2 on the setting value of the shutter speed is displayed in the region a2 assumed to not be covered by the finger, and the information on other items is displayed in the region a1 assumed to be covered by the finger.

In a case where the item to be changed in the setting by the command dial CD is switched, the display on the sub-display 16 is also switched. For example, in a case where the item to be changed in the setting by the command dial CD is switched to the F-number, the information on the setting value of the F-number is displayed in the region a2. In this case, the setting value of the shutter speed is displayed at a position where the F-number is displayed.

Accordingly, it is possible to grasp the item to be changed in the setting by the operation of the command dial CD and the setting value thereof at a glance. Further, since the setting value is not hidden by the finger even during the operation, it is possible to provide good operability.

«Modification Example of Display on Sub-display»

FIG. 35 is a plan view showing a modification example of the display on the sub-display.

In the example, the image picture of the dial iD is displayed in a semi-transparent manner. The information on the setting contents of the camera is displayed on the image picture of the dial iD in an overlapped manner.

In this manner, the image picture of the dial iD may be displayed in a semi-transparent manner. In addition, the image picture of the button may be displayed in a semi-transparent manner.

«Switching between Validity and Invalidity of Operation by Command Dial»

The operation by the command dial CD may be switched between valid and invalid by the toggle type as in the digital camera of the above second embodiment.

Sixth Embodiment

In a digital camera of the embodiment, in the case where the finger touches the display surface on the sub-display, the information on the setting contents of the camera is displayed avoiding the region touched by the finger. That is, the display escapes to the region not covered by the finger.

The basic configuration of the camera is the same as the configuration of the digital camera in the first embodiment except that the display form of the sub-display 16 is different. Therefore, only the control of the display on the sub-display 16 will be described herein.

[Configuration]

FIG. 36 is a block diagram showing a system configuration of the operation system by using the command dial in the digital camera of the embodiment.

The sub-display display control unit 118 controls the display on the sub-display 16 based on the output from the touch sensor 16*a* as shown in FIG. 36.

The touch sensor 16*a* detects the region touched by the finger on the display surface of the sub-display 16 and outputs the detected information to the sub-display display control unit 118. Therefore, the contact detection region of the touch sensor 16*a* is set to substantially the entire display region on the sub-display 16.

In a case where the contact with the display surface of the sub-display 16 is detected by the touch sensor 16*a*, the sub-display display control unit 118 displays the information to be displayed on the sub-display 16 avoiding a region where the contact of the finger is detected.

[Display on Sub-Display]

FIGS. 37 and 38 are plan views showing examples of the displays on the sub-display. FIG. 37 shows the display in the case where the contact with the display surface of the sub-display 16 is not detected, and FIG. 38 shows the display in the case where the contact with the display surface of the sub-display 16 is detected.

In the digital camera 1 of the embodiment, the currently set imaging mode information i1, the currently set shutter speed information i2, the currently set F-number information i3, the currently set ISO sensitivity information i5, the currently set exposure correction amount information i6, the current battery remaining amount information i7, and the current number of capturable images information i8 are displayed as the information on the setting contents of the digital camera 1.

In the case where the contact with the display surface of the sub-display 16 is not detected, each piece of information is displayed in a predetermined layout using the entire screen as shown in FIG. 37. This display layout is set as a first layout.

On the other hand, in the case where the contact with the display surface of the sub-display 16 is detected, each piece of information is displayed in a predetermined layout avoiding the detected region as shown in FIG. 38. In the example, each piece of information is shifted in the left direction and displayed. At the time, the display size of each piece of information is reduced. This display layout is set as a second layout.

Specifically, a display region ax is set avoiding the region where the contact is detected, and the information on the setting contents of the camera is displayed in the display region ax. In the example shown in FIG. 38, the left side of the region where the contact is detected is set as the display region ax than the end portion on the left side thereof. Accordingly, the information is displayed on the sub-display 16 avoiding the region covered by the finger.

In this manner, according to the digital camera of the embodiment, in the case where the finger touches the display on the sub-display, the information on the setting contents of the camera is displayed avoiding the region touched by the finger. Accordingly, it is possible to always confirm the information on the setting contents of the camera and thus to provide good operability. In particular, in the case where the operation by the command dial CD is validated only while the display surface of the sub-display 16 is touched, it is possible to confirm the setting value even during the operation of the command dial CD and thus to provide good operability.

[Modification Example]

«Display in Case of Toggle Type»

In the case where the operation by the command dial CD is switched between valid and invalid with the toggle type as in the digital camera of the above second embodiment, the display may escape only while the contact is detected.

«Modification Example of Display on Sub-Display»

It is preferable to change the display form for the setting value of the item to be changed in the setting the command dial CD so as to be able to distinguish from the setting values of other items.

Further, in a case where the display escapes, only the display of the setting value of the item to be changed in the setting by the command dial CD may escape.

Seventh Embodiment

In a digital camera of the embodiment, in the case where the finger touches the display surface on the sub-display, the information on the setting contents of the camera moves. A movement destination is a position assumed to not be covered by the finger in a normal operation form. That is, in the digital camera of the embodiment, the information on the setting contents of the camera escapes to the region not covered by the finger in the case where the finger touches the display surface of the sub-display 16.

The basic configuration of the camera is the same as the configuration of the digital camera in the first embodiment except that the display form of the sub-display 16 is different. Therefore, only the control of the display on the sub-display 16 will be described herein.

[Display on Sub-Display]

FIGS. 39 and 40 are plan views showing examples of the displays on the sub-display. FIG. 39 shows the display in the case where the contact with the display surface of the sub-display 16 is not detected, and FIG. 40 shows the display in the case where the contact with the display surface of the sub-display 16 is detected.

In the digital camera 1 of the embodiment, the currently set imaging mode information i1, the currently set shutter speed information i2, the currently set F-number information i3, the currently set ISO sensitivity information i5, the currently set exposure correction amount information i6, the current battery remaining amount information i7, and the current number of capturable images information i8 are displayed as the information on the setting contents of the digital camera 1.

In the case where the contact with the display surface of the sub-display 16 is not detected, each piece of information is displayed in a predetermined layout using the entire screen as shown in FIG. 39. This display layout is set as the first layout.

Here, the region a1 surrounded by the dashed lines in FIG. 39 is a region assumed to be covered by the finger during the operation of the command dial CD in the normal operation form. That is, the region a1 is a region assumed to be touched by the finger for validating the operation by the command dial CD.

Therefore, the region a2 excluding this region a1 is the region assumed to not be covered by the finger in the normal operation form. This region a2 is a region where the visibility is always ensured even during the operation of the command dial CD in the normal operation form.

As shown in FIG. 38, in the case where the contact with the display surface of the sub-display 16 is detected, the information on the setting contents of the camera is moved to and displayed in the region a2 assumed to not be covered by the finger. The display is performed by a predetermined layout. This display layout is set as the second layout. In the example, the entire display of information on the setting contents of the camera is moved in the left direction and displayed such that the entire display thereof fits within the region a2. At the time, the display of each piece of information is reduced with a regular magnification.

In this manner, in the digital camera 1 of the embodiment, the information on the setting contents of the camera is displayed on the sub-display 16 in the first layout in the case where the contact with the display surface of the sub-display 16 is not detected. In the case where the contact with the display surface of the sub-display 16 is detected, the information on the setting contents of the camera is displayed on the sub-display 16 in the second layout different from the first layout while the contact is detected.

Accordingly, it is possible to always confirm the information on the setting contents of the camera and thus to provide good operability. In particular, in the case where the operation by the command dial CD is validated only while the display surface of the sub-display 16 is touched, it is possible to confirm the setting value even during the operation of the command dial CD and thus to provide good operability.

[Modification Example]

«Display in Case of Toggle Type»

In the case where the operation by the command dial CD is switched between valid and invalid with the toggle type as in the digital camera of the above second embodiment, the display may be moved only while the contact is detected.

«Setting of Contact Detection Region»

It is preferable to limit the contact detection region to a partial region on the display surface of the sub-display 16. For example, the contact detection region is set only within the region a1 assumed to be covered by the finger in the normal operation form. Accordingly, it is possible to provide good operability and to set the region not covered by the finger within the display surface.

«Modification Example of Display on Sub-Display»

It is preferable to change the display form for the setting value of the item to be changed in the setting the command dial CD so as to be able to distinguish from the setting values of other items.

Further, in the case where the contact with the display surface of the sub-display 16 is detected, only the setting value of the item to be changed in the setting by the command dial CD may be moved to and displayed in the region a2 not covered by the finger.

FIG. 41 is a plan view showing an example of the display on the sub-display in a case where only the setting value of the item to be changed in the setting by the command dial is displayed.

FIG. 41 shows the example in the case where the item to be changed in the setting by the command dial CD is the shutter speed. In this case, only the setting value of the shutter speed is displayed in the region a2 assumed to not be covered by the finger. Accordingly, it is possible to grasp the item to be changed in the setting by the operation of the command dial CD and the setting value thereof at a glance.

Other Embodiments

[Item to be Changed in Setting by Command Dial]

The item to be changed in the setting by the command dial (operation dial) can be set as appropriate depending on the function provided in the camera. Further, the item to be changed in the setting by the command dial may be set by the user randomly.

[Item to be Displayed on Sub-Display]

The item to be displayed on the sub-display which is the display section can be set as appropriate depending on the function provided in the digital camera. However, it is preferable to display the information on the setting contents of the camera including at least the information on the setting value of the item to be set by the command dial CD.

[Modification Example of Contact Detection Unit]

The contact detection unit is formed of the touch sensor in the above-described embodiment, but the configuration of the contact detection unit is not limited thereto.

[Modification Example of Detection of Contact]

A so-called dead zone may be provided for the detection of the contact. That is, it is preferable not to detect instantaneous finger contact. Similarly, it is preferable not to detect also a case where the finger is instantaneously released.

In order to provide the dead zone, for example, the contact is detected at regular time interval. In this case, it is determined whether the contact is continuously detected to determine the presence or absence of the contact. In a case where the contact is continuously detected, the contact is determined to be present. In the case of the instantaneous contact, since the contact is not continuously detected, the contact is not determined to be present. Further, even in the case where the finger is instantaneously released, it can be recognized that the contact is continued as long as the finger is touched before the next detection.

In this manner, the operation can be performed more stably by determining also duration of the contact and responding with hysteresis.

[Other Examples of Method of Notifying that Operation by Command Dial is Invalid]

«Notification by Sound»

In a case where the digital camera is provided with a sound output unit such as a speaker, the user may be notified that the change in the setting value by the command dial is invalid by using the sound output unit. For example, in the case where the command dial is rotationally operated in the case where the change in the setting value by the command dial is invalid, a sound such as a notification sound or a warning sound is output from the sound output unit. In this case, the digital camera is provided with a sound output control unit. In the case where it is detected that the command dial is rotationally operated in the state where the change in the setting value by the command dial is invalid, the sound output control unit outputs the sound such as the notification sound or the warning sound from the sound output unit.

Further, in the case where the digital camera is provided with the sound output unit such as the speaker, a pseudo-rotation operation sound may be output in conjunction with the rotation operation of the command dial. In this case, the rotation operation sound may be switched between the case where the change in the setting value by the command dial is valid and the case where the change in the setting value by the operation dial is invalid. Alternatively, the rotation operation sound may be output only in the case where the change in the setting value by the command dial is valid.

«Notification on Main-Display»

In a case where the camera body is provided with the main-display as in the digital camera of the above-described embodiment, the main-display may display a state of the command dial. That is, the main-display may display whether the change in the setting value by the command dial is valid. In a case where the camera body is provided with the electronic view finder, the same display may be performed also on the electronic view finder.

[Other Examples of Sub-Display]

The sub-display 16 which is the display section is formed of the LCD in the above-described embodiment, but the dial-display forming the dial display section is not limited thereto. In addition, the dial-display may be formed of a self-luminous display or the like such as electronic paper, a memory liquid crystal display, or an organic electroluminescent display (EL).

The electronic paper is a thin display that has thinness and visibility at the same level as those of paper, and means a display of which contents to be displayed can be rewritten. The memory liquid crystal display is a liquid crystal display that has a function to be capable of maintaining contents displayed on a screen even though a power supply is turned off. Both of the electronic paper and the memory liquid crystal display can ensure good visibility even in an environment where surroundings are bright. Further, a display on the dial display section can be confirmed even in a case where the power supply of the camera is turned off. That is, the display on the display is deleted in the case where the power supply of the camera is turned off in a common liquid crystal display or the like. However, the display immediately before the power supply of the camera is turned off is maintained even though the power supply thereof is turned off in the electronic paper and the memory liquid crystal display. Therefore, the displays shown in FIG. 21 and the like are maintained even in the case where the power supply of the camera is turned off. Accordingly, for example, in the case where the image picture of the dial is displayed on the sub-display 16, it is possible to provide the user with the feeling as if the operation dial is provided on the top surface even in the case where the power supply of the camera is turned off and thus to provide good operability.

Further, in a case where the dial-display is formed of the LCD, it is possible to ensure good visibility even in an environment where surroundings are bright by employing a reflective LCD as the display. In the case where the dial-display is formed of the reflective LCD, it is preferable to comprise illumination.

Similarly, the sub-display which is the display section may also be formed of the self-luminous display or the like such as the electronic paper, the memory liquid crystal display, or the organic EL display.

[Other Examples of Disposition of Command Dial and Sub-Display]

In the above embodiment, a part of the outer periphery of the command dial CD is exposed from the back surface of the camera body 10, a position where the part of the outer periphery of the command dial CD is exposed is not limited thereto. For example, the part of the outer periphery of the command dial CD may be exposed from a corner part of the right side surface or the right back surface of the camera body 10.

The command dial CD and the sub-display 16 may be disposed such that at least a part thereof overlaps in a plan view. However, it is preferable to dispose the sub-display 16 at least on the axis of the command dial CD considering operability.

[Other Modification Examples]

The rotation of the command dial is detected by the rotary encoder in the above-mentioned embodiment, but the configuration of detecting the rotation of the command dial is not limited thereto. In addition, for example, publicly known rotation detection means, which uses a rotary brush or the like, may also be employed.

Further, the click mechanism of the command dial is formed of the click groove-metal plate and the click balls in the above-mentioned embodiment, but the configuration of the click mechanism is not limited thereto. In addition, publicly known click mechanism, which uses a leaf spring or the like, may also be employed.

Further, the case where the invention is applied to the digital camera is described in the above-mentioned embodiment, but the application of the invention is not limited thereto. The invention may be applied similarly to a camera that uses a silver halide film. Further, the invention may also be applied to an electronic apparatus comprising the camera function.

Further, the case where the invention is applied to the lens-interchangeable camera is described in the above-mentioned embodiment, but the invention may also be applied similarly to a camera, which is integrated with a lens.

Furthermore, the case where the invention is applied to the non-reflex camera is described in the above-mentioned embodiment, but the invention may also be applied similarly to a reflex camera.

EXPLANATION OF REFERENCES

1: digital camera
2: lens
2*a*: lens drive unit
10: camera body
12: lens mount
14: main-display
16: sub-display
16*a*: touch sensor
18: electronic view finder
20: hot shoe
22: grip
24: thumb rest
30: shutter button
31: power supply lever
34: playback button
35: delete button
36: AF lock button
37: AE lock button
38: menu button
39: selector button
40: display button
41: mode dial
41*a*: indicator
50: image sensor
52: image sensor drive unit
54: shutter
56: shutter drive unit
58: analog signal processing section
60: image data input unit

62: work memory
64: data memory
66: digital signal processing section
68: recording control unit
70: main-display drive unit
72: sub-display drive unit
74: operation unit
78: memory card
80: system controller
110: operation target setting unit
112: operation detection unit
114: switching unit
116: setting change unit
118: sub-display display control unit
CD: command dial
$CD_O$: rotation axis
L: optical axis
a1: region assumed to be covered by finger
a2: region assumed to not be covered by finger
f2: frame
f3: frame
f5: frame
f6: frame
i1: imaging mode information
i2: shutter speed information
i3: F-number information
i4: photometry mode information
i5: ISO sensitivity information
i6: exposure correction amount information
i7: battery remaining amount information
i8: the number of capturable images information
i9: macro mode setting information
i10: flash setting information
iB: image picture of button
iB1: outer frame part
iB2: button portion
iD: dial image picture
iD1: dial portion
iD2: button portion
iL: lock icon
m1: carry-down mark
m2: carry-up mark
sz: contact detection region
S10 to S13: procedure of processing of setting change by using command dial
S20 to S23: procedure of processing of switching between validity and invalidity of operation by command dial
S30 to S33: procedure of processing of switching between validity and invalidity of operation by command dial

What is claimed is:

1. A camera comprising:

a rotary operation dial that is built in a camera body and in which a part of the outer periphery of the rotary operation dial is exposed to a surface of the camera body;

a display section that is disposed on the operation dial in an overlapped manner while covering a portion of the operation dial hidden inside the camera body and not covering a portion exposed from the camera body;

a display control unit that controls a display on the display section;

a contact detection unit that detects contact with a display surface of the display section, and a switching unit that switches between validity and invalidity of an operation by the operation dial based on a detection result of the contact detection unit.

2. The camera according to claim 1, wherein the display section is disposed on an axis of the operation dial in an overlapped manner.

3. The camera according to claim 1, wherein the contact detection unit detects the contact in a region overlapping with the operation dial on the display surface of the display section.

4. The camera according to claim 1, wherein the contact detection unit further detects a touched position.

5. The camera according to claim 1, wherein the switching unit switches alternately between validity and invalidity of the operation by the operation dial every time the contact is detected by the contact detection unit.

6. The camera according to claim 1, wherein the switching unit validates the operation by the operation dial while the contact is detected by the contact detection unit.

7. The camera according to claim 1, wherein the display control unit displays at least information indicating a state of the operation dial on the display section.

8. The camera according to claim 1, wherein the display control unit switches a display form of the information to be displayed on the display section between a case where the operation by the operation dial is invalid and a case where the operation by the operation dial is valid.

9. The camera according to claim 1, wherein the display control unit displays an image picture of a button on the display section and switches a display form of the image picture of the button in conjunction with the switching between validity and invalidity of the operation by the operation dial.

10. The camera according to claim 1, wherein the display control unit displays an image picture of a dial comprising a button at the center on the display section and switches a display form of a portion of the button in conjunction with the switching between validity and invalidity of the operation by the operation dial.

11. The camera according to claim 10, wherein in a case where the operation by the operation dial is valid, the display control unit changes the image picture of the operation dial in conjunction with a rotation of the operation dial to express a rotation operation of the operation dial.

12. The camera according to claim 10, wherein the display control unit displays an image having an arc-like external shape obtained by extending the part of the outer periphery of the operation dial exposed to the surface of the camera body on the display section as the image picture of the dial.

13. The camera according to claim 10, wherein the image picture of the dial has a radial pattern.

14. The camera according to claim 10, wherein the image picture of the dial has a pattern displayed periodically in the circumference direction.

15. The camera according to claim 10, wherein the image picture of the dial has a periodical uneven shape on the outer periphery portion.

16. The camera according to claim 9, wherein a region where the contact is detected by the contact detection unit is set within a display region of the image picture of the button.

17. The camera according to claim 1, wherein the display control unit displays information on setting contents of the camera including at least a setting value of an item to be set by the operation dial on the display section.

18. The camera according to claim 17, wherein in a case where the information on the setting contents of the camera to be displayed on the display section includes information on setting value of an item other than the item to be set by the operation dial, the display control unit displays the information on the setting value of the item to be set by the operation dial in a form different from the information on the setting value of another item.

19. The camera according to claim 17, wherein in a case where the information on the setting contents of the camera to be displayed on the display section includes information on a setting value of an item other than the item to be set by the operation dial, and the operation by the operation dial is valid, the display control unit limits the information on the setting contents of the camera to be displayed on the display section to the information on the setting value of the item to be set by the operation dial.

20. The camera according to claim 6, wherein the contact detection unit detects the contact with the contact detection region set on a part in the display surface of the display section, and wherein the display control unit displays the information on the setting contents of the camera including at least the information on the setting value of the item to be set by the operation dial on the display section, and displays at least the information on the setting value of the item to be set by the operation dial in a region avoiding the contact detection region.

21. The camera according to claim 6, wherein the contact detection unit detects the contact with the contact detection region set on a part in the display surface of the display section, and wherein the display control unit displays the information on the setting contents of the camera including at least the information on the setting value of the item to be set by the operation dial on the display section, and displays at least the information on the setting value of the item to be set by the operation dial in a region avoiding a contact detection region while the contact is detected by the contact detection unit.

22. The camera according to claim 6, wherein the display control unit displays the information on the setting contents of the camera including at least the information on the setting value of the item to be set by the operation dial on the display section, and displays at least the information on the setting value of the item to be set by the operation dial in a region avoiding a region where the contact is detected by the contact detection unit while the contact is detected by the contact detection unit.

23. The camera according to claim 6, wherein the display control unit displays the information on the setting contents of the camera including at least the information on the setting value of the item to be set by the operation dial on the display section, and displays at least the information on the setting value of the item to be set by the operation dial in a region avoiding a region assumed to be covered by a finger of a hand touching the display surface of the display section.

24. The camera according to claim 6, wherein in a case where the operation by the operation dial is invalid, the display control unit displays the information on the setting contents of the camera including at least the information on the setting value of the item to be set by the operation dial on the display section in a first layout, and wherein in a case where the operation by the operation dial is valid, the display control unit displays the information on the setting contents on the display section in a second layout different from the first layout.

25. The camera according to claim 24, wherein the second layout is a layout that displays the information on the setting contents in a region avoiding a region assumed to be covered by a finger of a hand touching the display surface of the display section.

26. The camera according to claim 24, wherein the second layout is a layout that displays the information on the setting contents in a region avoiding the region where the contact is detected by the contact detection unit.

27. The camera according to claim 1, wherein the display section is provided on a top surface of the camera body and provided at an end portion on a grip portion side.

28. A setting method of a camera comprising a rotary operation dial that is built in a camera body and in which a part of the outer periphery of the rotary operation dial is exposed to a surface of the camera body, a display section that is disposed on the operation dial in an overlapped manner while covering a portion of the operation dial hidden inside the camera body and not covering a portion exposed from the camera body, and a contact detection unit that detects contact with a display surface of display section, the method comprising:

a step of switching between validity and invalidity of an operation by the operation dial based on a detection result of the contact detection unit; and a step of changing a setting of a predetermined item based on the operation of the operation dial in a case where the operation by the operation dial is valid.

29. A non-transitory computer readable recording medium recorded with a setting program of a camera comprising a rotary operation dial that is built in a camera body and in which a part of the outer periphery of the rotary operation dial is exposed to a surface of the camera body, a display section that is disposed on the operation dial in an overlapped manner while covering a portion of the operation dial hidden inside the camera body and not covering a portion exposed from the camera body, and a contact detection unit that detects contact with a display surface of display section and causing a computer to realize functions comprising:

a function of switching between validity and invalidity of an operation by the operation dial based on a detection result of the contact detection unit; and a function of changing a setting of a predetermined item based on the operation of the operation dial in a case where the operation by the operation dial is valid.

* * * * *